US011637770B2

(12) United States Patent
Tracy et al.

(10) Patent No.: US 11,637,770 B2
(45) Date of Patent: Apr. 25, 2023

(54) INVALIDATING CACHED FLOW INFORMATION IN A CLOUD INFRASTRUCTURE

(71) Applicant: Oracle International Corporation, Redwood Shores, CA (US)

(72) Inventors: Leonard Thomas Tracy, Bothell, WA (US); Lucas Michael Kreger-Stickles, Seattle, WA (US); Jagwinder Singh Brar, Bellevue, WA (US); Bryce Eugene Bockman, Seattle, WA (US)

(73) Assignee: Oracle International Corporation, Redwood Shores, CA (US)

( * ) Notice: Subject to any disclaimer, the term of this patent is extended or adjusted under 35 U.S.C. 154(b) by 0 days.

(21) Appl. No.: 17/237,750

(22) Filed: Apr. 22, 2021

(65) Prior Publication Data
US 2022/0263713 A1 Aug. 18, 2022

Related U.S. Application Data

(60) Provisional application No. 63/149,276, filed on Feb. 13, 2021.

(51) Int. Cl.
*H04L 45/02* (2022.01)
*H04L 12/24* (2006.01)
(Continued)

(52) U.S. Cl.
CPC .......... *H04L 45/38* (2013.01); *H04L 12/4641* (2013.01); *H04L 41/0813* (2013.01);
(Continued)

(58) Field of Classification Search
CPC ............. H04L 41/0813; H04L 12/4641; H04L 41/0853
See application file for complete search history.

(56) References Cited

U.S. PATENT DOCUMENTS 10,374,956 B1* 8/2019 Tracy .................. H04L 67/1089
10,623,433 B1* 4/2020 Veselov ............. H04L 63/1433
(Continued)

OTHER PUBLICATIONS

International Application No. PCT/US2022/012529, "International Search Report and Written Opinion", dated Apr. 25, 2022, 15 pages.
(Continued)

*Primary Examiner* — Kevin T Bates
*Assistant Examiner* — Golam Mahmud
(74) *Attorney, Agent, or Firm* — Kilpatrick Townsend & Stockton LLP

(57) ABSTRACT

Techniques for managing the distribution of configuration information that supports the flow of packets in a cloud environment are described. In an example, a virtual network interface card (VNIC) hosted on a network virtualization device NVD receives a first packet from a compute instance associated with the VNIC. The VNIC determines that flow information to send the first packet on a virtual network is unavailable from a memory of the NVD. The VNIC sends, via the NVD, the first packet to a network interface service, where the network interface service maintains configuration information to send packets on the substrate network and is configured to send the first packet on the substrate network based on the configuration information. The NVD receives the flow information from the network interface service, where the flow information is a subset of the configuration information. The NVD stores the flow information in the memory.

20 Claims, 25 Drawing Sheets

(51) Int. Cl.
  *H04L 29/08* (2006.01)
  *H04L 29/06* (2006.01)
  *H04L 12/46* (2006.01)
  *H04L 45/00* (2022.01)
  *H04L 45/74* (2022.01)
  *H04L 41/0813* (2022.01)
  *H04L 41/0853* (2022.01)

(52) U.S. Cl.
  CPC ......... *H04L 41/0853* (2013.01); *H04L 45/02* (2013.01); *H04L 45/742* (2013.01)

(56) References Cited

U.S. PATENT DOCUMENTS

| | | | |
|---|---|---|---|
| 10,834,044 B2 | 11/2020 | Tillotson et al. | |
| 10,931,478 B2* | 2/2021 | Nunes | H04L 12/4633 |
| 2009/0154694 A1* | 6/2009 | Yamauchi | H04N 21/43615 |
| | | | 726/26 |
| 2009/0180489 A1* | 7/2009 | Fujita | H04L 12/66 |
| | | | 370/409 |
| 2013/0061047 A1* | 3/2013 | Sridharan | H04L 45/586 |
| | | | 718/1 |
| 2014/0126418 A1* | 5/2014 | Brendel | H04L 45/54 |
| | | | 370/254 |
| 2014/0189075 A1* | 7/2014 | Stansell | G06F 9/546 |
| | | | 709/220 |
| 2015/0365281 A1* | 12/2015 | Marino | H04L 69/22 |
| | | | 713/150 |
| 2016/0105471 A1* | 4/2016 | Nunes | H04L 12/4641 |
| | | | 709/228 |
| 2016/0274967 A1* | 9/2016 | Umbehocker | G06F 11/1004 |
| 2017/0085667 A1* | 3/2017 | Flack | H04L 67/568 |
| 2018/0048523 A1* | 2/2018 | Nakano | H04L 41/0873 |
| 2018/0062923 A1 | 3/2018 | Katrekar et al. | |
| 2018/0069787 A1* | 3/2018 | Hill | H04L 45/64 |
| 2018/0098269 A1* | 4/2018 | Pradas | H04W 68/005 |
| 2018/0234298 A1* | 8/2018 | Cohn | H04L 41/122 |
| 2019/0004780 A1* | 1/2019 | Arumugam | G06F 8/60 |
| 2019/0230025 A1* | 7/2019 | Kommula | H04L 41/0895 |
| 2020/0092252 A1 | 3/2020 | Tillotson et al. | |
| 2020/0112515 A1* | 4/2020 | Brar | H04L 63/10 |
| 2020/0304413 A1 | 9/2020 | MacCarthaigh | |
| 2020/0382592 A1* | 12/2020 | Himura | H04L 41/5009 |
| 2020/0389796 A1* | 12/2020 | Olofsson | H04W 12/37 |
| 2022/0103487 A1* | 3/2022 | Ang | H04L 49/70 |
| 2022/0200801 A1* | 6/2022 | Potlapally | H04L 9/0897 |

OTHER PUBLICATIONS

International Application No. PCT/US2022/012538, "International Search Report and Written Opinion", dated Apr. 25, 2022, 13 pages.

* cited by examiner

INVALIDATING CACHED FLOW INFORMATION IN A CLOUD INFRASTRUCTURE

CROSS-REFERENCE TO RELATED APPLICATIONS

This present application is a non-provisional application of, and claims the benefit and priority under 35 U.S.C. 119(e) of U.S. Provisional Application No. 63/149,276, filed on Feb. 13, 2021, the entire contents of which is incorporated by reference for all purposes.

BACKGROUND

A cloud infrastructure, such as Oracle Cloud Infrastructure (OCI), can provide a set of cloud services that enable entities (e.g., enterprises) subscribing to these services to build and run a wide range of applications and services in a highly available cloud-hosted environment. The subscribing entities are referred to as customers of the cloud services provider. A cloud infrastructure can offer high-performance compute, storage, and network capabilities in a flexible overlay virtual network that runs on top of the physical underlay network and that is securely accessible from an enterprise's on-premises network. A cloud infrastructure, such as OCI, generally allows customers to manage their cloud-based workloads in the same way they manage their on-premises workloads. Thus, organizations can get all the benefits of the cloud with the same control, isolation, security, and predictable performance as their on-premises network.

Virtual networking is a foundation for cloud infrastructures and cloud applications because virtual networking enables the ability to access, connect, secure, and modify cloud resources. Virtual networking enables communication between multiple computers, virtual machines (VMs), virtual servers, or other devices across different physical locations. While physical networking connects computer systems through cabling and other hardware, virtual networking uses software management to connect computers and servers in different physical locations over the Internet. A virtual network uses virtualized versions of traditional network components, such as network switches, routers, and adapters, allowing for more efficient routing and easier network configuration and reconfiguration.

BRIEF SUMMARY

The present disclosure relates generally to managing the distribution of configuration information that supports the flow of packets between endpoints in a cloud environment. The configuration information generally includes policies, rules, mappings, routing, and other types of information to send and/or receive packets. The distribution can optimize the balance between memory usage and bandwidth. In particular, the configuration information can be stored by a network interface service that supports, in a centralized manner, the connectivity between compute instances in a virtual network. Relevant subsets of the configuration information (referred to herein as flow information) can also be stored locally on network virtualization devices that provide interfaces of the compute instances to the network interface service and the virtual network. When no flow information exists locally on a network virtualization device to support a packet flow to an endpoint, the packet can be sent to the network interface service that then processes and sends it to the endpoint. Otherwise, the flow information is used at the network virtualization device to process and send this packet to the endpoint without sending it via the network interface service. In this way, rather than storing the entire set of the configuration information on the network virtualization device (which would use a relatively large amount of memory and limit the density of the interfaces that the network virtualization device can support), only the relevant subset is stored and used locally for the packet flow, thereby saving memory space (which, in turn, allows a relatively higher interface density on the network virtualization device) and bandwidth (e.g., by not sending the packet to the endpoint via the network interface service).

The terms and expressions that have been employed are used as terms of description and not of limitation, and there is no intention in the use of such terms and expressions of excluding any equivalents of the features shown and described or portions thereof. It is recognized, however, that various modifications are possible within the scope of the systems and methods claimed. Thus, it should be understood that, although the present system and methods have been specifically disclosed by examples and optional features, modification and variation of the concepts herein disclosed should be recognized by those skilled in the art, and that such modifications and variations are considered to be within the scope of the systems and methods as defined by the appended claims.

This summary is not intended to identify key or essential features of the claimed subject matter, nor is it intended to be used in isolation to determine the scope of the claimed subject matter. The subject matter should be understood by reference to appropriate portions of the entire specification of this disclosure, any or all drawings, and each claim.

The foregoing, together with other features and embodiments, will become more apparent upon referring to the following specification, claims, and accompanying drawings.

BRIEF DESCRIPTION OF THE DRAWINGS

Illustrative examples are described in detail below with reference to the following figures.

DETAILED DESCRIPTION

Example Virtual Networking Architectures

Figure 1:
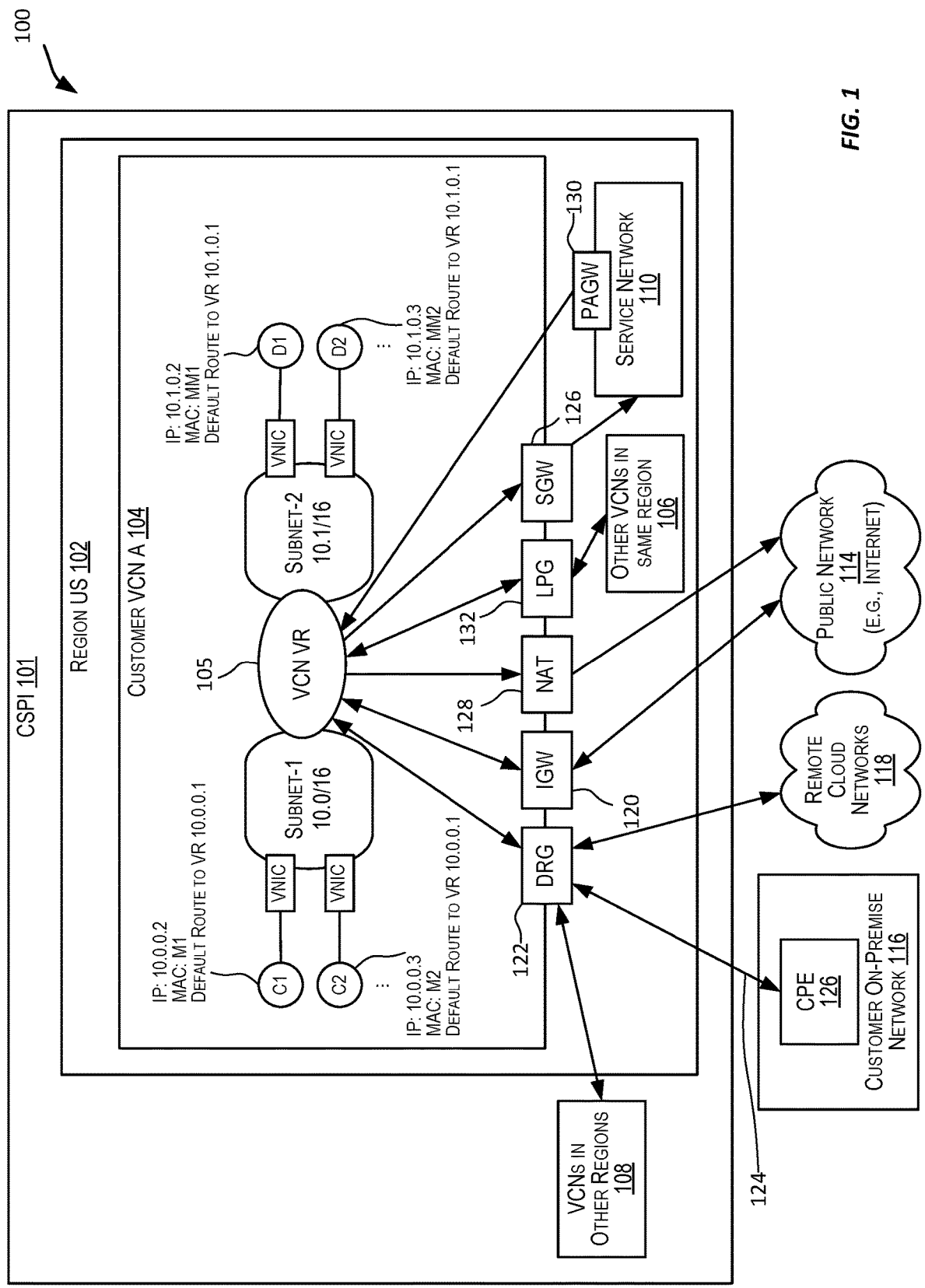
FIG. 1 is a high level diagram of a distributed environment showing a virtual or overlay cloud network hosted by a cloud service provider infrastructure according to certain embodiments.

The term cloud service is generally used to refer to a service that is made available by a cloud services provider (CSP) to users or customers on demand (e.g., via a subscription model) using systems and infrastructure (cloud infrastructure) provided by the CSP. Typically, the servers and systems that make up the CSP's infrastructure are separate from the customer's own on-premise servers and systems. Customers can thus avail themselves of cloud services provided by the CSP without having to purchase separate hardware and software resources for the services. Cloud services are designed to provide a subscribing customer easy, scalable access to applications and computing resources without the customer having to invest in procuring the infrastructure that is used for providing the services.

There are several cloud service providers that offer various types of cloud services. There are various different types or models of cloud services including Software-as-a-Service (SaaS), Platform-as-a-Service (PaaS), Infrastructure-as-a-Service (IaaS), and others.

A customer can subscribe to one or more cloud services provided by a CSP. The customer can be any entity such as an individual, an organization, an enterprise, and the like. When a customer subscribes to or registers for a service provided by a CSP, a tenancy or an account is created for that customer. The customer can then, via this account, access the subscribed-to one or more cloud resources associated with the account.

As noted above, infrastructure as a service (IaaS) is one particular type of cloud computing service. In an IaaS model, the CSP provides infrastructure (referred to as cloud services provider infrastructure or CSPI) that can be used by customers to build their own customizable networks and deploy customer resources. The customer's resources and networks are thus hosted in a distributed environment by infrastructure provided by a CSP. This is different from traditional computing, where the customer's resources and networks are hosted by infrastructure provided by the customer.

The CSPI may comprise interconnected high-performance compute resources including various host machines, memory resources, and network resources that form a physical network, which is also referred to as a substrate network or an underlay network. The resources in CSPI may be spread across one or more data centers that may be geographically spread across one or more geographical regions. Virtualization software may be executed by these physical resources to provide a virtualized distributed environment. The virtualization creates an overlay network (also known as a software-based network, a software-defined network, or a virtual network) over the physical network. The CSPI physical network provides the underlying basis for creating one or more overlay or virtual networks on top of the physical network. The physical network (or substrate network or underlay network) comprises physical network devices such as physical switches, routers, computers and host machines, and the like. An overlay network is a logical (or virtual) network that runs on top of a physical substrate network. A given physical network can support one or multiple overlay networks. Overlay networks typically use encapsulation techniques to differentiate between traffic belonging to different overlay networks. A virtual or overlay network is also referred to as a virtual cloud network (VCN). The virtual networks are implemented using software virtualization technologies (e.g., hypervisors, virtualization functions implemented by network virtualization devices (NVDs) (e.g., smartNICs), top-of-rack (TOR) switches, smart TORs that implement one or more functions performed by an NVD, and other mechanisms) to create layers of network abstraction that can be run on top of the physical network. Virtual networks can take on many forms, including peer-to-peer networks, IP networks, and others. Virtual networks are typically either Layer-3 IP networks or Layer-2 VLANs. This method of virtual or overlay networking is often referred to as virtual or overlay Layer-3 networking. Examples of protocols developed for virtual networks include IP-in-IP (or Generic Routing Encapsulation (GRE)), Virtual Extensible LAN (VXLAN—IETF RFC 7348), Virtual Private Networks (VPNs) (e.g., MPLS Layer-3 Virtual Private Networks (RFC 4364)), VMware's NSX, GENEVE (Generic Network Virtualization Encapsulation), and others.

For IaaS, the infrastructure (CSPI) provided by a CSP can be configured to provide virtualized computing resources over a public network (e.g., the Internet). In an IaaS model, a cloud computing services provider can host the infrastructure components (e.g., servers, storage devices, network nodes (e.g., hardware), deployment software, platform virtualization (e.g., a hypervisor layer), or the like). In some cases, an IaaS provider may also supply a variety of services to accompany those infrastructure components (e.g., billing, monitoring, logging, security, load balancing and clustering, etc.). Thus, as these services may be policy-driven, IaaS users may be able to implement policies to drive load balancing to maintain application availability and performance. CSPI provides infrastructure and a set of complementary cloud services that enable customers to build and run a wide range of applications and services in a highly available hosted distributed environment. CSPI offers high-performance compute resources and capabilities and storage capacity in a flexible virtual network that is securely accessible from various networked locations such as from a customer's on-premises network. When a customer subscribes to or registers for an IaaS service provided by a CSP, the tenancy created for that customer is a secure and isolated partition within the CSPI where the customer can create, organize, and administer their cloud resources.

Customers can build their own virtual networks using compute, memory, and networking resources provided by CSPI. One or more customer resources or workloads, such as compute instances, can be deployed on these virtual networks. For example, a customer can use resources provided by CSPI to build one or multiple customizable and private virtual network(s) referred to as virtual cloud networks (VCNs). A customer can deploy one or more customer resources, such as compute instances, on a customer VCN. Compute instances can take the form of virtual machines, bare metal instances, and the like. The CSPI thus provides infrastructure and a set of complementary cloud services that enable customers to build and run a wide range of applications and services in a highly available virtual hosted environment. The customer does not manage or control the underlying physical resources provided by CSPI but has control over operating systems, storage, and deployed applications; and possibly limited control of select networking components (e.g., firewalls).

The CSP may provide a console that enables customers and network administrators to configure, access, and manage resources deployed in the cloud using CSPI resources. In certain embodiments, the console provides a web-based user interface that can be used to access and manage CSPI. In some implementations, the console is a web-based application provided by the CSP.

CSPI may support single-tenancy or multi-tenancy architectures. In a single tenancy architecture, a software (e.g., an application, a database) or a hardware component (e.g., a host machine or a server) serves a single customer or tenant. In a multi-tenancy architecture, a software or a hardware component serves multiple customers or tenants. Thus, in a multi-tenancy architecture, CSPI resources are shared between multiple customers or tenants. In a multi-tenancy situation, precautions are taken and safeguards put in place within CSPI to ensure that each tenant's data is isolated and remains invisible to other tenants.

In a physical network, a network endpoint ("endpoint") refers to a computing device or system that is connected to a physical network and communicates back and forth with the network to which it is connected. A network endpoint in the physical network may be connected to a Local Area Network (LAN), a Wide Area Network (WAN), or other type of physical network. Examples of traditional endpoints in a physical network include modems, hubs, bridges, switches, routers, and other networking devices, physical computers (or host machines), and the like. Each physical device in the physical network has a fixed network address that can be used to communicate with the device. This fixed network address can be a Layer-2 address (e.g., a MAC address), a fixed Layer-3 address (e.g., an IP address), and the like. In a virtualized environment or in a virtual network, the endpoints can include various virtual endpoints such as virtual machines that are hosted by components of the physical network (e.g., hosted by physical host machines). These endpoints in the virtual network are addressed by overlay addresses such as overlay Layer-2 addresses (e.g., overlay MAC addresses) and overlay Layer-3 addresses (e.g., overlay IP addresses). Network overlays enable flexibility by allowing network managers to move around the overlay addresses associated with network endpoints using software management (e.g., via software implementing a control plane for the virtual network). Accordingly, unlike in a physical network, in a virtual network, an overlay address (e.g., an overlay IP address) can be moved from one endpoint to another using network management software. Since the virtual network is built on top of a physical network, communications between components in the virtual network involves both the virtual network and the underlying physical network. In order to facilitate such communications, the components of CSPI are configured to learn and store mappings that map overlay addresses in the virtual network to actual physical addresses in the substrate network, and vice versa. These mappings are then used to facilitate the communications. Customer traffic is encapsulated to facilitate routing in the virtual network.

Accordingly, physical addresses (e.g., physical IP addresses) are associated with components in physical networks and overlay addresses (e.g., overlay IP addresses) are associated with entities in virtual or overlay networks. A physical IP address is an IP address associated with a physical device (e.g., a network device) in the substrate or physical network. For example, each NVD has an associated physical IP address. An overlay IP address is an overlay address associated with an entity in an overlay network, such as with a compute instance in a customer's virtual cloud network (VCN). Two different customers or tenants, each with their own private VCNs can potentially use the same overlay IP address in their VCNs without any knowledge of each other. Both the physical IP addresses and overlay IP addresses are types of real IP addresses. These are separate from virtual IP addresses. A virtual IP address is typically a single IP address that is represents or maps to multiple real IP addresses. A virtual IP address provides a 1-to-many mapping between the virtual IP address and multiple real IP addresses. For example, a load balancer may use a VIP to map to or represent multiple servers, each server having its own real IP address.

The cloud infrastructure or CSPI is physically hosted in one or more data centers in one or more regions around the world. The CSPI may include components in the physical or substrate network and virtualized components (e.g., virtual networks, compute instances, virtual machines, etc.) that are in an virtual network built on top of the physical network components. In certain embodiments, the CSPI is organized and hosted in realms, regions and availability domains. A region is typically a localized geographic area that contains one or more data centers. Regions are generally independent of each other and can be separated by vast distances, for example, across countries or even continents. For example, a first region may be in Australia, another one in Japan, yet another one in India, and the like. CSPI resources are divided among regions such that each region has its own independent subset of CSPI resources. Each region may provide a set of core infrastructure services and resources, such as, compute resources (e.g., bare metal servers, virtual machine, containers and related infrastructure, etc.); storage resources (e.g., block volume storage, file storage, object storage, archive storage); networking resources (e.g., virtual cloud networks (VCNs), load balancing resources, connections to on-premise networks), database resources; edge networking resources (e.g., DNS); and access management and monitoring resources, and others. Each region generally has multiple paths connecting it to other regions in the realm.

Generally, an application is deployed in a region (i.e., deployed on infrastructure associated with that region) where it is most heavily used, because using nearby resources is faster than using distant resources. Applications can also be deployed in different regions for various reasons, such as redundancy to mitigate the risk of region-wide events such as large weather systems or earthquakes, to meet varying requirements for legal jurisdictions, tax domains, and other business or social criteria, and the like.

The data centers within a region can be further organized and subdivided into availability domains (ADs). An availability domain may correspond to one or more data centers located within a region. A region can be composed of one or more availability domains. In such a distributed environment, CSPI resources are either region-specific, such as a virtual cloud network (VCN), or availability domain-specific, such as a compute instance.

ADs within a region are isolated from each other, fault tolerant, and are configured such that they are very unlikely to fail simultaneously. This is achieved by the ADs not sharing critical infrastructure resources such as networking, physical cables, cable paths, cable entry points, etc., such that a failure at one AD within a region is unlikely to impact the availability of the other ADs within the same region. The ADs within the same region may be connected to each other by a low latency, high bandwidth network, which makes it possible to provide high-availability connectivity to other networks (e.g., the Internet, customers' on-premise networks, etc.) and to build replicated systems in multiple ADs for both high-availability and disaster recovery. Cloud services use multiple ADs to ensure high availability and to protect against resource failure. As the infrastructure provided by the IaaS provider grows, more regions and ADs may be added with additional capacity. Traffic between availability domains is usually encrypted.

In certain embodiments, regions are grouped into realms. A realm is a logical collection of regions. Realms are isolated from each other and do not share any data. Regions in the same realm may communicate with each other, but regions in different realms cannot. A customer's tenancy or account with the CSP exists in a single realm and can be spread across one or more regions that belong to that realm. Typically, when a customer subscribes to an IaaS service, a tenancy or account is created for that customer in the customer-specified region (referred to as the "home" region) within a realm. A customer can extend the customer's tenancy across one or more other regions within the realm. A customer cannot access regions that are not in the realm where the customer's tenancy exists.

An IaaS provider can provide multiple realms, each realm catered to a particular set of customers or users. For example, a commercial realm may be provided for commercial customers. As another example, a realm may be provided for a specific country for customers within that country. As yet another example, a government realm may be provided for a government, and the like. For example, the government realm may be catered for a specific government and may have a heightened level of security than a commercial realm. For example, Oracle Cloud Infrastructure (OCI) currently offers a realm for commercial regions and two realms (e.g., FedRAMP authorized and IL5 authorized) for government cloud regions.

In certain embodiments, an AD can be subdivided into one or more fault domains. A fault domain is a grouping of infrastructure resources within an AD to provide anti-affinity. Fault domains allow for the distribution of compute instances such that the instances are not on the same physical hardware within a single AD. This is known as anti-affinity. A fault domain refers to a set of hardware components (computers, switches, and more) that share a single point of failure. A compute pool is logically divided up into fault domains. Due to this, a hardware failure or compute hardware maintenance event that affects one fault domain does not affect instances in other fault domains. Depending on the embodiment, the number of fault domains for each AD may vary. For instance, in certain embodiments each AD contains three fault domains. A fault domain acts as a logical data center within an AD.

When a customer subscribes to an IaaS service, resources from CSPI are provisioned for the customer and associated with the customer's tenancy. The customer can use these provisioned resources to build private networks and deploy resources on these networks. The customer networks that are hosted in the cloud by the CSPI are referred to as virtual cloud networks (VCNs). A customer can set up one or more virtual cloud networks (VCNs) using CSPI resources allocated for the customer. A VCN is a virtual or software defined private network. The customer resources that are deployed in the customer's VCN can include compute instances (e.g., virtual machines, bare-metal instances) and other resources. These compute instances may represent various customer workloads such as applications, load balancers, databases, and the like. A compute instance deployed on a VCN can communicate with public accessible endpoints ("public endpoints") over a public network such as the Internet, with other instances in the same VCN or other VCNs (e.g., the customer's other VCNs, or VCNs not belonging to the customer), with the customer's on-premise data centers or networks, and with service endpoints, and other types of endpoints.

The CSP may provide various services using the CSPI. In some instances, customers of CSPI may themselves act like service providers and provide services using CSPI resources. A service provider may expose a service endpoint, which is characterized by identification information (e.g., an IP Address, a DNS name and port). A customer's resource (e.g., a compute instance) can consume a particular service by accessing a service endpoint exposed by the service for that particular service. These service endpoints are generally endpoints that are publicly accessible by users using public IP addresses associated with the endpoints via a public communication network such as the Internet. Network endpoints that are publicly accessible are also sometimes referred to as public endpoints.

In certain embodiments, a service provider may expose a service via an endpoint (sometimes referred to as a service endpoint) for the service. Customers of the service can then use this service endpoint to access the service. In certain implementations, a service endpoint provided for a service can be accessed by multiple customers that intend to consume that service. In other implementations, a dedicated service endpoint may be provided for a customer such that only that customer can access the service using that dedicated service endpoint.

In certain embodiments, when a VCN is created, it is associated with a private overlay Classless Inter-Domain Routing (CIDR) address space, which is a range of private overlay IP addresses that are assigned to the VCN (e.g., 10.0/16). A VCN includes associated subnets, route tables, and gateways. A VCN resides within a single region but can span one or more or all of the region's availability domains. A gateway is a virtual interface that is configured for a VCN and enables communication of traffic to and from the VCN to one or more endpoints outside the VCN. One or more different types of gateways may be configured for a VCN to enable communication to and from different types of endpoints.

A VCN can be subdivided into one or more sub-networks such as one or more subnets. A subnet is thus a unit of configuration or a subdivision that can be created within a VCN. A VCN can have one or multiple subnets. Each subnet within a VCN is associated with a contiguous range of overlay IP addresses (e.g., 10.0.0.0/24 and 10.0.1.0/24) that do not overlap with other subnets in that VCN and which represent an address space subset within the address space of the VCN.

Each compute instance is associated with a virtual network interface card (VNIC), that enables the compute instance to participate in a subnet of a VCN. A VNIC is a logical representation of physical Network Interface Card (NIC). In general. a VNIC is an interface between an entity (e.g., a compute instance, a service) and a virtual network. A VNIC exists in a subnet, has one or more associated IP addresses, and associated security rules or policies. A VNIC is equivalent to a Layer-2 port on a switch. A VNIC is attached to a compute instance and to a subnet within a VCN. A VNIC associated with a compute instance enables the compute instance to be a part of a subnet of a VCN and enables the compute instance to communicate (e.g., send and receive packets) with endpoints that are on the same subnet as the compute instance, with endpoints in different subnets in the VCN, or with endpoints outside the VCN. The VNIC associated with a compute instance thus determines how the compute instance connects with endpoints inside and outside the VCN. A VNIC for a compute instance is created and associated with that compute instance when the compute instance is created and added to a subnet within a VCN. For a subnet comprising a set of compute instances, the subnet contains the VNICs corresponding to the set of compute instances, each VNIC attached to a compute instance within the set of computer instances.

Each compute instance is assigned a private overlay IP address via the VNIC associated with the compute instance. This private overlay IP address is assigned to the VNIC that is associated with the compute instance when the compute instance is created and used for routing traffic to and from the compute instance. All VNICs in a given subnet use the same route table, security lists, and DHCP options. As described above, each subnet within a VCN is associated with a contiguous range of overlay IP addresses (e.g., 10.0.0.0/24 and 10.0.1.0/24) that do not overlap with other subnets in that VCN and which represent an address space subset within the address space of the VCN. For a VNIC on a particular subnet of a VCN, the private overlay IP address that is assigned to the VNIC is an address from the contiguous range of overlay IP addresses allocated for the subnet.

In certain embodiments, a compute instance may optionally be assigned additional overlay IP addresses in addition to the private overlay IP address, such as, for example, one or more public IP addresses if in a public subnet. These multiple addresses are assigned either on the same VNIC or over multiple VNICs that are associated with the compute instance. Each instance however has a primary VNIC that is created during instance launch and is associated with the overlay private IP address assigned to the instance—this primary VNIC cannot be removed. Additional VNICs, referred to as secondary VNICs, can be added to an existing instance in the same availability domain as the primary VNIC. All the VNICs are in the same availability domain as the instance. A secondary VNIC can be in a subnet in the same VCN as the primary VNIC, or in a different subnet that is either in the same VCN or a different one.

A compute instance may optionally be assigned a public IP address if it is in a public subnet. A subnet can be designated as either a public subnet or a private subnet at the time the subnet is created. A private subnet means that the resources (e.g., compute instances) and associated VNICs in the subnet cannot have public overlay IP addresses. A public subnet means that the resources and associated VNICs in the subnet can have public IP addresses. A customer can designate a subnet to exist either in a single availability domain or across multiple availability domains in a region or realm.

As described above, a VCN may be subdivided into one or more subnets. In certain embodiments, a Virtual Router (VR) configured for the VCN (referred to as the VCN VR or just VR) enables communications between the subnets of the VCN. For a subnet within a VCN, the VR represents a logical gateway for that subnet that enables the subnet (i.e., the compute instances on that subnet) to communicate with endpoints on other subnets within the VCN, and with other endpoints outside the VCN. The VCN VR is a logical entity that is configured to route traffic between VNICs in the VCN and virtual gateways ("gateways") associated with the VCN. Gateways are further described below with respect to FIG. 1. A VCN VR is a Layer-3/IP Layer concept. In one embodiment, there is one VCN VR for a VCN where the VCN VR has potentially an unlimited number of ports addressed by IP addresses, with one port for each subnet of the VCN. In this manner, the VCN VR has a different IP address for each subnet in the VCN that the VCN VR is attached to. The VR is also connected to the various gateways configured for a VCN. In certain embodiments, a particular overlay IP address from the overlay IP address range for a subnet is reserved for a port of the VCN VR for that subnet. For example, consider a VCN having two subnets with associated address ranges 10.0/16 and 10.1/16, respectively. For the first subnet within the VCN with address range 10.0/16, an address from this range is reserved for a port of the VCN VR for that subnet. In some instances, the first IP address from the range may be reserved for the VCN VR. For example, for the subnet with overlay IP address range 10.0/16, IP address 10.0.0.1 may be reserved for a port of the VCN VR for that subnet. For the second subnet within the same VCN with address range 10.1/16, the VCN VR may have a port for that second subnet with IP address 10.1.0.1. The VCN VR has a different IP address for each of the subnets in the VCN.

In some other embodiments, each subnet within a VCN may have its own associated VR that is addressable by the subnet using a reserved or default IP address associated with the VR. The reserved or default IP address may, for example, be the first IP address from the range of IP addresses associated with that subnet. The VNICs in the subnet can communicate (e.g., send and receive packets) with the VR associated with the subnet using this default or reserved IP address. In such an embodiment, the VR is the ingress/egress point for that subnet. The VR associated with a subnet within the VCN can communicate with other VRs associated with other subnets within the VCN. The VRs can also communicate with gateways associated with the VCN. The VR function for a subnet is running on or executed by one or more NVDs executing VNICs functionality for VNICs in the subnet.

Route tables, security rules, and DHCP options may be configured for a VCN. Route tables are virtual route tables for the VCN and include rules to route traffic from subnets within the VCN to destinations outside the VCN by way of gateways or specially configured instances. A VCN's route tables can be customized to control how packets are forwarded/routed to and from the VCN. DHCP options refers to configuration information that is automatically provided to the instances when they boot up.

Security rules configured for a VCN represent overlay firewall rules for the VCN. The security rules can include ingress and egress rules, and specify the types of traffic (e.g., based upon protocol and port) that is allowed in and out of the instances within the VCN. The customer can choose whether a given rule is stateful or stateless. For instance, the customer can allow incoming SSH traffic from anywhere to a set of instances by setting up a stateful ingress rule with source CIDR 0.0.0.0/0, and destination TCP port 22. Security rules can be implemented using network security groups or security lists. A network security group consists of a set of security rules that apply only to the resources in that group. A security list, on the other hand, includes rules that apply to all the resources in any subnet that uses the security list. A VCN may be provided with a default security list with default security rules. DHCP options configured for a VCN provide configuration information that is automatically provided to the instances in the VCN when the instances boot up.

In certain embodiments, the configuration information for a VCN is determined and stored by a VCN Control Plane. The configuration information for a VCN may include, for example, information about: the address range associated with the VCN, subnets within the VCN and associated information, one or more VRs associated with the VCN, compute instances in the VCN and associated VNICs, NVDs executing the various virtualization network functions (e.g., VNICs, VRs, gateways) associated with the VCN, state information for the VCN, and other VCN-related information. In certain embodiments, a VCN Distribution Service publishes the configuration information stored by the VCN Control Plane, or portions thereof, to the NVDs. The distributed information may be used to update information (e.g., forwarding tables, routing tables, etc.) stored and used by the NVDs to forward packets to and from the compute instances in the VCN.

In certain embodiments, the creation of VCNs and subnets are handled by a VCN Control Plane (CP) and the launching of compute instances is handled by a Compute Control Plane. The Compute Control Plane is responsible for allocating the physical resources for the compute instance and then calls the VCN Control Plane to create and attach VNICs to the compute instance. The VCN CP also sends VCN data mappings to the VCN data plane that is configured to perform packet forwarding and routing functions. In certain embodiments, the VCN CP provides a distribution service that is responsible for providing updates to the VCN data plane. Examples of a VCN Control Plane are also depicted in FIGS. 21, 22, 23, and 24 (see references 2116, 2216, 2316, and 2416) and described below.

A customer may create one or more VCNs using resources hosted by CSPI. A compute instance deployed on a customer VCN may communicate with different endpoints. These endpoints can include endpoints that are hosted by CSPI and endpoints outside CSPI.

Various different architectures for implementing cloud-based service using CSPI are depicted in FIGS. 1, 2, 3, 4, 5, 21, 22, 23, and 25, and are described below. FIG. 1 is a high level diagram of a distributed environment 100 showing an overlay or customer VCN hosted by CSPI according to certain embodiments. The distributed environment depicted in FIG. 1 includes multiple components in the overlay network. Distributed environment 100 depicted in FIG. 1 is merely an example and is not intended to unduly limit the scope of claimed embodiments. Many variations, alternatives, and modifications are possible. For example, in some implementations, the distributed environment depicted in FIG. 1 may have more or fewer systems or components than those shown in FIG. 1, may combine two or more systems, or may have a different configuration or arrangement of systems.

As shown in the example depicted in FIG. 1, distributed environment 100 comprises CSPI 101 that provides services and resources that customers can subscribe to and use to build their virtual cloud networks (VCNs). In certain embodiments, CSPI 101 offers IaaS services to subscribing customers. The data centers within CSPI 101 may be organized into one or more regions. One example region "Region US" 102 is shown in FIG. 1. A customer has configured a customer VCN 104 for region 102. The customer may deploy various compute instances on VCN 104, where the compute instances may include virtual machines or bare metal instances. Examples of instances include applications, database, load balancers, and the like.

In the embodiment depicted in FIG. 1, customer VCN 104 comprises two subnets, namely, "Subnet-1" and "Subnet-2", each subnet with its own CIDR IP address range. In FIG. 1, the overlay IP address range for Subnet-1 is 10.0/16 and the address range for Subnet-2 is 10.1/16. A VCN Virtual Router 105 represents a logical gateway for the VCN that enables communications between subnets of the VCN 104, and with other endpoints outside the VCN. VCN VR 105 is configured to route traffic between VNICs in VCN 104 and gateways associated with VCN 104. VCN VR 105 provides a port for each subnet of VCN 104. For example, VR 105 may provide a port with IP address 10.0.0.1 for Subnet-1 and a port with IP address 10.1.0.1 for Subnet-2.

Multiple compute instances may be deployed on each subnet, where the compute instances can be virtual machine instances, and/or bare metal instances. The compute instances in a subnet may be hosted by one or more host machines within CSPI 101. A compute instance participates in a subnet via a VNIC associated with the compute instance. For example, as shown in FIG. 1, a compute instance C1 is part of Subnet-1 via a VNIC associated with the compute instance. Likewise, compute instance C2 is part of Subnet-1 via a VNIC associated with C2. In a similar manner, multiple compute instances, which may be virtual machine instances or bare metal instances, may be part of Subnet-1. Via its associated VNIC, each compute instance is assigned a private overlay IP address and a MAC address. For example, in FIG. 1, compute instance C1 has an overlay IP address of 10.0.0.2 and a MAC address of M1, while compute instance C2 has an private overlay IP address of 10.0.0.3 and a MAC address of M2. Each compute instance in Subnet-1, including compute instances C1 and C2, has a default route to VCN VR 105 using IP address 10.0.0.1, which is the IP address for a port of VCN VR 105 for Subnet-1.

Subnet-2 can have multiple compute instances deployed on it, including virtual machine instances and/or bare metal instances. For example, as shown in FIG. 1, compute instances D1 and D2 are part of Subnet-2 via VNICs associated with the respective compute instances. In the embodiment depicted in FIG. 1, compute instance D1 has an overlay IP address of 10.1.0.2 and a MAC address of MM1, while compute instance D2 has an private overlay IP address of 10.1.0.3 and a MAC address of MM2. Each compute instance in Subnet-2, including compute instances D1 and D2, has a default route to VCN VR 105 using IP address 10.1.0.1, which is the IP address for a port of VCN VR 105 for Subnet-2.

VCN A 104 may also include one or more load balancers. For example, a load balancer may be provided for a subnet and may be configured to load balance traffic across multiple compute instances on the subnet. A load balancer may also be provided to load balance traffic across subnets in the VCN.

A particular compute instance deployed on VCN 104 can communicate with various different endpoints. These endpoints may include endpoints that are hosted by CSPI 200 and endpoints outside CSPI 200. Endpoints that are hosted by CSPI 101 may include: an endpoint on the same subnet as the particular compute instance (e.g., communications between two compute instances in Subnet-1); an endpoint on a different subnet but within the same VCN (e.g., communication between a compute instance in Subnet-1 and a compute instance in Subnet-2); an endpoint in a different VCN in the same region (e.g., communications between a compute instance in Subnet-1 and an endpoint in a VCN in the same region 106 or 110, communications between a compute instance in Subnet-1 and an endpoint in service network 110 in the same region); or an endpoint in a VCN in a different region (e.g., communications between a compute instance in Subnet-1 and an endpoint in a VCN in a different region 108). A compute instance in a subnet hosted by CSPI 101 may also communicate with endpoints that are not hosted by CSPI 101 (i.e., are outside CSPI 101). These outside endpoints include endpoints in the customer's on-premise network 116, endpoints within other remote cloud hosted networks 118, public endpoints 114 accessible via a public network such as the Internet, and other endpoints.

Communications between compute instances on the same subnet are facilitated using VNICs associated with the source compute instance and the destination compute instance. For example, compute instance C1 in Subnet-1 may want to send packets to compute instance C2 in Subnet-1. For a packet originating at a source compute instance and whose destination is another compute instance in the same subnet, the packet is first processed by the VNIC associated with the source compute instance. Processing performed by the VNIC associated with the source compute instance can include determining destination information for the packet from the packet headers, identifying any policies (e.g., security lists) configured for the VNIC associated with the source compute instance, determining a next hop for the packet, performing any packet encapsulation/decapsulation functions as needed, and then forwarding/routing the packet to the next hop with the goal of facilitating communication of the packet to its intended destination. When the destination compute instance is in the same subnet as the source compute instance, the VNIC associated with the source compute instance is configured to identify the VNIC associated with the destination compute instance and forward the packet to that VNIC for processing. The VNIC associated with the destination compute instance is then executed and forwards the packet to the destination compute instance.

For a packet to be communicated from a compute instance in a subnet to an endpoint in a different subnet in the same VCN, the communication is facilitated by the VNICs associated with the source and destination compute instances and the VCN VR. For example, if compute instance C1 in Subnet-1 in FIG. 1 wants to send a packet to compute instance D1 in Subnet-2, the packet is first processed by the VNIC associated with compute instance C1. The VNIC associated with compute instance C1 is configured to route the packet to the VCN VR 105 using default route or port 10.0.0.1 of the VCN VR. VCN VR 105 is configured to route the packet to Subnet-2 using port 10.1.0.1. The packet is then received and processed by the VNIC associated with D1 and the VNIC forwards the packet to compute instance D1.

For a packet to be communicated from a compute instance in VCN 104 to an endpoint that is outside VCN 104, the communication is facilitated by the VNIC associated with the source compute instance, VCN VR 105, and gateways associated with VCN 104. One or more types of gateways may be associated with VCN 104. A gateway is an interface between a VCN and another endpoint, where the another endpoint is outside the VCN. A gateway is a Layer-3/IP layer concept and enables a VCN to communicate with endpoints outside the VCN. A gateway thus facilitates traffic flow between a VCN and other VCNs or networks. Various different types of gateways may be configured for a VCN to facilitate different types of communications with different types of endpoints. Depending upon the gateway, the communications may be over public networks (e.g., the Internet) or over private networks. Various communication protocols may be used for these communications.

For example, compute instance C1 may want to communicate with an endpoint outside VCN 104. The packet may be first processed by the VNIC associated with source compute instance C1. The VNIC processing determines that the destination for the packet is outside the Subnet-1 of C1. The VNIC associated with C1 may forward the packet to VCN VR 105 for VCN 104. VCN VR 105 then processes the packet and as part of the processing, based upon the destination for the packet, determines a particular gateway associated with VCN 104 as the next hop for the packet. VCN VR 105 may then forward the packet to the particular identified gateway. For example, if the destination is an endpoint within the customer's on-premise network, then the packet may be forwarded by VCN VR 105 to Dynamic Routing Gateway (DRG) gateway 122 configured for VCN 104. The packet may then be forwarded from the gateway to a next hop to facilitate communication of the packet to it final intended destination.

Various different types of gateways may be configured for a VCN. Examples of gateways that may be configured for a VCN are depicted in FIG. 1 and described below. Examples of gateways associated with a VCN are also depicted in FIGS. 21, 22, 23, and 24 (for example, gateways referenced by reference numbers 2134, 2136, 2138, 2234, 2236, 2238, 2334, 2336, 2338, 2434, 2436, and 2438) and described below. As shown in the embodiment depicted in FIG. 1, a Dynamic Routing Gateway (DRG) 122 may be added to or be associated with customer VCN 104 and provides a path for private network traffic communication between customer VCN 104 and another endpoint, where the another endpoint can be the customer's on-premise network 116, a VCN 108 in a different region of CSPI 101, or other remote cloud networks 118 not hosted by CSPI 101. Customer on-premise network 116 may be a customer network or a customer data center built using the customer's resources. Access to customer on-premise network 116 is generally very restricted. For a customer that has both a customer on-premise network 116 and one or more VCNs 104 deployed or hosted in the cloud by CSPI 101, the customer may want their on-premise network 116 and their cloud-based VCN 104 to be able to communicate with each other. This enables a customer to build an extended hybrid environment encompassing the customer's VCN 104 hosted by CSPI 101 and their on-premises network 116. DRG 122 enables this communication. To enable such communications, a communication channel 124 is set up where one endpoint of the channel is in customer on-premise network 116 and the other endpoint is in CSPI 101 and connected to customer VCN 104. Communication channel 124 can be over public communication networks such as the Internet or private communication networks. Various different communication protocols may be used such as IPsec VPN technology over a public communication network such as the Internet, Oracle's Fast-Connect technology that uses a private network instead of a public network, and others. The device or equipment in customer on-premise network 116 that forms one end point for communication channel 124 is referred to as the customer premise equipment (CPE), such as CPE 126 depicted in FIG. 1. On the CSPI 101 side, the endpoint may be a host machine executing DRG 122.

In certain embodiments, a Remote Peering Connection (RPC) can be added to a DRG, which allows a customer to peer one VCN with another VCN in a different region. Using such an RPC, customer VCN 104 can use DRG 122 to connect with a VCN 108 in another region. DRG 122 may also be used to communicate with other remote cloud networks 118, not hosted by CSPI 101 such as a Microsoft Azure cloud, Amazon AWS cloud, and others.

As shown in FIG. 1, an Internet Gateway (IGW) 120 may be configured for customer VCN 104 the enables a compute instance on VCN 104 to communicate with public endpoints 114 accessible over a public network such as the Internet. IGW 120 is a gateway that connects a VCN to a public network such as the Internet. IGW 120 enables a public subnet (where the resources in the public subnet have public overlay IP addresses) within a VCN, such as VCN 104, direct access to public endpoints 112 on a public network 114 such as the Internet. Using IGW 120, connections can be initiated from a subnet within VCN 104 or from the Internet.

A Network Address Translation (NAT) gateway 128 can be configured for customer's VCN 104 and enables cloud resources in the customer's VCN, which do not have dedicated public overlay IP addresses, access to the Internet and it does so without exposing those resources to direct incoming Internet connections (e.g., L4-L7 connections). This enables a private subnet within a VCN, such as private Subnet-1 in VCN 104, with private access to public endpoints on the Internet. In NAT gateways, connections can be initiated only from the private subnet to the public Internet and not from the Internet to the private subnet.

In certain embodiments, a Service Gateway (SGW) 126 can be configured for customer VCN 104 and provides a path for private network traffic between VCN 104 and supported services endpoints in a service network 110. In certain embodiments, service network 110 may be provided by the CSP and may provide various services. An example of such a service network is Oracle's Services Network, which provides various services that can be used by customers. For example, a compute instance (e.g., a database system) in a private subnet of customer VCN 104 can back up data to a service endpoint (e.g., Object Storage) without needing public IP addresses or access to the Internet. In certain embodiments, a VCN can have only one SGW, and connections can only be initiated from a subnet within the VCN and not from service network 110. If a VCN is peered with another, resources in the other VCN typically cannot access the SGW. Resources in on-premises networks that are connected to a VCN with FastConnect or VPN Connect can also use the service gateway configured for that VCN.

In certain implementations, SGW 126 uses the concept of a service Classless Inter-Domain Routing (CIDR) label, which is a string that represents all the regional public IP address ranges for the service or group of services of interest. The customer uses the service CIDR label when they configure the SGW and related route rules to control traffic to the service. The customer can optionally utilize it when configuring security rules without needing to adjust them if the service's public IP addresses change in the future.

A Local Peering Gateway (LPG) 132 is a gateway that can be added to customer VCN 104 and enables VCN 104 to peer with another VCN in the same region. Peering means that the VCNs communicate using private IP addresses, without the traffic traversing a public network such as the Internet or without routing the traffic through the customer's on-premises network 116. In preferred embodiments, a VCN has a separate LPG for each peering it establishes. Local Peering or VCN Peering is a common practice used to establish network connectivity between different applications or infrastructure management functions.

Service providers, such as providers of services in service network 110, may provide access to services using different access models. According to a public access model, services may be exposed as public endpoints that are publicly accessible by compute instance in a customer VCN via a public network such as the Internet and or may be privately accessible via SGW 126. According to a specific private access model, services are made accessible as private IP endpoints in a private subnet in the customer's VCN. This is referred to as a Private Endpoint (PE) access and enables a service provider to expose their service as an instance in the customer's private network. A Private Endpoint resource represents a service within the customer's VCN. Each PE manifests as a VNIC (referred to as a PE-VNIC, with one or more private IPs) in a subnet chosen by the customer in the customer's VCN. A PE thus provides a way to present a service within a private customer VCN subnet using a VNIC. Since the endpoint is exposed as a VNIC, all the features associates with a VNIC such as routing rules, security lists, etc., are now available for the PE VNIC.

A service provider can register their service to enable access through a PE. The provider can associate policies with the service that restricts the service's visibility to the customer tenancies. A provider can register multiple services under a single virtual IP address (VIP), especially for multi-tenant services. There may be multiple such private endpoints (in multiple VCNs) that represent the same service.

Compute instances in the private subnet can then use the PE VNIC's private IP address or the service DNS name to access the service. Compute instances in the customer VCN can access the service by sending traffic to the private IP address of the PE in the customer VCN. A Private Access Gateway (PAGW) 130 is a gateway resource that can be attached to a service provider VCN (e.g., a VCN in service network 110) that acts as an ingress/egress point for all traffic from/to customer subnet private endpoints. PAGW 130 enables a provider to scale the number of PE connections without utilizing its internal IP address resources. A provider needs only configure one PAGW for any number of services registered in a single VCN. Providers can represent a service as a private endpoint in multiple VCNs of one or more customers. From the customer's perspective, the PE VNIC, which, instead of being attached to a customer's instance, appears attached to the service with which the customer wishes to interact. The traffic destined to the private endpoint is routed via PAGW 130 to the service. These are referred to as customer-to-service private connections (C2S connections).

The PE concept can also be used to extend the private access for the service to customer's on-premises networks and data centers, by allowing the traffic to flow through FastConnect/IPsec links and the private endpoint in the customer VCN. Private access for the service can also be extended to the customer's peered VCNs, by allowing the traffic to flow between LPG 132 and the PE in the customer's VCN.

A customer can control routing in a VCN at the subnet level, so the customer can specify which subnets in the customer's VCN, such as VCN 104, use each gateway. A VCN's route tables are used to decide if traffic is allowed out of a VCN through a particular gateway. For example, in a particular instance, a route table for a public subnet within customer VCN 104 may send non-local traffic through IGW 120. The route table for a private subnet within the same customer VCN 104 may send traffic destined for CSP services through SGW 126. All remaining traffic may be sent via the NAT gateway 128. Route tables only control traffic going out of a VCN.

Security lists associated with a VCN are used to control traffic that comes into a VCN via a gateway via inbound connections. All resources in a subnet use the same route table and security lists. Security lists may be used to control specific types of traffic allowed in and out of instances in a subnet of a VCN. Security list rules may comprise ingress (inbound) and egress (outbound) rules. For example, an ingress rule may specify an allowed source address range, while an egress rule may specify an allowed destination address range. Security rules may specify a particular protocol (e.g., TCP, ICMP), a particular port (e.g., 22 for SSH, 3389 for Windows RDP), etc. In certain implementations, an instance's operating system may enforce its own firewall rules that are aligned with the security list rules. Rules may be stateful (e.g., a connection is tracked and the response is automatically allowed without an explicit security list rule for the response traffic) or stateless.

Access from a customer VCN (i.e., by a resource or compute instance deployed on VCN 104) can be categorized as public access, private access, or dedicated access. Public access refers to an access model where a public IP address or a NAT is used to access a public endpoint. Private access enables customer workloads in VCN 104 with private IP addresses (e.g., resources in a private subnet) to access services without traversing a public network such as the Internet. In certain embodiments, CSPI 101 enables customer VCN workloads with private IP addresses to access the (public service endpoints of) services using a service gateway. A service gateway thus offers a private access model by establishing a virtual link between the customer's VCN and the service's public endpoint residing outside the customer's private network.

Additionally, CSPI may offer dedicated public access using technologies such as FastConnect public peering where customer on-premises instances can access one or more services in a customer VCN using a FastConnect connection and without traversing a public network such as the Internet. CSPI also may also offer dedicated private access using FastConnect private peering where customer on-premises instances with private IP addresses can access the customer's VCN workloads using a FastConnect connection. FastConnect is a network connectivity alternative to using the public Internet to connect a customer's on-premise network to CSPI and its services. FastConnect provides an easy, elastic, and economical way to create a dedicated and private connection with higher bandwidth options and a more reliable and consistent networking experience when compared to Internet-based connections.

Figure 2:
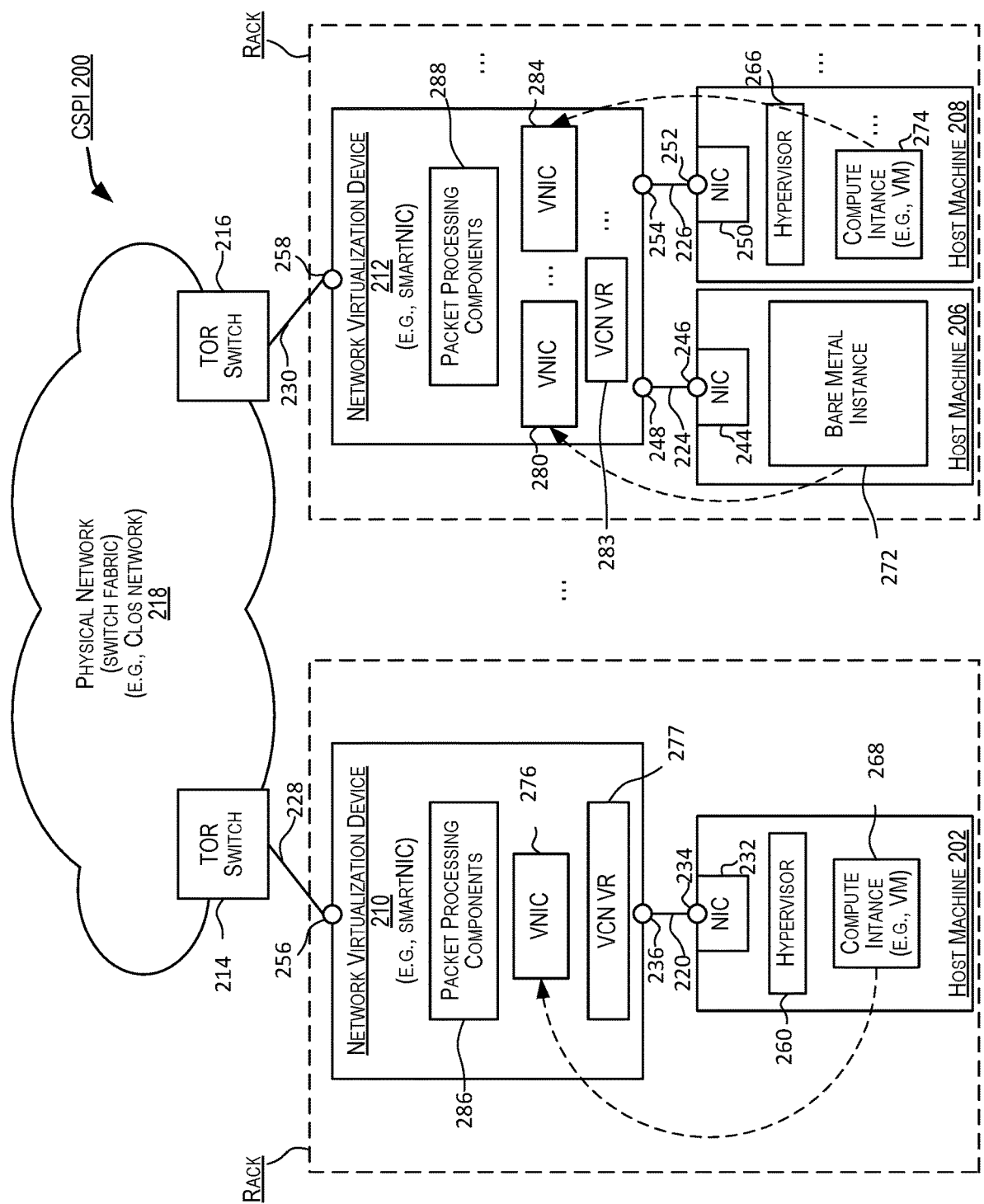
FIG. 2 depicts a simplified architectural diagram of the physical components in the physical network within CSPI according to certain embodiments.

FIG. 1 and the accompanying description above describes various virtualized components in an example virtual network. As described above, the virtual network is built on the underlying physical or substrate network. FIG. 2 depicts a simplified architectural diagram of the physical components in the physical network within CSPI 200 that provide the underlay for the virtual network according to certain embodiments. As shown, CSPI 200 provides a distributed environment comprising components and resources (e.g., compute, memory, and networking resources) provided by a cloud service provider (CSP). These components and resources are used to provide cloud services (e.g., IaaS services) to subscribing customers, i.e., customers that have subscribed to one or more services provided by the CSP. Based upon the services subscribed to by a customer, a subset of resources (e.g., compute, memory, and networking resources) of CSPI 200 are provisioned for the customer. Customers can then build their own cloud-based (i.e., CSPI-hosted) customizable and private virtual networks using physical compute, memory, and networking resources provided by CSPI 200. As previously indicated, these customer networks are referred to as virtual cloud networks (VCNs). A customer can deploy one or more customer resources, such as compute instances, on these customer VCNs. Compute instances can be in the form of virtual machines, bare metal instances, and the like. CSPI 200 provides infrastructure and a set of complementary cloud services that enable customers to build and run a wide range of applications and services in a highly available hosted environment.

In the example embodiment depicted in FIG. 2, the physical components of CSPI 200 include one or more physical host machines or physical servers (e.g., 202, 206, 208), network virtualization devices (NVDs) (e.g., 210, 212), top-of-rack (TOR) switches (e.g., 214, 216), and a physical network (e.g., 218), and switches in physical network 218. The physical host machines or servers may host and execute various compute instances that participate in one or more subnets of a VCN. The compute instances may include virtual machine instances, and bare metal instances. For example, the various compute instances depicted in FIG. 1 may be hosted by the physical host machines depicted in FIG. 2. The virtual machine compute instances in a VCN may be executed by one host machine or by multiple different host machines. The physical host machines may also host virtual host machines, container-based hosts or functions, and the like. The VNICs and VCN VR depicted in FIG. 1 may be executed by the NVDs depicted in FIG. 2. The gateways depicted in FIG. 1 may be executed by the host machines and/or by the NVDs depicted in FIG. 2.

The host machines or servers may execute a hypervisor (also referred to as a virtual machine monitor or VMM) that creates and enables a virtualized environment on the host machines. The virtualization or virtualized environment facilitates cloud-based computing. One or more compute instances may be created, executed, and managed on a host machine by a hypervisor on that host machine. The hypervisor on a host machine enables the physical computing resources of the host machine (e.g., compute, memory, and networking resources) to be shared between the various compute instances executed by the host machine.

For example, as depicted in FIG. 2, host machines 202 and 208 execute hypervisors 260 and 266, respectively. These hypervisors may be implemented using software, firmware, or hardware, or combinations thereof. Typically, a hypervisor is a process or a software layer that sits on top of the host machine's operating system (OS), which in turn executes on the hardware processors of the host machine. The hypervisor provides a virtualized environment by enabling the physical computing resources (e.g., processing resources such as processors/cores, memory resources, networking resources) of the host machine to be shared among the various virtual machine compute instances executed by the host machine. For example, in FIG. 2, hypervisor 260 may sit on top of the OS of host machine 202 and enables the computing resources (e.g., processing, memory, and networking resources) of host machine 202 to be shared between compute instances (e.g., virtual machines) executed by host machine 202. A virtual machine can have its own operating system (referred to as a guest operating system), which may be the same as or different from the OS of the host machine. The operating system of a virtual machine executed by a host machine may be the same as or different from the operating system of another virtual machine executed by the same host machine. A hypervisor thus enables multiple operating systems to be executed alongside each other while sharing the same computing resources of the host machine. The host machines depicted in FIG. 2 may have the same or different types of hypervisors.

A compute instance can be a virtual machine instance or a bare metal instance. In FIG. 2, compute instances 268 on host machine 202 and 274 on host machine 208 are examples of virtual machine instances. Host machine 206 is an example of a bare metal instance that is provided to a customer.

In certain instances, an entire host machine may be provisioned to a single customer, and all of the one or more compute instances (either virtual machines or bare metal instance) hosted by that host machine belong to that same customer. In other instances, a host machine may be shared between multiple customers (i.e., multiple tenants). In such a multi-tenancy scenario, a host machine may host virtual machine compute instances belonging to different customers. These compute instances may be members of different VCNs of different customers. In certain embodiments, a bare metal compute instance is hosted by a bare metal server without a hypervisor. When a bare metal compute instance is provisioned, a single customer or tenant maintains control of the physical CPU, memory, and network interfaces of the host machine hosting the bare metal instance and the host machine is not shared with other customers or tenants.

As previously described, each compute instance that is part of a VCN is associated with a VNIC that enables the compute instance to become a member of a subnet of the VCN. The VNIC associated with a compute instance facilitates the communication of packets or frames to and from the compute instance. A VNIC is associated with a compute instance when the compute instance is created. In certain embodiments, for a compute instance executed by a host machine, the VNIC associated with that compute instance is executed by an NVD connected to the host machine. For example, in FIG. 2, host machine 202 executes a virtual machine compute instance 268 that is associated with VNIC 276, and VNIC 276 is executed by NVD 210 connected to host machine 202. As another example, bare metal instance 272 hosted by host machine 206 is associated with VNIC 280 that is executed by NVD 212 connected to host machine 206. As yet another example, VNIC 284 is associated with compute instance 274 executed by host machine 208, and VNIC 284 is executed by NVD 212 connected to host machine 208.

For compute instances hosted by a host machine, an NVD connected to that host machine also executes VCN VRs corresponding to VCNs of which the compute instances are members. For example, in the embodiment depicted in FIG. 2, NVD 210 executes VCN VR 277 corresponding to the VCN of which compute instance 268 is a member. NVD 212 may also execute one or more VCN VRs 283 corresponding to VCNs corresponding to the compute instances hosted by host machines 206 and 208.

A host machine may include one or more network interface cards (NIC) that enable the host machine to be connected to other devices. A NIC on a host machine may provide one or more ports (or interfaces) that enable the host machine to be communicatively connected to another device. For example, a host machine may be connected to an NVD using one or more ports (or interfaces) provided on the host machine and on the NVD. A host machine may also be connected to other devices such as another host machine.

For example, in FIG. 2, host machine 202 is connected to NVD 210 using link 220 that extends between a port 234 provided by a NIC 232 of host machine 202 and between a port 236 of NVD 210. Host machine 206 is connected to NVD 212 using link 224 that extends between a port 246 provided by a NIC 244 of host machine 206 and between a port 248 of NVD 212. Host machine 208 is connected to NVD 212 using link 226 that extends between a port 252 provided by a NIC 250 of host machine 208 and between a port 254 of NVD 212.

The NVDs are in turn connected via communication links to top-of-the-rack (TOR) switches, which are connected to physical network 218 (also referred to as the switch fabric). In certain embodiments, the links between a host machine and an NVD, and between an NVD and a TOR switch are Ethernet links. For example, in FIG. 2, NVDs 210 and 212 are connected to TOR switches 214 and 216, respectively, using links 228 and 230. In certain embodiments, the links 220, 224, 226, 228, and 230 are Ethernet links. The collection of host machines and NVDs that are connected to a TOR is sometimes referred to as a rack.

Figure 5:
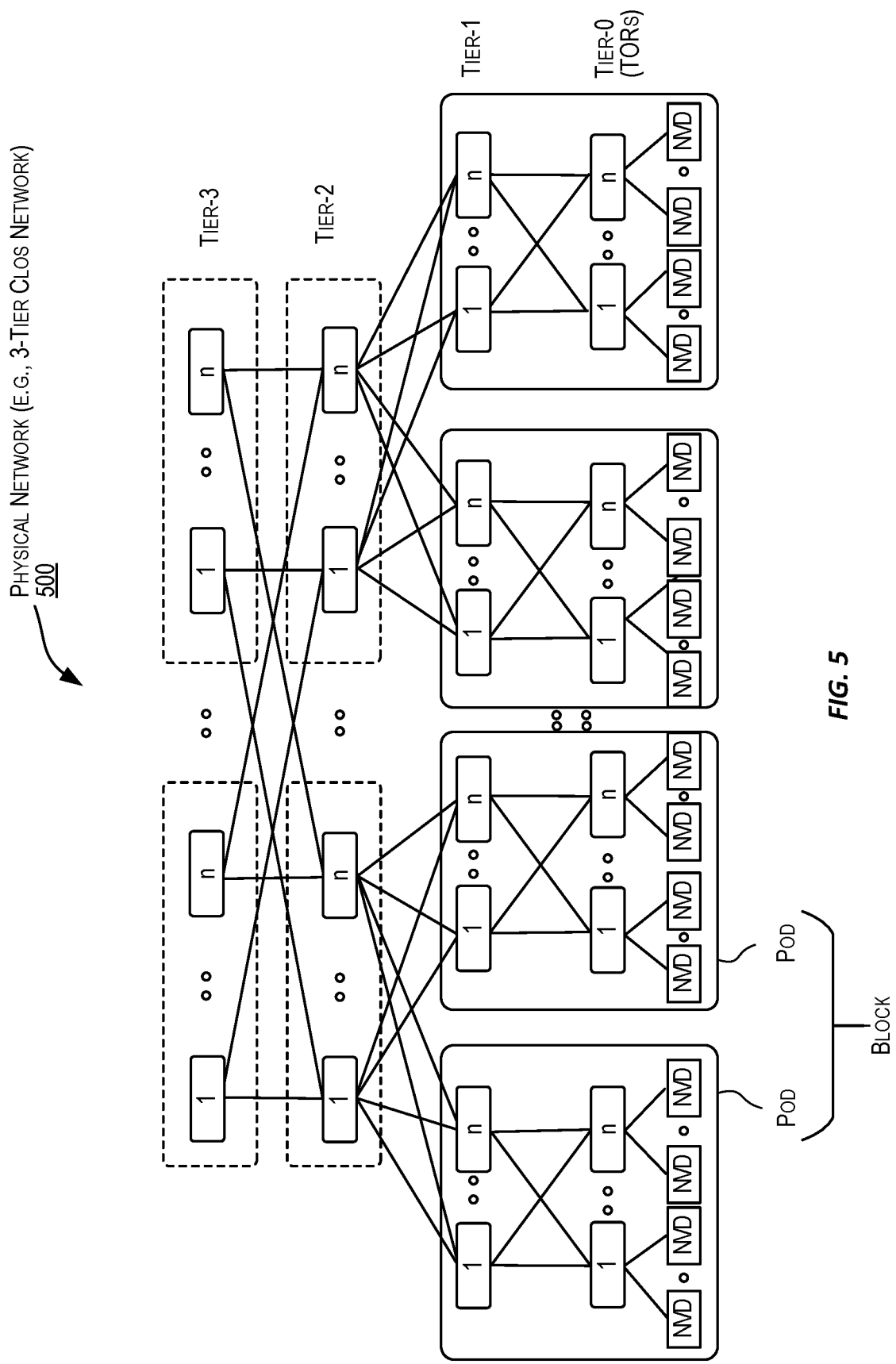
FIG. 5 depicts a simplified block diagram of a physical network provided by a CSPI according to certain embodiments.

Physical network 218 provides a communication fabric that enables TOR switches to communicate with each other. Physical network 218 can be a multi-tiered network. In certain implementations, physical network 218 is a multi-tiered Clos network of switches, with TOR switches 214 and 216 representing the leaf level nodes of the multi-tiered and multi-node physical switching network 218. Different Clos network configurations are possible including but not limited to a 2-tier network, a 3-tier network, a 4-tier network, a 5-tier network, and in general a "n"-tiered network. An example of a Clos network is depicted in FIG. 5 and described below.

Various different connection configurations are possible between host machines and NVDs such as one-to-one configuration, many-to-one configuration, one-to-many configuration, and others. In a one-to-one configuration implementation, each host machine is connected to its own separate NVD. For example, in FIG. 2, host machine 202 is connected to NVD 210 via NIC 232 of host machine 202. In a many-to-one configuration, multiple host machines are connected to one NVD. For example, in FIG. 2, host machines 206 and 208 are connected to the same NVD 212 via NICs 244 and 250, respectively.

Figure 3:
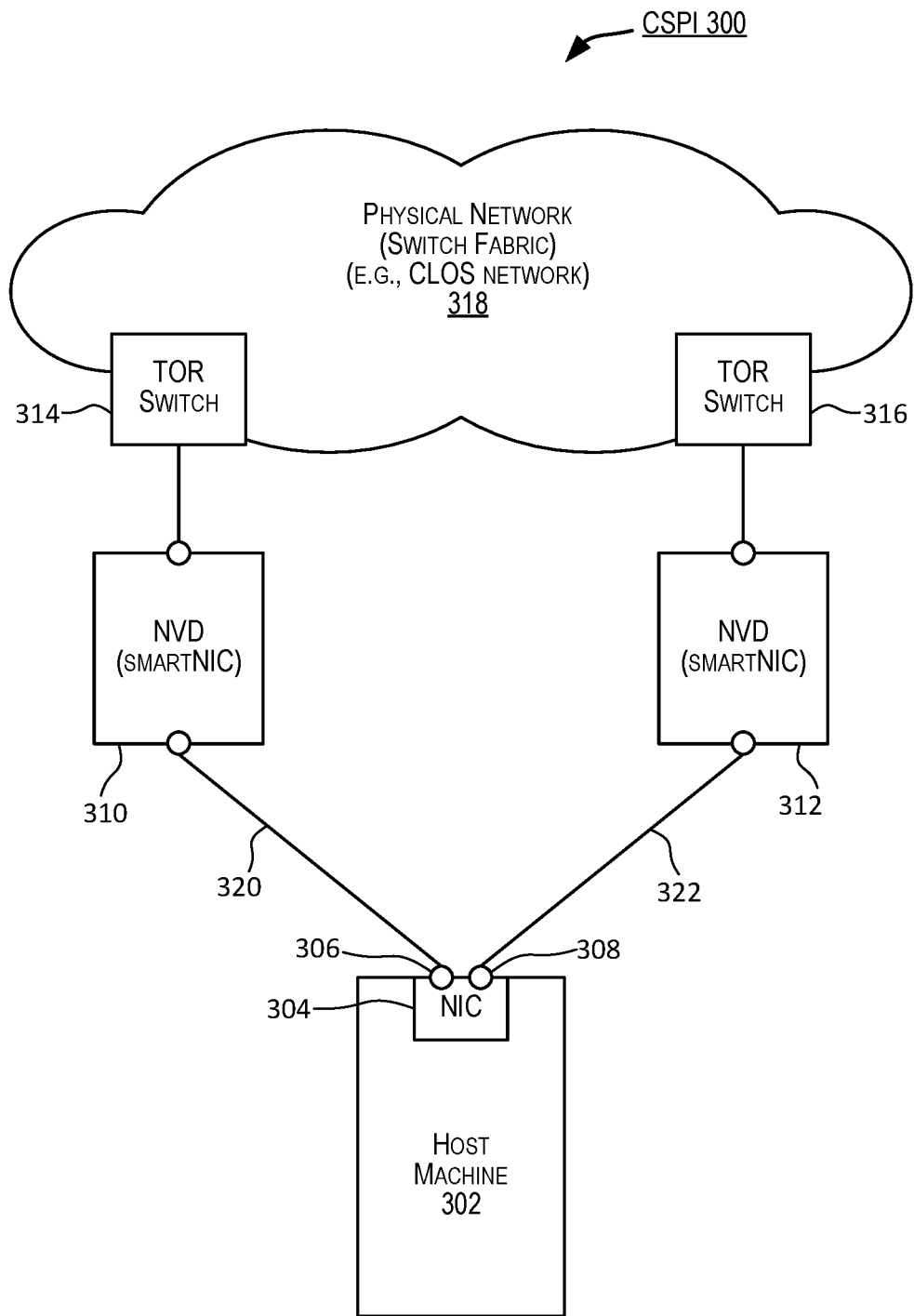
FIG. 3 shows an example arrangement within CSPI where a host machine is connected to multiple network virtualization devices (NVDs) according to certain embodiments.

In a one-to-many configuration, one host machine is connected to multiple NVDs. FIG. 3 shows an example within CSPI 300 where a host machine is connected to multiple NVDs. As shown in FIG. 3, host machine 302 comprises a network interface card (NIC) 304 that includes multiple ports 306 and 308. Host machine 300 is connected to a first NVD 310 via port 306 and link 320, and connected to a second NVD 312 via port 308 and link 322. Ports 306 and 308 may be Ethernet ports and the links 320 and 322 between host machine 302 and NVDs 310 and 312 may be Ethernet links. NVD 310 is in turn connected to a first TOR switch 314 and NVD 312 is connected to a second TOR switch 316. The links between NVDs 310 and 312, and TOR switches 314 and 316 may be Ethernet links. TOR switches 314 and 316 represent the Tier-0 switching devices in multi-tiered physical network 318.

The arrangement depicted in FIG. 3 provides two separate physical network paths to and from physical switch network 318 to host machine 302: a first path traversing TOR switch 314 to NVD 310 to host machine 302, and a second path traversing TOR switch 316 to NVD 312 to host machine 302. The separate paths provide for enhanced availability (referred to as high availability) of host machine 302. If there are problems in one of the paths (e.g., a link in one of the paths goes down) or devices (e.g., a particular NVD is not functioning), then the other path may be used for communications to/from host machine 302.

In the configuration depicted in FIG. 3, the host machine is connected to two different NVDs using two different ports provided by a NIC of the host machine. In other embodiments, a host machine may include multiple NICs that enable connectivity of the host machine to multiple NVDs.

Referring back to FIG. 2, an NVD is a physical device or component that performs one or more network and/or storage virtualization functions. An NVD may be any device with one or more processing units (e.g., CPUs, Network Processing Units (NPUs), FPGAs, packet processing pipelines, etc.), memory including cache, and ports. The various virtualization functions may be performed by software/firmware executed by the one or more processing units of the NVD.

An NVD may be implemented in various different forms. For example, in certain embodiments, an NVD is implemented as an interface card referred to as a smartNIC or an intelligent NIC with an embedded processor onboard. A smartNIC is a separate device from the NICs on the host machines. In FIG. 2, the NVDs 210 and 212 may be implemented as smartNICs that are connected to host machines 202, and host machines 206 and 208, respectively.

A smartNIC is however just one example of an NVD implementation. Various other implementations are possible. For example, in some other implementations, an NVD or one or more functions performed by the NVD may be incorporated into or performed by one or more host machines, one or more TOR switches, and other components of CSPI 200. For example, an NVD may be embodied in a host machine where the functions performed by an NVD are performed by the host machine. As another example, an NVD may be part of a TOR switch or a TOR switch may be configured to perform functions performed by an NVD that enables the TOR switch to perform various complex packet transformations that are used for a public cloud. A TOR that performs the functions of an NVD is sometimes referred to as a smart TOR. In yet other implementations, where virtual machines (VMs) instances, but not bare metal (BM) instances, are offered to customers, functions performed by an NVD may be implemented inside a hypervisor of the host machine. In some other implementations, some of the functions of the NVD may be offloaded to a centralized service running on a fleet of host machines.

In certain embodiments, such as when implemented as a smartNIC as shown in FIG. 2, an NVD may comprise multiple physical ports that enable it to be connected to one or more host machines and to one or more TOR switches. A port on an NVD can be classified as a host-facing port (also referred to as a "south port") or a network-facing or TOR-facing port (also referred to as a "north port"). A host-facing port of an NVD is a port that is used to connect the NVD to a host machine. Examples of host-facing ports in FIG. 2 include port 236 on NVD 210, and ports 248 and 254 on NVD 212. A network-facing port of an NVD is a port that is used to connect the NVD to a TOR switch. Examples of network-facing ports in FIG. 2 include port 256 on NVD 210, and port 258 on NVD 212. As shown in FIG. 2, NVD 210 is connected to TOR switch 214 using link 228 that extends from port 256 of NVD 210 to the TOR switch 214. Likewise, NVD 212 is connected to TOR switch 216 using link 230 that extends from port 258 of NVD 212 to the TOR switch 216.

An NVD receives packets and frames from a host machine (e.g., packets and frames generated by a compute instance hosted by the host machine) via a host-facing port and, after performing the necessary packet processing, may forward the packets and frames to a TOR switch via a network-facing port of the NVD. An NVD may receive packets and frames from a TOR switch via a network-facing port of the NVD and, after performing the necessary packet processing, may forward the packets and frames to a host machine via a host-facing port of the NVD.

In certain embodiments, there may be multiple ports and associated links between an NVD and a TOR switch. These ports and links may be aggregated to form a link aggregator group of multiple ports or links (referred to as a LAG). Link aggregation allows multiple physical links between two end-points (e.g., between an NVD and a TOR switch) to be treated as a single logical link. All the physical links in a given LAG may operate in full-duplex mode at the same speed. LAGs help increase the bandwidth and reliability of the connection between two endpoints. If one of the physical links in the LAG goes down, traffic is dynamically and transparently reassigned to one of the other physical links in the LAG. The aggregated physical links deliver higher bandwidth than each individual link. The multiple ports associated with a LAG are treated as a single logical port. Traffic can be load-balanced across the multiple physical links of a LAG. One or more LAGs may be configured between two endpoints. The two endpoints may be between an NVD and a TOR switch, between a host machine and an NVD, and the like.

An NVD implements or performs network virtualization functions. These functions are performed by software/firmware executed by the NVD. Examples of network virtualization functions include without limitation: packet encapsulation and de-capsulation functions; functions for creating a VCN network; functions for implementing network policies such as VCN security list (firewall) functionality; functions that facilitate the routing and forwarding of packets to and from compute instances in a VCN; and the like. In certain embodiments, upon receiving a packet, an NVD is configured to execute a packet processing pipeline for processing the packet and determining how the packet is to be forwarded or routed. As part of this packet processing pipeline, the NVD may execute one or more virtual functions associated with the overlay network such as executing VNICs associated with compute instances in the VCN, executing a Virtual Router (VR) associated with the VCN, the encapsulation and decapsulation of packets to facilitate forwarding or routing in the virtual network, execution of certain gateways (e.g., the Local Peering Gateway), the implementation of Security Lists, Network Security Groups, network address translation (NAT) functionality (e.g., the translation of Public IP to Private IP on a host by host basis), throttling functions, and other functions.

In certain embodiments, the packet processing data path in an NVD may comprise multiple packet pipelines, each composed of a series of packet transformation stages. In certain implementations, upon receiving a packet, the packet is parsed and classified to a single pipeline. The packet is then processed in a linear fashion, one stage after another, until the packet is either dropped or sent out over an interface of the NVD. These stages provide basic functional packet processing building blocks (e.g., validating headers, enforcing throttle, inserting new Layer-2 headers, enforcing L4 firewall, VCN encapsulation/decapsulation, etc.) so that new pipelines can be constructed by composing existing stages, and new functionality can be added by creating new stages and inserting them into existing pipelines.

An NVD may perform both control plane and data plane functions corresponding to a control plane and a data plane of a VCN. Examples of a VCN Control Plane are also depicted in FIGS. 21, 22, 23, and 24 (see references 2116, 2216, 2316, and 2416) and described below. Examples of a VCN Data Plane are depicted in FIGS. 21, 22, 23, and 24 (see references 2118, 2218, 2318, and 2418) and described below. The control plane functions include functions used for configuring a network (e.g., setting up routes and route tables, configuring VNICs, etc.) that controls how data is to be forwarded. In certain embodiments, a VCN Control Plane is provided that computes all the overlay-to-substrate mappings centrally and publishes them to the NVDs and to the virtual network edge devices such as various gateways such as the DRG, the SGW, the IGW, etc. Firewall rules may also be published using the same mechanism. In certain embodiments, an NVD only gets the mappings that are relevant for that NVD. The data plane functions include functions for the actual routing/forwarding of a packet based upon configuration set up using control plane. A VCN data plane is implemented by encapsulating the customer's network packets before they traverse the substrate network. The encapsulation/decapsulation functionality is implemented on the NVDs. In certain embodiments, an NVD is configured to intercept all network packets in and out of host machines and perform network virtualization functions.

As indicated above, an NVD executes various virtualization functions including VNICs and VCN VRs. An NVD may execute VNICs associated with the compute instances hosted by one or more host machines connected to the VNIC. For example, as depicted in FIG. 2, NVD 210 executes the functionality for VNIC 276 that is associated with compute instance 268 hosted by host machine 202 connected to NVD 210. As another example, NVD 212 executes VNIC 280 that is associated with bare metal compute instance 272 hosted by host machine 206, and executes VNIC 284 that is associated with compute instance 274 hosted by host machine 208. A host machine may host compute instances belonging to different VCNs, which belong to different customers, and the NVD connected to the host machine may execute the VNICs (i.e., execute VNICs-relate functionality) corresponding to the compute instances.

An NVD also executes VCN Virtual Routers corresponding to the VCNs of the compute instances. For example, in the embodiment depicted in FIG. 2, NVD 210 executes VCN VR 277 corresponding to the VCN to which compute instance 268 belongs. NVD 212 executes one or more VCN VRs 283 corresponding to one or more VCNs to which compute instances hosted by host machines 206 and 208 belong. In certain embodiments, the VCN VR corresponding to that VCN is executed by all the NVDs connected to host machines that host at least one compute instance belonging to that VCN. If a host machine hosts compute instances belonging to different VCNs, an NVD connected to that host machine may execute VCN VRs corresponding to those different VCNs.

In addition to VNICs and VCN VRs, an NVD may execute various software (e.g., daemons) and include one or more hardware components that facilitate the various network virtualization functions performed by the NVD. For purposes of simplicity, these various components are grouped together as "packet processing components" shown in FIG. 2. For example, NVD 210 comprises packet processing components 286 and NVD 212 comprises packet processing components 288. For example, the packet processing components for an NVD may include a packet processor that is configured to interact with the NVD's ports and hardware interfaces to monitor all packets received by and communicated using the NVD and store network information. The network information may, for example, include network flow information identifying different network flows handled by the NVD and per flow information (e.g., per flow statistics). In certain embodiments, network flows information may be stored on a per VNIC basis. The packet processor may perform packet-by-packet manipulations as well as implement stateful NAT and L4 firewall (FW). As another example, the packet processing components may include a replication agent that is configured to replicate information stored by the NVD to one or more different replication target stores. As yet another example, the packet processing components may include a logging agent that is configured to perform logging functions for the NVD. The packet processing components may also include software for monitoring the performance and health of the NVD and, also possibly of monitoring the state and health of other components connected to the NVD.

FIG. 1 shows the components of an example virtual or overlay network including a VCN, subnets within the VCN, compute instances deployed on subnets, VNICs associated with the compute instances, a VR for a VCN, and a set of gateways configured for the VCN. The overlay components depicted in FIG. 1 may be executed or hosted by one or more of the physical components depicted in FIG. 2. For example, the compute instances in a VCN may be executed or hosted by one or more host machines depicted in FIG. 2. For a compute instance hosted by a host machine, the VNIC associated with that compute instance is typically executed by an NVD connected to that host machine (i.e., the VNIC functionality is provided by the NVD connected to that host machine). The VCN VR function for a VCN is executed by all the NVDs that are connected to host machines hosting or executing the compute instances that are part of that VCN. The gateways associated with a VCN may be executed by one or more different types of NVDs. For example, certain gateways may be executed by smartNICs, while others may be executed by one or more host machines or other implementations of NVDs.

As described above, a compute instance in a customer VCN may communicate with various different endpoints, where the endpoints can be within the same subnet as the source compute instance, in a different subnet but within the same VCN as the source compute instance, or with an endpoint that is outside the VCN of the source compute instance. These communications are facilitated using VNICs associated with the compute instances, the VCN VRs, and the gateways associated with the VCNs.

For communications between two compute instances on the same subnet in a VCN, the communication is facilitated using VNICs associated with the source and destination compute instances. The source and destination compute instances may be hosted by the same host machine or by different host machines. A packet originating from a source compute instance may be forwarded from a host machine hosting the source compute instance to an NVD connected to that host machine. On the NVD, the packet is processed using a packet processing pipeline, which can include execution of the VNIC associated with the source compute instance. Since the destination endpoint for the packet is within the same subnet, execution of the VNIC associated with the source compute instance results in the packet being forwarded to an NVD executing the VNIC associated with the destination compute instance, which then processes and forwards the packet to the destination compute instance. The VNICs associated with the source and destination compute instances may be executed on the same NVD (e.g., when both the source and destination compute instances are hosted by the same host machine) or on different NVDs (e.g., when the source and destination compute instances are hosted by different host machines connected to different NVDs). The VNICs may use routing/forwarding tables stored by the NVD to determine the next hop for the packet.

For a packet to be communicated from a compute instance in a subnet to an endpoint in a different subnet in the same VCN, the packet originating from the source compute instance is communicated from the host machine hosting the source compute instance to the NVD connected to that host machine. On the NVD, the packet is processed using a packet processing pipeline, which can include execution of one or more VNICs, and the VR associated with the VCN. For example, as part of the packet processing pipeline, the NVD executes or invokes functionality corresponding to the VNIC (also referred to as executes the VNIC) associated with source compute instance. The functionality performed by the VNIC may include looking at the VLAN tag on the packet. Since the packet's destination is outside the subnet, the VCN VR functionality is next invoked and executed by the NVD. The VCN VR then routes the packet to the NVD executing the VNIC associated with the destination compute instance. The VNIC associated with the destination compute instance then processes the packet and forwards the packet to the destination compute instance. The VNICs associated with the source and destination compute instances may be executed on the same NVD (e.g., when both the source and destination compute instances are hosted by the same host machine) or on different NVDs (e.g., when the source and destination compute instances are hosted by different host machines connected to different NVDs).

If the destination for the packet is outside the VCN of the source compute instance, then the packet originating from the source compute instance is communicated from the host machine hosting the source compute instance to the NVD connected to that host machine. The NVD executes the VNIC associated with the source compute instance. Since the destination end point of the packet is outside the VCN, the packet is then processed by the VCN VR for that VCN. The NVD invokes the VCN VR functionality, which may result in the packet being forwarded to an NVD executing the appropriate gateway associated with the VCN. For example, if the destination is an endpoint within the customer's on-premise network, then the packet may be forwarded by the VCN VR to the NVD executing the DRG gateway configured for the VCN. The VCN VR may be executed on the same NVD as the NVD executing the VNIC associated with the source compute instance or by a different NVD. The gateway may be executed by an NVD, which may be a smartNIC, a host machine, or other NVD implementation. The packet is then processed by the gateway and forwarded to a next hop that facilitates communication of the packet to its intended destination endpoint. For example, in the embodiment depicted in FIG. 2, a packet originating from compute instance 268 may be communicated from host machine 202 to NVD 210 over link 220 (using NIC 232). On NVD 210, VNIC 276 is invoked since it is the VNIC associated with source compute instance 268. VNIC 276 is configured to examine the encapsulated information in the packet, and determine a next hop for forwarding the packet with the goal of facilitating communication of the packet to its intended destination endpoint, and then forward the packet to the determined next hop.

A compute instance deployed on a VCN can communicate with various different endpoints. These endpoints may include endpoints that are hosted by CSPI 200 and endpoints outside CSPI 200. Endpoints hosted by CSPI 200 may include instances in the same VCN or other VCNs, which may be the customer's VCNs, or VCNs not belonging to the customer. Communications between endpoints hosted by CSPI 200 may be performed over physical network 218. A compute instance may also communicate with endpoints that are not hosted by CSPI 200, or are outside CSPI 200. Examples of these endpoints include endpoints within a customer's on-premise network or data center, or public endpoints accessible over a public network such as the Internet. Communications with endpoints outside CSPI 200 may be performed over public networks (e.g., the Internet) (not shown in FIG. 2) or private networks (not shown in FIG. 2) using various communication protocols.

The architecture of CSPI 200 depicted in FIG. 2 is merely an example and is not intended to be limiting. Variations, alternatives, and modifications are possible in alternative embodiments. For example, in some implementations, CSPI 200 may have more or fewer systems or components than those shown in FIG. 2, may combine two or more systems, or may have a different configuration or arrangement of systems. The systems, subsystems, and other components depicted in FIG. 2 may be implemented in software (e.g., code, instructions, program) executed by one or more processing units (e.g., processors, cores) of the respective systems, using hardware, or combinations thereof. The software may be stored on a non-transitory storage medium (e.g., on a memory device).

Figure 4:
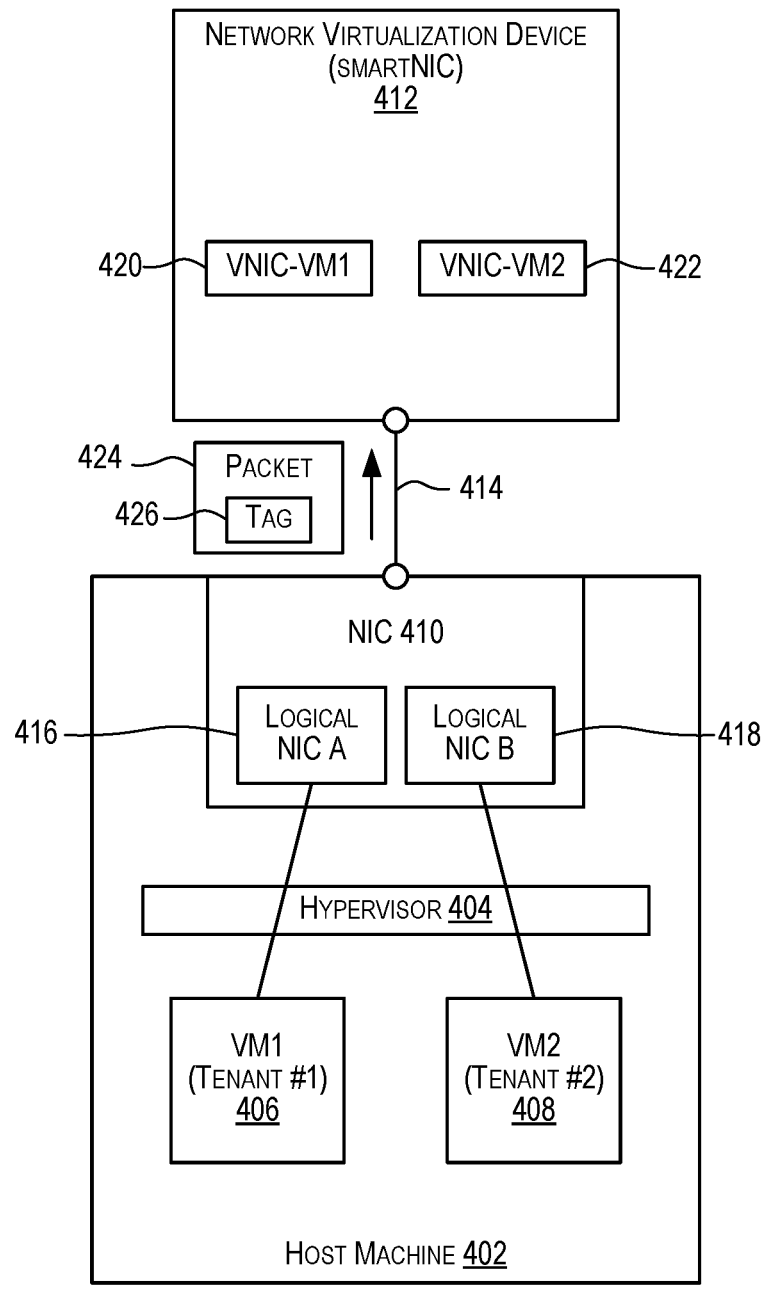
FIG. 4 depicts connectivity between a host machine and an NVD for providing I/O virtualization for supporting multitenancy according to certain embodiments.

FIG. 4 depicts connectivity between a host machine and an NVD for providing I/O virtualization for supporting multitenancy according to certain embodiments. As depicted in FIG. 4, host machine 402 executes a hypervisor 404 that provides a virtualized environment. Host machine 402 executes two virtual machine instances, VM1 406 belonging to customer/tenant #1 and VM2 408 belonging to customer/tenant #2. Host machine 402 comprises a physical NIC 410 that is connected to an NVD 412 via link 414. Each of the compute instances is attached to a VNIC that is executed by NVD 412. In the embodiment in FIG. 4, VM1 406 is attached to VNIC-VM1 420 and VM2 408 is attached to VNIC-VM2 422.

As shown in FIG. 4, NIC 410 comprises two logical NICs, logical NIC A 416 and logical NIC B 418. Each virtual machine is attached to and configured to work with its own logical NIC. For example, VM1 406 is attached to logical NIC A 416 and VM2 408 is attached to logical NIC B 418. Even though host machine 402 comprises only one physical NIC 410 that is shared by the multiple tenants, due to the logical NICs, each tenant's virtual machine believes they have their own host machine and NIC.

In certain embodiments, each logical NIC is assigned its own VLAN ID. Thus, a specific VLAN ID is assigned to logical NIC A 416 for Tenant #1 and a separate VLAN ID is assigned to logical NIC B 418 for Tenant #2. When a packet is communicated from VM1 406, a tag assigned to Tenant #1 is attached to the packet by the hypervisor and the packet is then communicated from host machine 402 to NVD 412 over link 414. In a similar manner, when a packet is communicated from VM2 408, a tag assigned to Tenant #2 is attached to the packet by the hypervisor and the packet is then communicated from host machine 402 to NVD 412 over link 414. Accordingly, a packet 424 communicated from host machine 402 to NVD 412 has an associated tag 426 that identifies a specific tenant and associated VM. On the NVD, for a packet 424 received from host machine 402, the tag 426 associated with the packet is used to determine whether the packet is to be processed by VNIC-VM1 420 or by VNIC-VM2 422. The packet is then processed by the corresponding VNIC. The configuration depicted in FIG. 4 enables each tenant's compute instance to believe that they own their own host machine and NIC. The setup depicted in FIG. 4 provides for I/O virtualization for supporting multitenancy.

FIG. 5 depicts a simplified block diagram of a physical network 500 according to certain embodiments. The embodiment depicted in FIG. 5 is structured as a Clos network. A Clos network is a particular type of network topology designed to provide connection redundancy while maintaining high bisection bandwidth and maximum resource utilization. A Clos network is a type of non-blocking, multistage or multi-tiered switching network, where the number of stages or tiers can be two, three, four, five, etc. The embodiment depicted in FIG. 5 is a 3-tiered network comprising tiers 1, 2, and 3. The TOR switches 504 represent Tier-0 switches in the Clos network. One or more NVDs are connected to the TOR switches. Tier-0 switches are also referred to as edge devices of the physical network. The Tier-0 switches are connected to Tier-1 switches, which are also referred to as leaf switches. In the embodiment depicted in FIG. 5, a set of "n" Tier-0 TOR switches are connected to a set of "n" Tier-1 switches and together form a pod. Each Tier-0 switch in a pod is interconnected to all the Tier-1 switches in the pod, but there is no connectivity of switches between pods. In certain implementations, two pods are referred to as a block. Each block is served by or connected to a set of "n" Tier-2 switches (sometimes referred to as spine switches). There can be several blocks in the physical network topology. The Tier-2 switches are in turn connected to "n" Tier-3 switches (sometimes referred to as super-spine switches). Communication of packets over physical network 500 is typically performed using one or more Layer-3 communication protocols. Typically, all the layers of the physical network, except for the TORs layer are n-ways redundant thus allowing for high availability. Policies may be specified for pods and blocks to control the visibility of switches to each other in the physical network so as to enable scaling of the physical network.

A feature of a Clos network is that the maximum hop count to reach from one Tier-0 switch to another Tier-0 switch (or from an NVD connected to a Tier-0-switch to another NVD connected to a Tier-0 switch) is fixed. For example, in a 3-Tiered Clos network at most seven hops are needed for a packet to reach from one NVD to another NVD, where the source and target NVDs are connected to the leaf tier of the Clos network. Likewise, in a 4-tiered Clos network, at most nine hops are needed for a packet to reach from one NVD to another NVD, where the source and target NVDs are connected to the leaf tier of the Clos network. Thus, a Clos network architecture maintains consistent latency throughout the network, which is important for communication within and between data centers. A Clos topology scales horizontally and is cost effective. The bandwidth/throughput capacity of the network can be easily increased by adding more switches at the various tiers (e.g., more leaf and spine switches) and by increasing the number of links between the switches at adjacent tiers.

In certain embodiments, each resource within CSPI is assigned a unique identifier called a Cloud Identifier (CID). This identifier is included as part of the resource's information and can be used to manage the resource, for example, via a Console or through APIs. An example syntax for a CID is:

ocid1.<RESOURCE TYPE>.<REALM>.[REGION] [.FUTURE USE].<UNIQUE ID> where, ocid1: The literal string indicating the version of the CID;

resource type: The type of resource (for example, instance, volume, VCN, subnet, user, group, and so on);

realm: The realm the resource is in. Example values are "c1" for the commercial realm, "c2" for the Government Cloud realm, or "c3" for the Federal Government Cloud realm, etc. Each realm may have its own domain name;

region: The region the resource is in. If the region is not applicable to the resource, this part might be blank;

future use: Reserved for future use.

unique ID: The unique portion of the ID. The format may vary depending on the type of resource or service.

Packet Flow Based on Cached and Non-Cached Configuration Information

Figure 6:
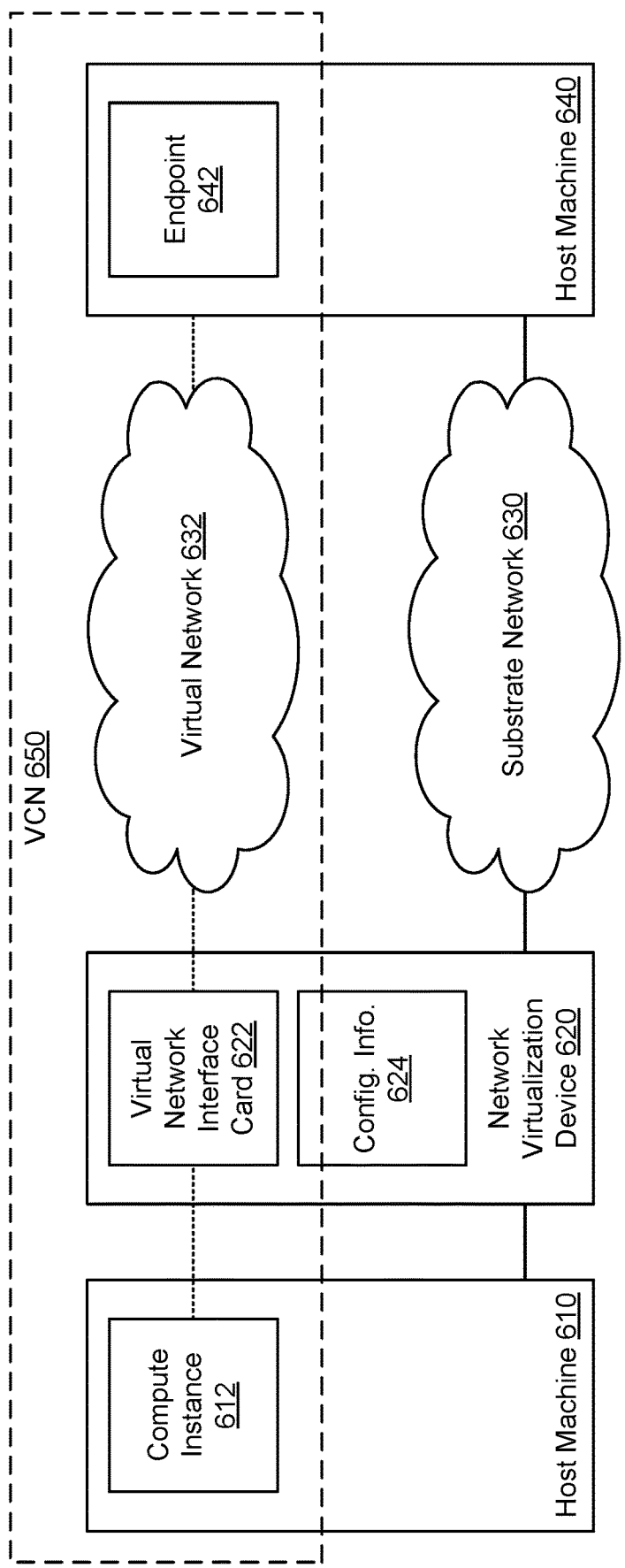
FIG. 6 illustrates an example of a network architecture that supports a packet flow based on cached configuration information according to certain embodiments.

FIG. 6 illustrates an example of a network architecture that supports a packet flow based on cached configuration information according to certain embodiments. The network architecture represents at least in part a cloud infrastructure of a CSP. As illustrated, the network architecture includes a host machine 660, an NVD 670, a substrate network 680, and a host machine 690.

Generally, the host machine 660 hosts one or more compute instances, such as the compute instance 662 of a customer and is connected with the NVD 670. The connection can be an Ethernet link. The NVD 670 hosts, among other virtual functions, one or more VNICs, including the VNIC 672 that is attached to the compute instance 662. Typically, a VNIC can be associated with a single compute instance and can provide virtual network interface functions to the compute instance. The virtual network interface functions include providing an interface to a virtual network (e.g., an interface of the compute instance 662 to a virtual network 682). The NVD 670 is also connected with the substrate network 680 via a switch (e.g., a top-of-rack (TOR) switch that supports an Ethernet link). The substrate network 680 is also connected with the host machine 690, where the connection can be via another NVD (not shown in FIG. 6 for simplicity). The host machine 690 can host one or more compute instances, including an endpoint 692. The compute instance 662 can communicate with the endpoint 692, such as by sending and receiving packets on the virtual network 682 via the VNIC 672 (and, likewise, via a VNIC attached with the endpoint 692, also not shown in FIG. 6 for simplicity). The virtual network 682 can be a software-based or -defined network that is overlaid on top of the substrate network 680. As illustrated with the dashed box, a VCN 600 of the customer can include the compute instance 662, the VNIC 672, and the endpoint 692 (although it is possible that the endpoint 692 may not be part of the VCN 600).

In an example, the flow of packets from and to compute instances of the host machine 660 can depend on configuration information 674 stored in a memory of the NVD 670. The configuration information 674 can include any or all of security policies (e.g., policies based on firewall rules for inbound and/or or outbound traffic), routing rules, overlay-to-substrate IP address mappings, routing tables, and other types of information to send and/or receive packets. In an example, the configuration information 674 can include multiple sets, where each set is cached for a VNIC, is associated with the corresponding compute instance, and is specific to the information needed for the flow of outbound or inbound packets to this compute instance. In this example, when the compute instance 662 sends a packet, the host machine 660 forwards this packet to the NVD 670. In turn, the VNIC 672 looks up the applicable configuration information to process (e.g., apply rules, update the header of the packet, etc.) and send the processed packet on the virtual network 682. Sending it on the virtual network 682 involves the NVD 670 further processing and sending the packet on the substrate network 680 in a manner that is transparent to the VNIC 672 and the compute instance 662. Ultimately, the packet is received by the endpoint 692. Conversely, a packet that is destined to the compute instance 662 is received by the NVD 670 first, processed by the VNIC 672 based on the applicable configuration information, and then sent from the NVD 670 to the host machine 660 to reach the compute instance 662.

As described herein above, the network architecture of FIG. 6 may necessitate a large amount of configuration information to be stored and maintained at the NVD 670. Further, the VNICs hosted by NVD 670 also use processing and memory resources of the NVD 670. Accordingly, the density of the VNICs on the NVD 670 (e.g., the number of VNICs that the NVD 670 can host) can be relatively limited.

Figure 7:
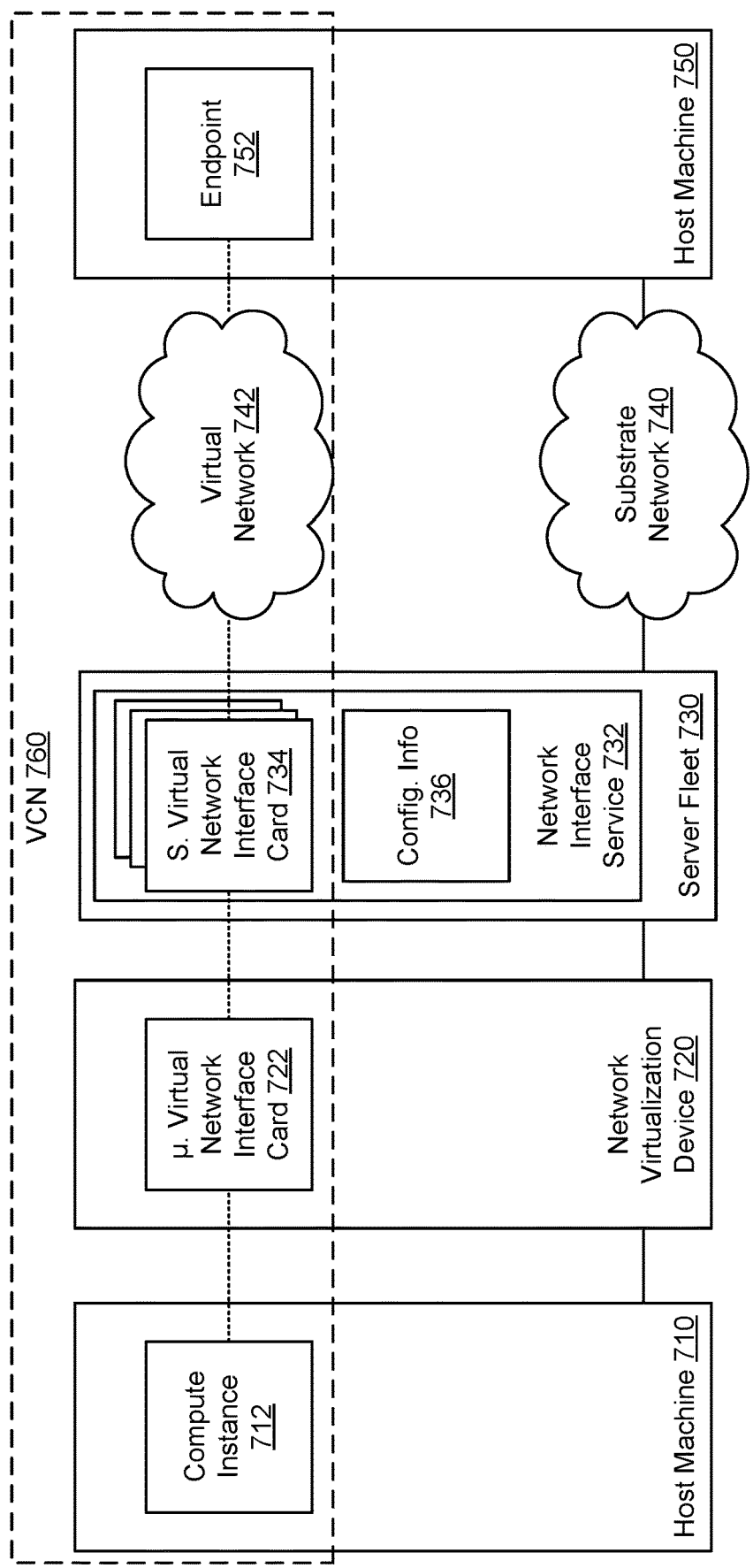
FIG. 7 illustrates an example of a network architecture that supports a packet flow based on non-cached configuration information according to certain embodiments.

FIG. 7 illustrates an example of a network architecture that supports a packet flow based on non-cached configuration information according to certain embodiments. This network architecture generally can increase the VNIC density per NVD, but can impact network bandwidth. Rather than storing configuration information by an NVD, the NVD hosts a stripped down version of VNICs (referred to as micro-VNICs) and the configuration information is stored by a network interface service that provides a centralized network interfacing service. As illustrated, the network architecture includes a host machine 710, an NVD 720, a server fleet 730, a substrate network 740, and a host machine 750.

Generally, the host machine 710 hosts one or more compute instances, such as the compute instance 712 of a customer and is connected with the NVD 720. The connection can be an Ethernet link. The NVD 720 hosts, among other virtual functions, one or more VNICs, including the VNIC 722 that is attached to the compute instance 712. Unlike the VNICs hosted on the NVD 670 of FIG. 6, the VNICs hosted on the NVD 670 can be micro-VNICs. Typically, a micro-VNIC is simpler to implement than a VNIC, attaches to a compute instance, may not use configuration information to process a packet and, instead, may be configured to directly send, via the NVD 720, an outbound packet of the compute instance to a network interface service 732 on the server fleet 730 and may be configured to directly send, via the NVD 720, an inbound packet to the compute instance. The NVD 720 is connected with the server fleet 730 (e.g., via a tunnel or some other peering mechanism).

The server fleet 730 can be a set or an enclave of servers or host machines that hosts the network interface service 732 for one or more customers. The network interface service 732 provides network interface functions for connectivity between computer instances. In one example, the network interface service 732 can be a VNIC as a service (VNICaaS). For instance, the network interface service 732 includes multiple VNICS, including the VNIC 734 that is associated with the micro-VNIC 722. For clarity, these VNICs can be referred to as service VNICs (as opposed to micro-VNICs). Typically a service VNIC can be associated with multiple micro-VNICs, each of which is in turn associated with a single compute instance. In other words, a service VNIC can be associated with multiple compute instances through their corresponding micro-VNICs and can provide virtual network interface functions to these compute instances. The virtual network interface functions include providing an interface of a compute instance to a virtual network (e.g., an interface of the compute instance 712 to a virtual network 742).

The server fleet 730 is connected with the substrate network 740 via a set of switches. The substrate network 740 is also connected with the host machine 750, where the connection can be via another NVD, the server fleet 730, and/or another server fleet (not shown in FIG. 7 for simplicity). The host machine 750 can host one or more compute instances, including an endpoint 752. The compute instance 712 can communicate with the endpoint 752, such as by sending and receiving packets on the virtual network 742 via the micro-VNIC 722 and the service VNIC 734 (and, likewise, via a VNIC attached with the endpoint 752 or a pair of micro-VNIC and service VNIC attached with the endpoint 752, also not shown in FIG. 7 for simplicity). The virtual network 742 can be a software-based or -defined network that is overlaid on top of the substrate network 740. As illustrated with the dashed box, a VCN 760 of the customer can include the compute instance 712, the micro-VNIC 722, the service VNIC 734, and the endpoint 752 (although it is possible that the endpoint 752 may not be part of the VCN 760).

In an example, the flow of packets from and to compute instances of the host machine 710 can depend on configuration information 736 stored by the network interface service 732. The configuration information 736 can include any or all of security policies (e.g., policies based on firewall rules for inbound and/or or outbound traffic), routing rules, overlay-to-substrate IP address mappings, routing tables, and other types of information to send and/or receive packets. In an example, the configuration information 736 can include multiple sets, where each set is cached for a service VNIC, a micro-VNIC, and/or a compute instance. In this example, when the compute instance 712 sends a packet, the host machine 710 forwards this packet to the NVD 720. In turn, the micro-VNIC 722 sends the packet to the network interface service 732 via the NVD 720. The server fleet 730 receives the packet from the NVD 670 over the tunnel and forwards it to the network interface service 732. The network interface service 732 selects the service VNIC 734 to further process the packet. In turn, the service VNIC 734 looks up the applicable configuration information to process (e.g., apply rules, update the header of the packet, etc.) and send the processed packet on the virtual network 742. Sending it on the virtual network 742 involves the server fleet 730 sending the packet on the substrate network 740 in a manner that is transparent to the service VNIC 734, the micro-VNIC 722, and the compute instance 712. Ultimately, the packet is received by the endpoint 752. Conversely, a packet that is destined to the compute instance 712 is processed by the service VNIC 734 based on the applicable configuration information, sent to the micro-VNIC 722 via the server fleet 730 and the NVD 720, and then sent from the micro-VNIC 722 to the compute instance 712 via the NVD 720 and the host machine 710.

As described herein above, the network architecture of FIG. 7 may necessitate that packets from and to the host machine 710 flow through the network interface service 732. This flow can impact the network bandwidth, especially with an increase to the amount of packets.

Figure 8:
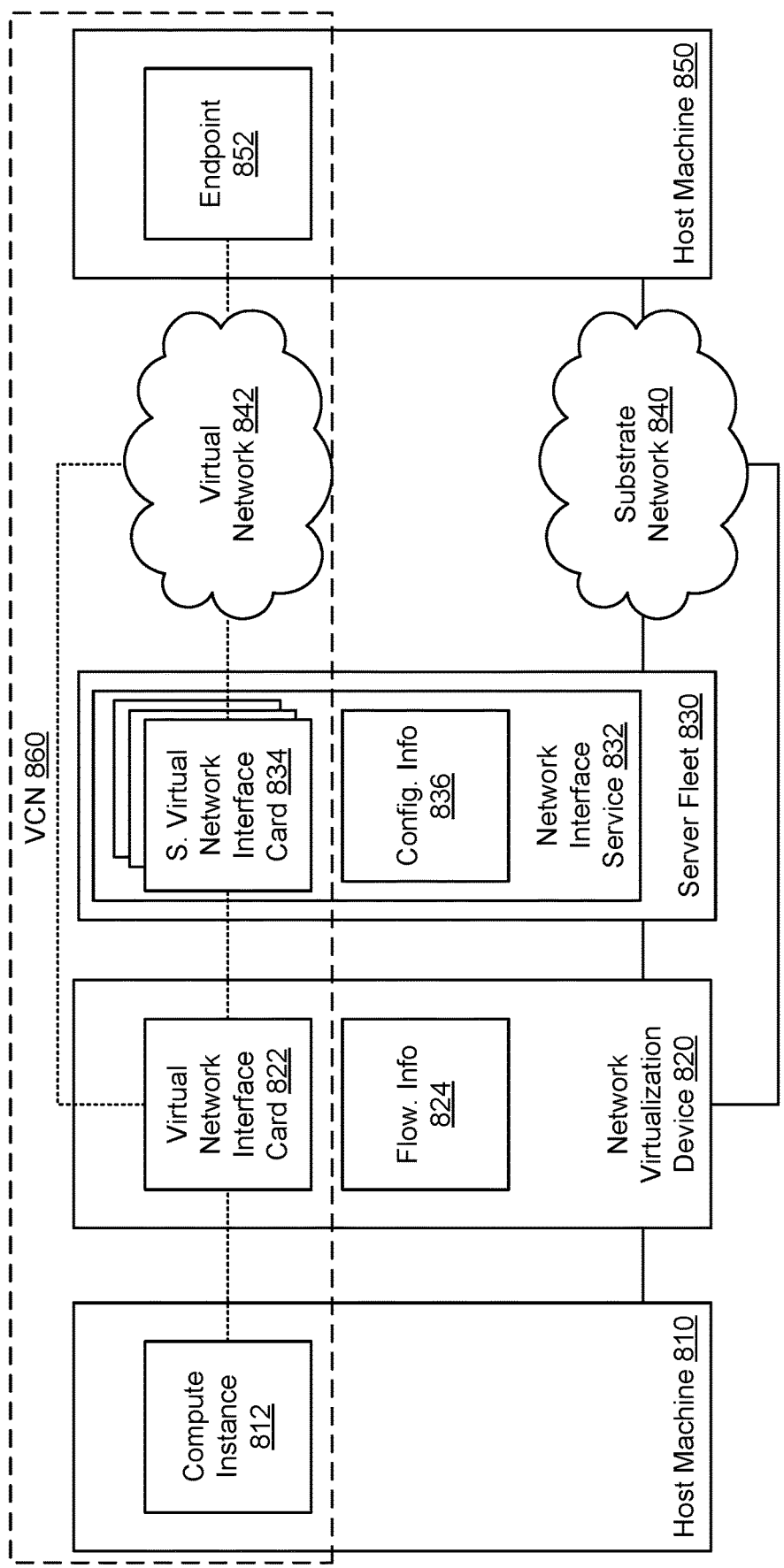
FIG. 8 illustrates an example of a network architecture that supports a packet flow based on cached flow information and non-cached configuration information according to certain embodiments.

FIG. 8 illustrates an example of a network architecture that supports a packet flow based on cached flow information and non-cached configuration information according to certain embodiments. Here, the network architecture can optimize the balance between memory usage (and VNIC density on an NVD) and the network bandwidth. In an example, a network interface service can maintain configuration information usable to manage the flow of packets. An NVD can also host VNICs and store only a relevant subset of the configuration information, referred to herein as flow information. This subset may be the minimal or reduced amount of configuration information needed to send and/or receive a packet directly from a virtual network without the need to utilize the network interface service. Only when this subset is unavailable or outdated does the packet flow need to involve the network interface service. As illustrated, the network architecture includes a host machine 810, an NVD 820, a server fleet 830, a substrate network 840, and a host machine 850.

Generally, the host machine 810 hosts one or more compute instances, such as the compute instance 812 of a customer and is connected with the NVD 820. The connection can be an Ethernet link. The NVD 820 hosts, among other virtual functions, one or more VNICs, including the VNIC 822 that is attached to the compute instance 812. The NVD 820 also stores flow information 824 usable by such VNICs to send and/or receive packets on one or more virtual networks, such as a virtual network 842. The NVD 820 is connected with the server fleet 830 (e.g., via a tunnel or some other peering mechanism). The NVD 820 is also connected with the substrate network 840 (e.g., via a TOR switch).

The server fleet 830 can be a set or an enclave of servers or host machines that hosts the network interface service 832 for one or more customers. The network interface service 832 provides network interface functions for connectivity between computer instances. In one example, the network interface service 832 can be a VNICaaS. For instance, the network interface service 832 includes multiple service VNICS, including the service VNIC 834 that is associated with the VNIC 822 and the compute instance 812. These service VNICs and rely on configuration information 836 stored by the network interface service 832 to process and send packets.

The server fleet 830 is connected with the substrate network 840 via a set of switches. The substrate network 840 is also connected with the host machine 850, where the connection can be via another NVD, the server fleet 830, and/or another server fleet (not shown in FIG. 8 for simplicity). The host machine 850 can host one or more compute instances, including an endpoint 852. The compute instance 812 can communicate with the endpoint 852, such as by sending and receiving packets on the virtual network 842 via the VNIC 822 and/or the service VNIC 834 (and, likewise, via a VNIC attached with the endpoint 852 and/or another service VNIC, also not shown in FIG. 8 for simplicity). The virtual network 842 can be a software-based or -defined network that is overlaid on top of the substrate network 840. As illustrated with the dashed box, a VCN 860 of the customer can include the compute instance 812, the VNIC 822, the service VNIC 834, and the endpoint 852 (although it is possible that the endpoint 852 may not be part of the VCN 860).

In an example, the flow of packets from and to compute instances of the host machine 810 can depend on the configuration information 836 stored by the network interface service 832 and the flow information 824 stored by the NVD 820. The configuration information 836 can include any or all of security policies (e.g., policies based on firewall rules for inbound and/or or outbound traffic), routing rules, overlay-to-substrate IP address mappings, routing tables, and other types of information to send and/or receive packets. In comparison, the flow information 824 can include a subset of the configuration information 836, where this subset is the minimal or reduced amount of configuration information needed to process and manage the flow of packets via the NVD 820. For instance, the flow information 824 includes any or a combination of one or more security policies, one or more overlay-to-substrate IP address mappings, one or more routing tables, and/or one or more summaries thereof. The flow information 824 can be granular to a particular resolution, such as to a packet type (e.g., can indicate a re-write rule applicable to a particular packet type) or can be generic to a higher resolution level (e.g., can apply to multiple packet types and indicate, for instance, how packets are to be processed given a certain firewall rule). Generally, the amount of the flow information 824 is smaller than that of the configuration information 836 because the flow information 824 is specific to the flow of packets from and/to one or more compute instances of the host machine 810 that is connected with the NVD 820, whereas the configuration information 836 is applicable to packet flows to and/or from a much larger number of compute instances hosted on a large number of host machines. In an example, the configuration information 836 can include multiple sets, where each set is cached for a service VNIC, a VNIC attached to a compute instance, and/or the compute instance. Also in this example, the flow information 824 can include multiple sets, where each set is cached for a VNIC attached to a compute instance and/or the compute instance.

To illustrate, consider two scenarios. In the first scenario, the compute instance 812 sends a packet to the endpoint 852, where the flow information 824 is available to support this transmission. In this scenario, the packet is sent directly by the VNIC 822 on the virtual network 842 (as illustrated with the upper dotted line) and, correspondingly, directly by the NVD 820 on the substrate network 840 (as illustrated with the lower solid line). In a second, alternative scenario, the flow information 824 is unavailable. In this case, the packet is processed and sent by the service VNIC 834 on the virtual network 842 (as illustrated with the lower dotted line) and, correspondingly, by the server fleet 830 on the substrate network 840 (as illustrated with the upper solid line).

In the first scenario, when the compute instance 812 sends a packet, the host machine 810 forwards this packet to the NVD 820. In turn, the VNIC 822 looks up the applicable flow information to process (e.g., apply rules, update the header of the packet, etc.) and sends the processed packet on the virtual network 842. Sending it on the virtual network 842 involves the NVD 820 further processing and sending the packet on the substrate network 840 in a manner that is transparent to the VNIC 822 and the compute instance 812. Ultimately, the packet is received by the endpoint 852.

In the second scenario, when the compute instance 812 sends a packet, the host machine 810 forwards this packet to the NVD 820. In turn, the VNIC 822 determines that no flow information is available to process this packet and, instead, sends the packet to the network interface service 832 via the NVD 820. The server fleet 830 receives the packet from the NVD 820 over the tunnel and forwards it to the network interface service 832. The network interface services 832 selects the service VNIC 834 to further process the packet. In turn, the service VNIC 834 looks up the applicable configuration information to process (e.g., apply rules, update the header of the packet, etc.) and sends the processed packet on the virtual network 842. Sending it on the virtual network 842 involves the server fleet 830 sending the packet on the substrate network 840 in a manner that is transparent to the service VNIC 834, the VNIC 822, and the compute instance 812. Ultimately, the packet is received by the endpoint 852.

As described herein above, and relative to the network architecture of FIG. 6, the NVD 820 stores a smaller amount of configuration information (e.g., the flow information 824), thereby allowing a higher density of VNICs. Relative to the network architecture of FIG. 7, a packet flow involves the network interface service 832 only as needed (e.g., when no flow information is available), thereby reducing the bandwidth burden. Aspects of generating, distributing, updating flow information and managing packet flows are further described in the next figures.

As described herein above, the flow of a packet on a virtual network not only involves overlay resources, but also includes a corresponding packet flow on a substrate network through hardware resources that host the overlay resources. In the next figures and in the interest of clarity and brevity, details about the packet flow on the substrate network may be omitted when describing the packet flow on the virtual network, and such details implied by reference to the above description.

Figure 9:
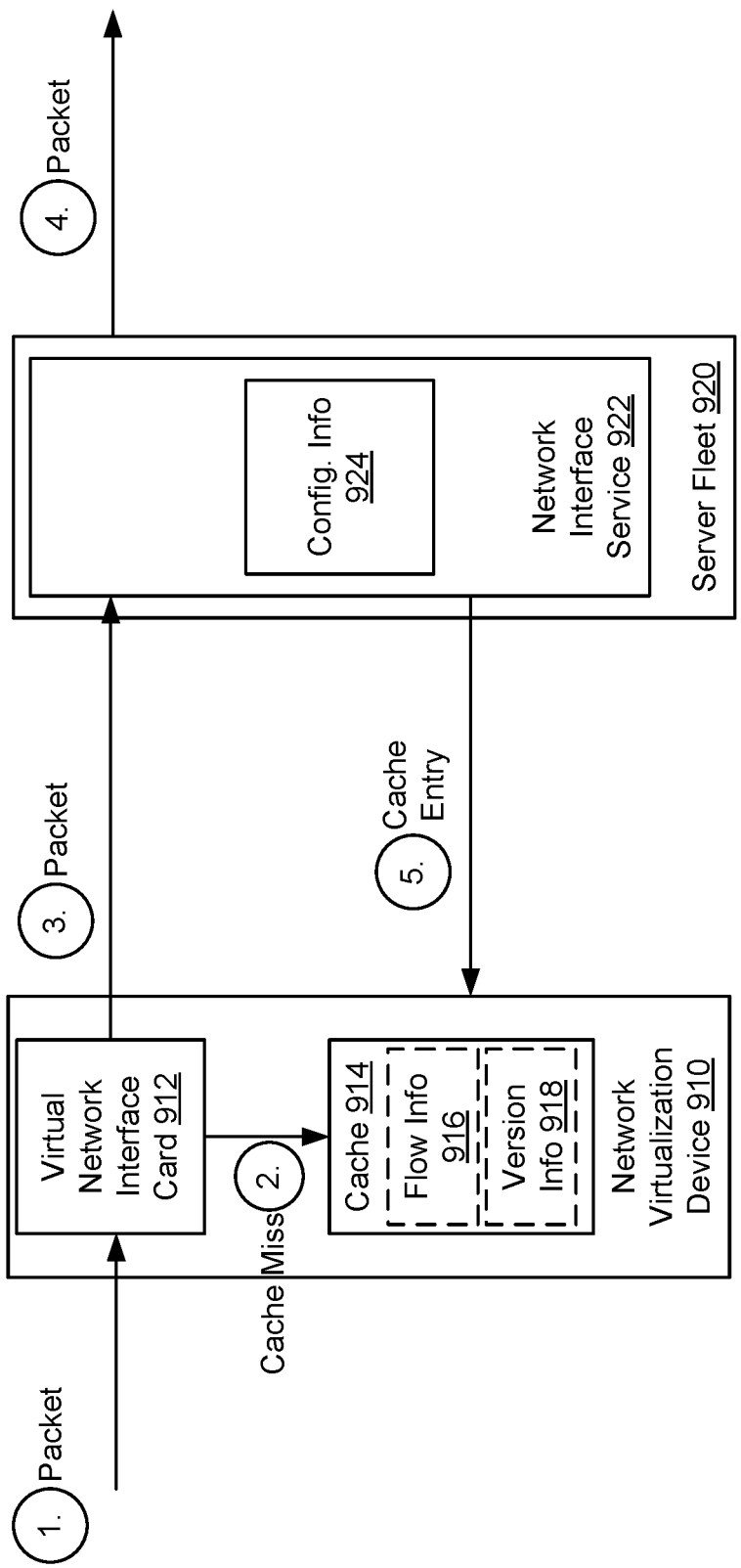
FIG. 9 illustrates an example of an outbound packet flow that results in cached flow information according to certain embodiments.

FIG. 9 illustrates an example of an outbound packet flow that results in cached flow information according to certain embodiments. An NVD 910 that hosts a VNIC 912 is connected with a server fleet 920 that hosts a network interface service 922. Initially, the NVD 910 does not store flow information that allows the VNIC 912 to send a packet directly on a virtual network. Instead, the packet is indirectly sent on the virtual network via the network interface service 922 (e.g., via a particular service VNIC). Subsequently, the NVD 910 receives from the network interface service 922 and stores the applicable flow information, thereby allowing the VNIC 912 to send packets from that point on directly on the virtual network, as further described in FIG. 10. The NVD 910, VNIC 912, server fleet 920, and network interface service 922 are examples of the NVD 820, VNIC 822, server fleet 830, and network interface service 832, respectively. In FIG. 9, the numbers shown in the circles refer to a sequence of events.

In an example, the VNIC 912 receives a packet from, for example, a compute instance with which the VNIC 912 is attached, where this packet is to be sent on the virtual network (e.g., is an outbound packet). Given header information in the packet, the VNIC 912 looks up a cache 914 of the NVD 910 to determine whether cached flow information is available for processing the packet. This look-up can use an n-tuple match of source information, destination information, source subnets, destination subnets, packet types, and the like. The look-up results in a cache miss. Accordingly, the VNIC 912 sends the packets to the network interface service 922. In turn, given configuration information 924, the network interface service 922 processes the packet (e.g., applies rules, re-writes header information, performs encapsulation, and the like) and sends the processed packet on the substrate network. In addition, the network interface service 922 generates a cache entry that includes flow information and version information associated with the flow information. The flow information can be a subset of the particular configuration information used to send the packet on the substrate number. For instance, the flow information includes at least one of a security policy, an overlay-to-substrate IP address mapping, or a route rule. The version information can indicate a current version of the flow information or of portions of the flow information. For instance, the version information is an indicator of the current version of the flow information or an indicator of the current version per portion of the flow information (e.g., the current version of the security policy, the current version of the overlay-to-substrate IP address mapping, and the current version of the route rule). The version information is usable to invalidate the cache entry, as further discussed in the next figures. The network interface service 922 sends the cache entry to the NVD 910. In turn, the NVD 910 stores flow information 916 and version information 918 from the received cache entry as entries in the cache 914.

Figure 10:
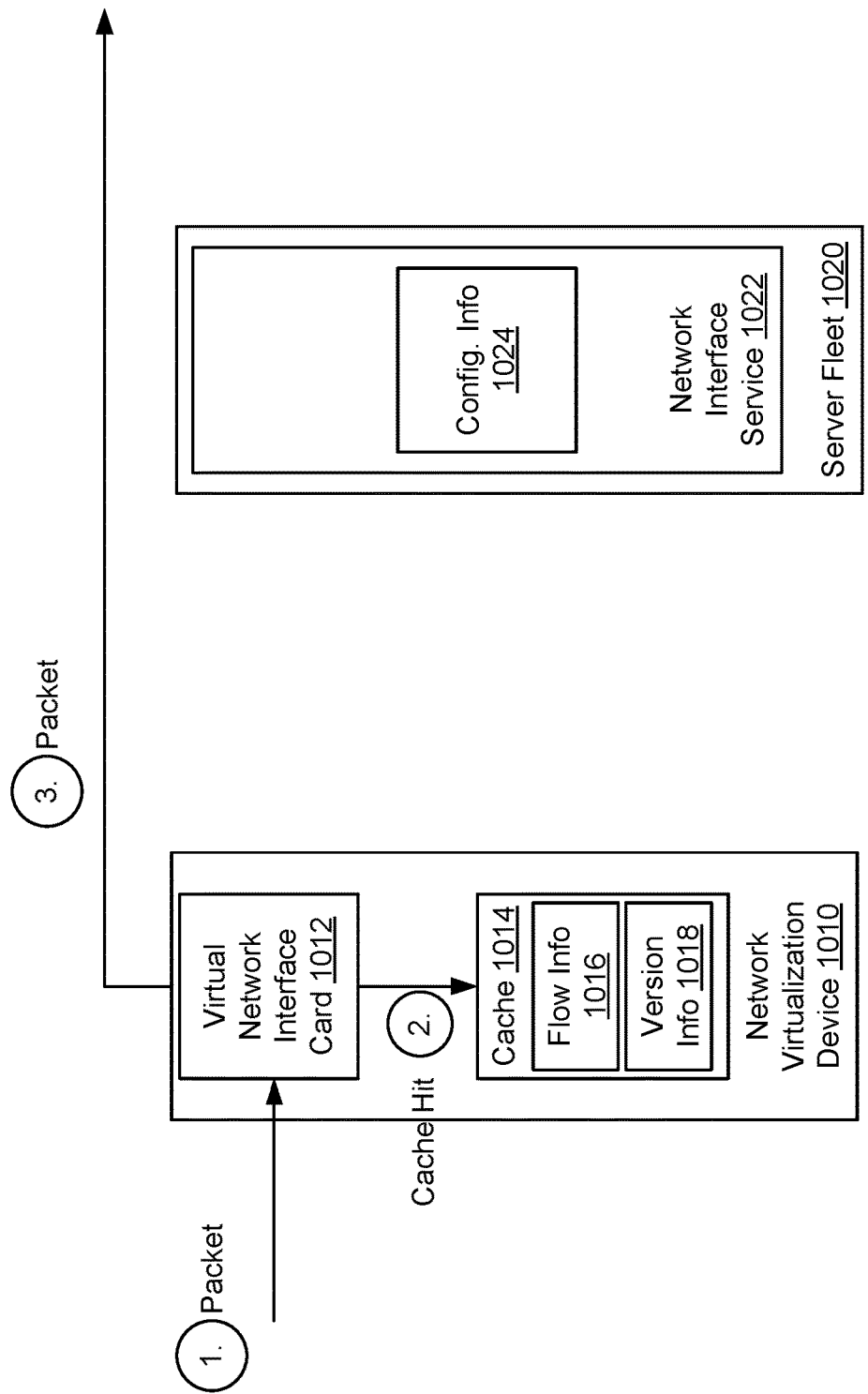
FIG. 10 illustrates an example of an outbound packet flow based on cached flow information according to certain embodiments.

FIG. 10 illustrates an example of an outbound packet flow based on cached flow information according to certain embodiments. The example of FIG. 10 continues from the example of FIG. 9. An NVD 1010 that hosts a VNIC 1012 is connected with a server fleet 1020 that hosts a network interface service 1022. The NVD 1010 stores, in a cache 1014, flow information 1016 and version information 1018. In comparison, the network interface service 1022 stores configuration information 1024. The NVD 1010, VNIC 1012, cache 1014, flow information 1016, version information 1018, server fleet 1020, network interface service 1022, and configuration information 1024 are examples of the NVD 910, VNIC 912, cache 914, flow information 916, version information 918, server fleet 920, network interface service 922, and configuration information 924, respectively.

In an example, the VNIC 1012 receives a packet from, for example, a compute instance with which the VNIC 1012 is attached, where this packet is to be sent on the virtual network (e.g., is an outbound packet). Given header information in the packet, the VNIC 1012 looks up the cache 1014 to determine whether cached flow information is available for processing the packet. The look-up results in a cache hit with the flow information 1016. The version information 1018 indicates that the flow information 1016 is valid. Accordingly, the VNIC 1012 sends the packet directly on the virtual network without the need to send it via the network interface service 1022.

Figure 11:
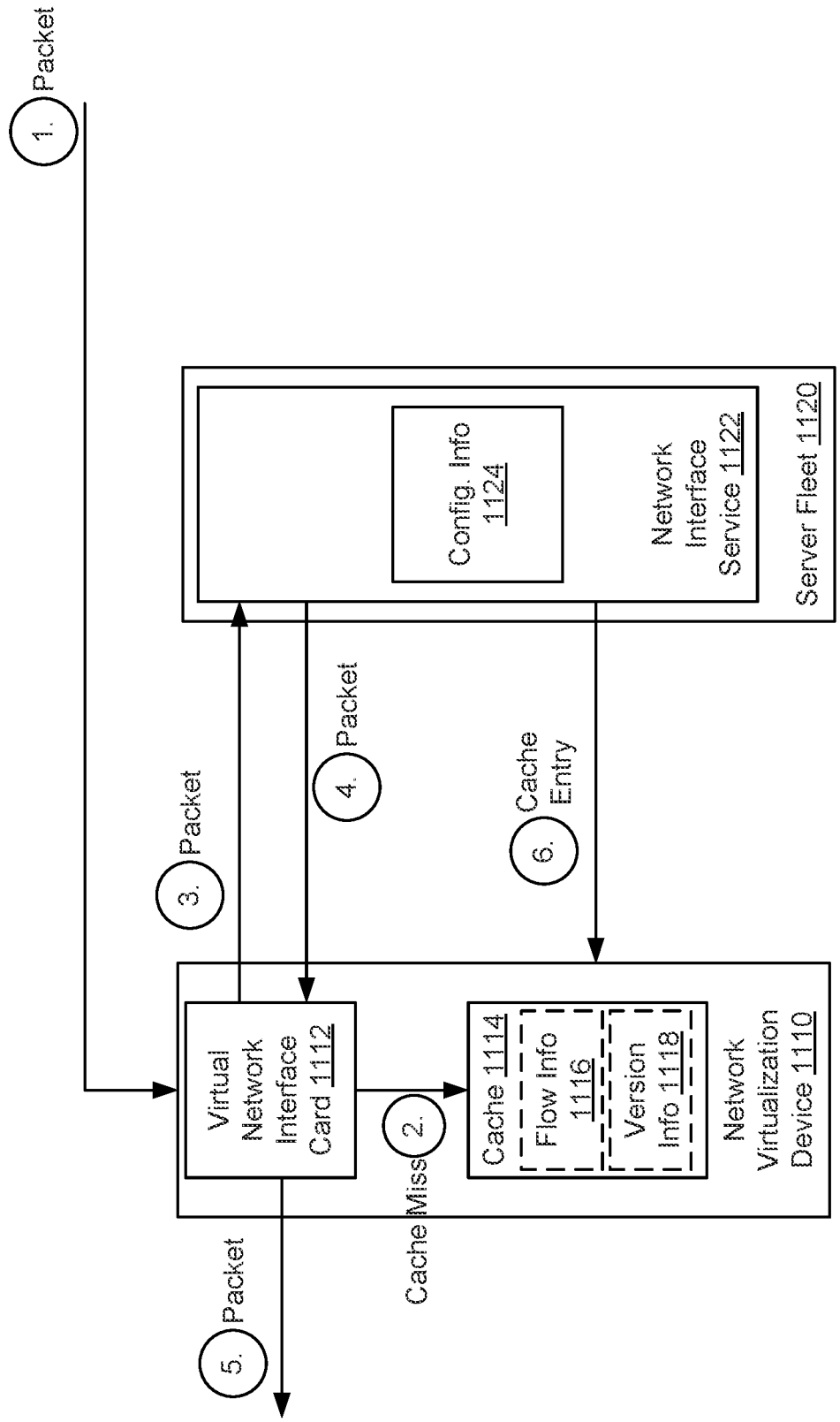
FIG. 11 illustrates an example of an inbound packet flow that results in cached flow information according to certain embodiments.

FIG. 11 illustrates an example of an inbound packet flow that results in cached flow information according to certain embodiments. Whereas FIG. 9 describes generating and caching flow information based on a flow of an outbound traffic, the example of FIG. 11 describes this process based on a flow of an inbound traffic. An NVD 1110 that hosts a VNIC 1112 is connected with a server fleet 1120 that hosts a network interface service 1122. Initially, the NVD 1110 does not store flow information that allows the VNIC 1112 to receive a packet directly from a virtual network, as further described in FIG. 12. Instead, the packet is further processed by the network interface service 1122 (e.g., via a particular service VNIC). Subsequently, the NVD 1110 receives the processed packet from the network interface service 1122 and stores the applicable flow information, thereby allowing the VNIC 1112 to send packets from directly on the virtual network. The NVD 1110, VNIC 1112, server fleet 1120, and network interface service 1122 are examples of the NVD 820, VNIC 822, server fleet 830, and network interface service 832, respectively.

In an example, the VNIC 1112 receives an inbound packet on the virtual network. Given header information in the packet, the VNIC 1112 looks up a cache 1114 of the NVD 1110 to determine whether cached flow information is available for processing the packet. The look-up results in a cache miss. Accordingly, the VNIC 1112 sends the packets to the network interface service 1122. In turn, given configuration information 1124, the network interface service 1122 processes the packet (e.g., applies rules, re-writes header information, performs encapsulation, and the like) and sends the processed packet back to the VNIC 1112 that then sends it to the compute instance with which the VNIC 1112 is attached. In addition, the network interface service 1122 generates a cache entry that includes flow information and version information associated with the flow information. The flow information can be a subset of the particular configuration information used to send the packet on the substrate network. For instance, the flow information includes at least one of a security policy, an overlay-to-substrate IP address mapping, or a route rule. The version information can indicate a current version of the flow information or of portions of the flow information. For instance, the version information is an indicator of the current version of the flow information or an indicator of the current version per portion of the flow information (e.g., the current version of the security policy, the current version of the overlay-to-substrate IP address mapping, and the current version of the route rule). The version information is usable to invalidate the cache entry, as further discussed in the next figures. The network interface service 1122 sends the cache entry to the NVD 1110. In turn, the NVD 1110 stores flow information 1116 and version information 1118 from the received cache entry as entries in the cache 1114.

As described herein above in connection with FIG. 11, a recipient NVD (e.g., the NVD 1110) caches flow information based on the inbound traffic. Variations can exist. For instance, upon receiving a packet from a VNIC, a network interface service sends the relevant flow information to both the recipient NVD and the sender NVD for caching thereat. For instance, and referring back to FIGS. 9 and 11, assume that the sender NVD is NVD 910 and the recipient NVD is the NVD 1110. Upon the VNIC 912 sending a packet (e.g., via the sender NVD 910), the network interface service (e.g., the network interface service 922 or 1122) updates both the sender NVD 910 and the recipient NVD 1110.

Furthermore, and as described in connection with FIGS. 9 and 11, upon a cache miss, a packet is sent to a network interface service triggering the network interface service to send a cache entry that includes the needed flow information. Variations here can also exist. For instance, flow information can be included in the header of a packet sent by the network interface service to an NVD or in the header of a packet sent from the sender NVD to the recipient NVD. In situations where the network interface service updates both the recipient NVD and the sender NVD, various flow information can be included in different packets (e.g., flow information is included in the packet sent to the recipient NVD and flow information is included in a response packet sent to the sender NVD). In one example variation, the sender NVD includes flow information in the header of the recipient NVD for subsequent use by the recipient NVD. In this example, the recipient NVD may not have an ingress security policy. Instead a signature can be included in the header and used by the recipient NVD for authenticating that the flow information was sent by an authorized entity.

Figure 12:
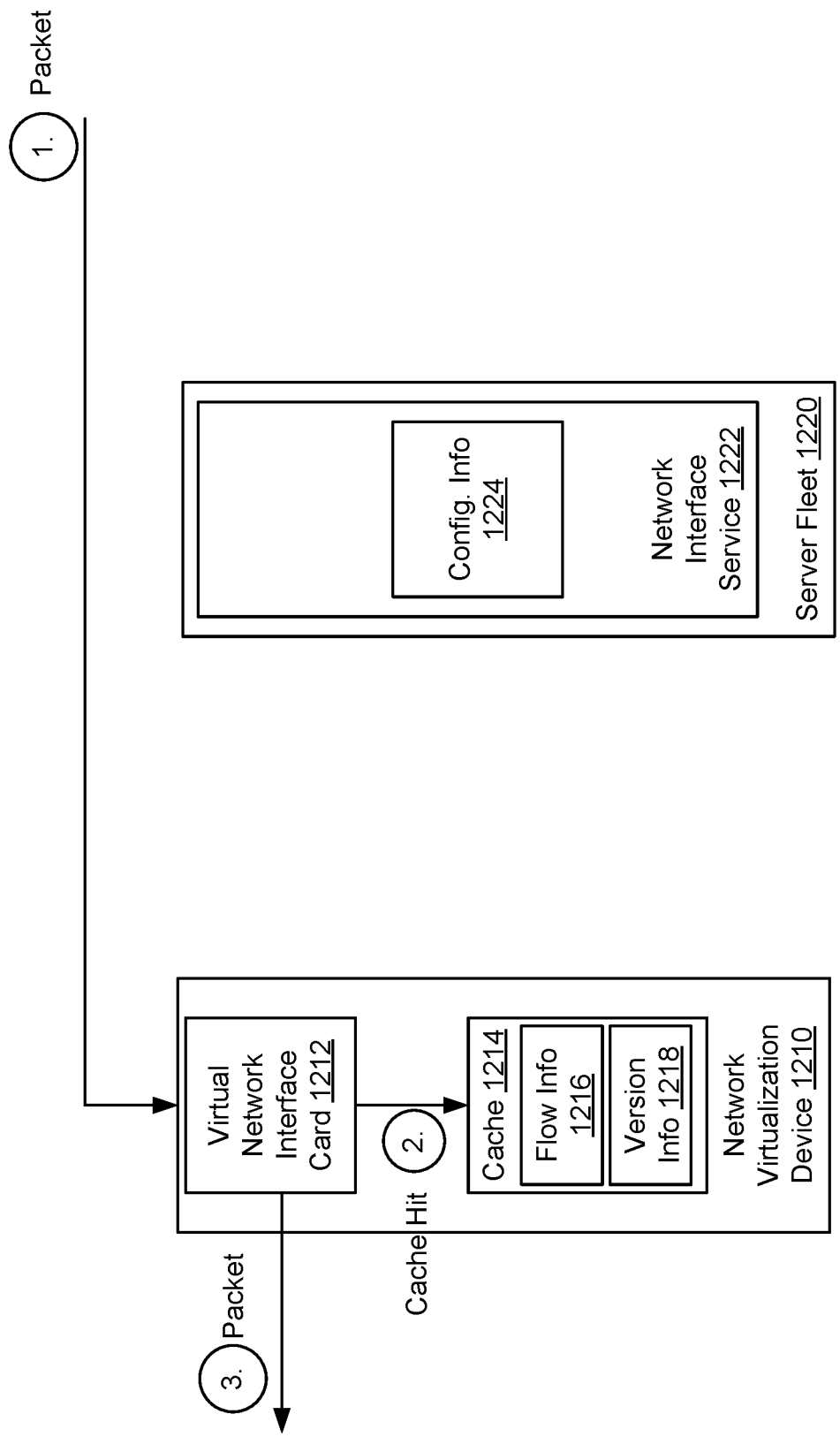
FIG. 12 illustrates an example of an inbound packet flow based on cached flow information according to certain embodiments.

FIG. 12 illustrates an example of an inbound packet flow based on cached flow information according to certain embodiments. The example of FIG. 12 continues from the example of FIG. 11. An NVD 1210 that hosts a VNIC 1212 is connected with a server fleet 1220 that hosts a network interface service 1222. The NVD 1210 stores, in a cache 1214, flow information 1216 and version information 1218. In comparison, the network interface service 1222 stores configuration information 1224. The NVD 1210, VNIC 1212, cache 1214, flow information 1216, version information 1218, server fleet 1220, network interface service 1222, and configuration information 1224 are examples of the NVD 1110, VNIC 1112, cache 1114, flow information 1116, version information 1118, server fleet 1120, network interface service 1122, and configuration information 1124, respectively.

In an example, the VNIC 1212 receives an inbound packet on a virtual network. Given header information in the packet, the VNIC 1212 looks up the cache 1214 to determine whether cached flow information is available for processing the packet. The look-up results in a cache hit with the flow information 1216. The version information 1218 indicates that the flow information 1216 is valid. Accordingly, the VNIC 1212 sends the packet to the compute instance with which the VNIC 1212 is attached without the need to send this packet to the network interface service 1222 for further processing.

Figure 13:
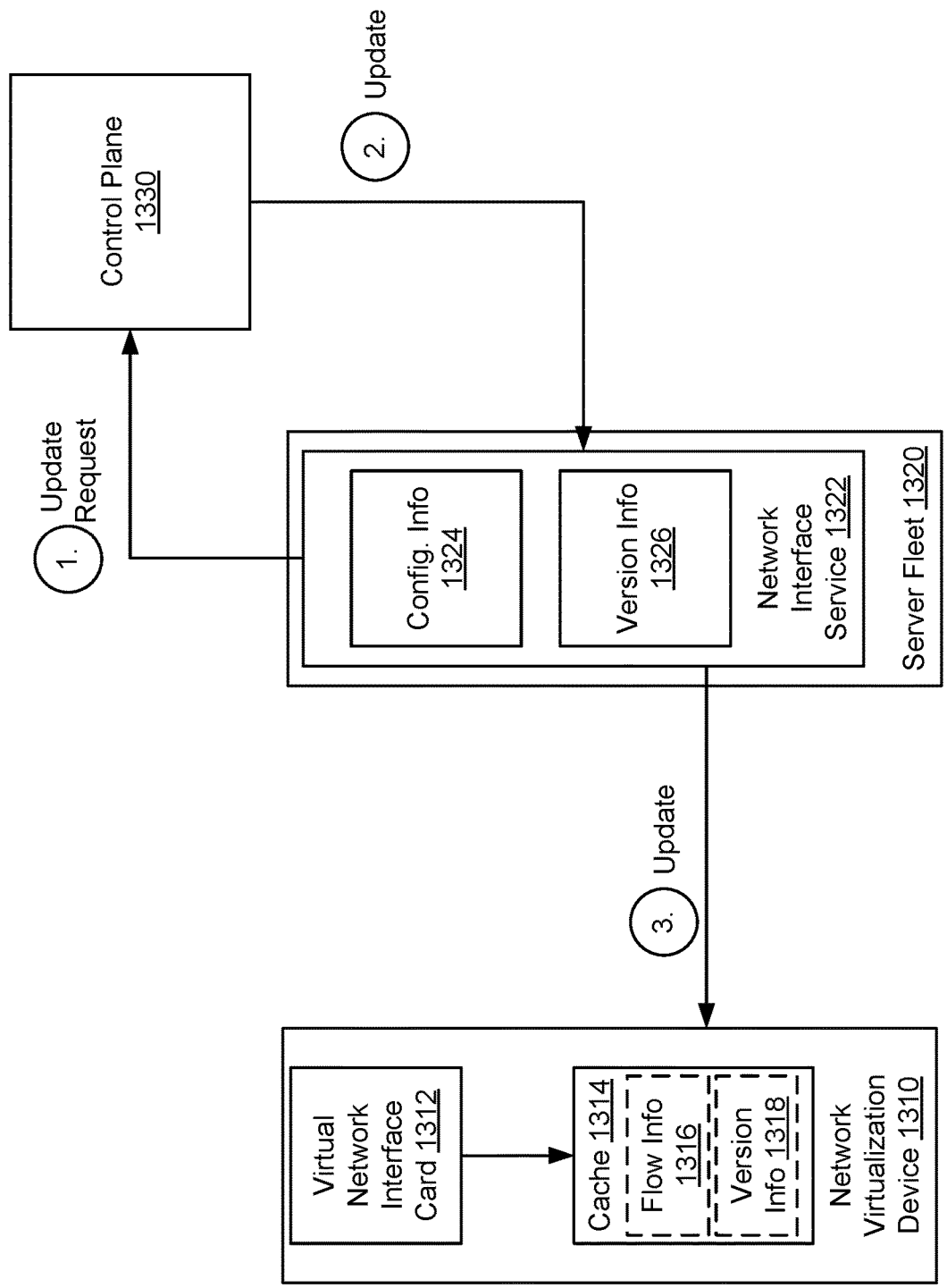
FIG. 13 illustrates an example of invalidating and updating cached flow information according to certain embodiments.

FIG. 13 illustrates an example of invalidating and updating cached flow information according to certain embodiments. In this example, the invalidation can be managed by a network interface service and the update can follow a proactive strategy (e.g., by implementing a push mechanism, updated flow information is sent to the relevant VNICs). Alternatively, the update can follow a passive strategy (e.g., by implementing a pull mechanism, where updated flow information is sent to a VNIC upon an update request from the VNIC). An NVD 1310 that hosts a VNIC 1312 is connected with a server fleet 1320 that hosts a network interface service 1322. The network interface service 1322 is connected with a control plane 1330. A computing device of a customer (now shown in FIG. 13) can connect with the control plane 1330 (e.g., application programming interface (API) calls) and update a configuration of the customer's VCN. The update can result in changes to the configuration information usable to manage the flow of packets.

In an example, the network interface service 1322 stores configuration information 1324 and version information 1326 associated with the configuration information 1324. The configuration information 1324 can include multiple portions (e.g., security policies, overlay-to-substrate IP address mappings, route rules). The version information 1326 can include an indicator of a current version of the entire configuration information 1324 and/or an indicator of the current version per portion of the configuration information 1324 (e.g., a current version of the security policies, a current version of the overlay-to-substrate IP address mappings, and a current version of the route rules). In the interest of clarity of explanation, the next paragraphs describe using a version indicator per portion of the configuration information 1324. However, the process similarly applies if one version indicator was used for the entire configuration information 1324.

The network interface service 1322 sends an update request to the control plane 1330, requesting an update to the configuration information 1324. For instance, the update request can include a vector clock populated with the version indicators. The control plane 1330 determines which of the version indicators are outdated. If none of them is outdated, no update to the configuration information 1324 is needed. Otherwise, if a version indicator is outdated, the corresponding portion of the configuration information 1324 is outdated, and the control plane 1330 sends a replacement configuration information portion with an updated version indicator. For instance, if the version indicator of the security policies indicates it is still the latest version, but the version indicator of the overlay-to-substrate IP address mappings is outdated, the control plane 1330 only sends updated overlay-to-substrate IP address mappings and an updated version indicator thereof.

In turn, the network interface service 1322 receives the update from the control plane 1330. The network interface service 1322 tracks the VNIC(s) that use flow information portion(s) that correspond to the outdated configuration information portion(s), generates updated flow information portion(s) and the corresponding version indicators, and pushes to the NVD(s) hosting the VNIC(s) the updated flow information portion(s) and the corresponding version indicator(s). For instance, the NVD 1310 receives and stores updated flow information 1316 and updated version information 1318 in its cache 1314 for use by the VNIC 1312.

As described herein above, a passive strategy can be used instead. Here, rather than pushing updates to the NVD(s), the network interface service 1322 notifies the impacted VNICs that their flow information (or portions thereof) is outdated and sends an update only upon request. For instance, upon receiving a notification that the flow information 1316 (or portions thereof) have become outdated, the VNIC 1312 can request an update thereto from the network interface service 1322. In response, the network interface service 1322 sends updated flow information (or portions thereof) and corresponding version information.

Figure 14:
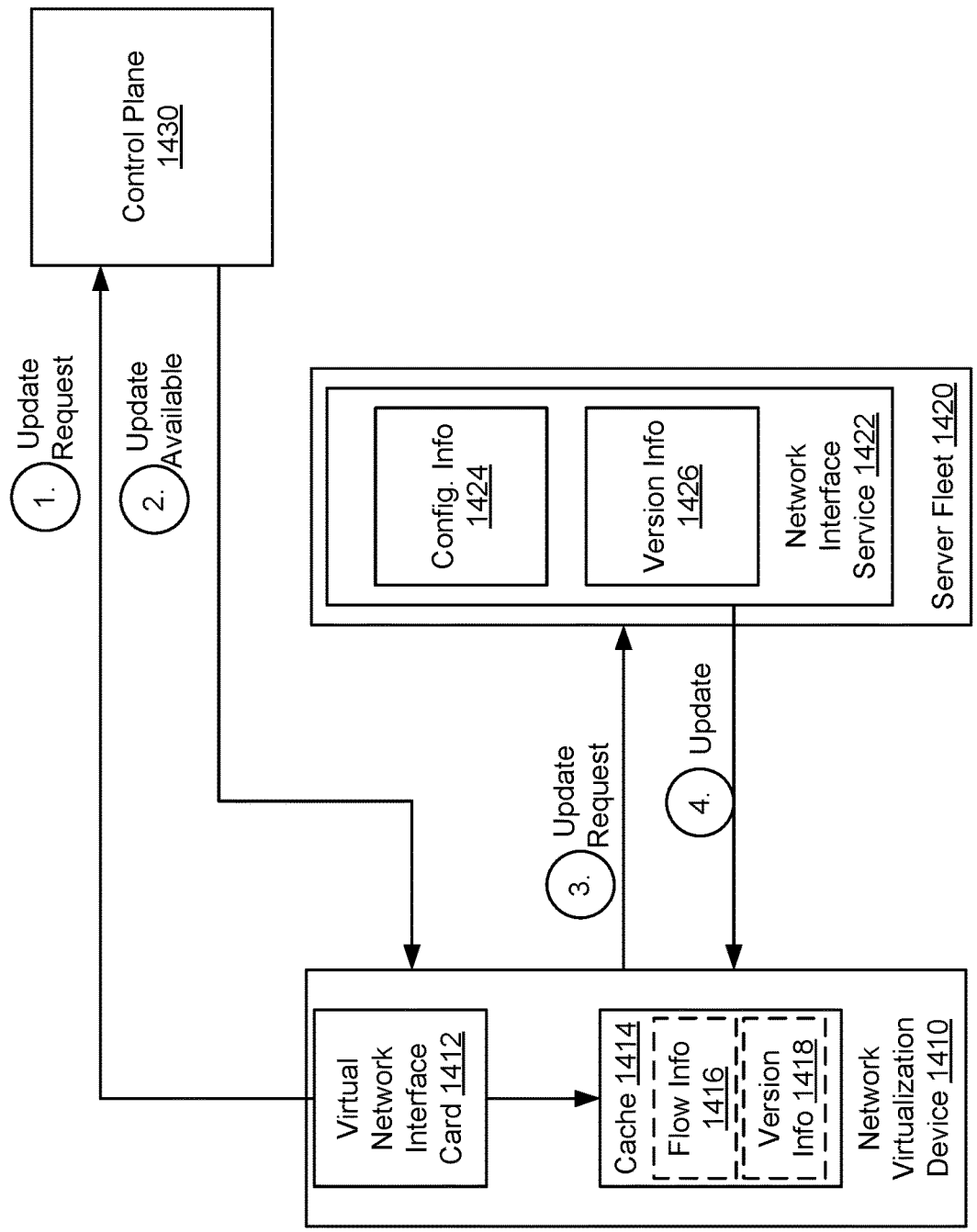
FIG. 14 illustrates another example of invalidating and updating cached flow information according to certain embodiments.

FIG. 14 illustrates another example of invalidating and updating cached flow information according to certain embodiments. In this example, the invalidation can be managed by an NVD and the update can follow a proactive strategy (e.g., by requesting an update prior to receiving a packet to which the flow information applies). Alternatively, the update can follow a passive strategy (e.g., by sending the packet to the network interface service for further processing and subsequently receiving updated flow information). An NVD 1410 that hosts a VNIC 1412 is connected with a server fleet 1420 that hosts a network interface service 1422. The network interface service 1422 is connected with a control plane 1430. A computing device of a customer (now shown in FIG. 14) can connect with the control plane 1430 and update a configuration of the customer's VCN. The update can result in changes to the configuration information usable to manage the flow of packets.

In an example, the NVD 1410 stores, in a cache 1414, flow information 1416 and version information 1418 associated with the flow information 1416. The flow information 1416 can include multiple portions (e.g., a security policy, an overlay-to-substrate IP address mapping, a route rule). The version information 1418 can include an indicator of a current version of the entire flow information 1416 and/or an indicator of the current version per portion of the flow information 1416 (e.g., a current version of the security policy, a current version of the overlay-to-substrate IP address mapping, and a current version of the route rule). In the interest of clarity of explanation, the next paragraphs describe using a version indicator per portion of the flow information 1416. However, the process similarly applies if one version indicator was used for the entire flow information 1416.

The NVD 1410 sends an update request to the control plane 1430, requesting an update to the flow information 1416. For instance, the update request can include a vector clock populated with the version indicators. The control plane 1430 determines which of the version indicators are outdated. If none of them is outdated, no update to the flow information 1416 is needed. Otherwise, if a version indicator is outdated, the corresponding portion of the flow information 1416 is outdated and the control plane 1430 sends a notification to the NVD 1410 indicating that an update is available. This notification can indicate which portion(s) of the flow information 1416 are outdated.

In a passive strategy, the NVD 1410 does not immediately update the flow information 1416. Instead, the VNIC 1412 receives a packet and determines that the flow information 1416 applies thereto (e.g., based on a cache hit). The VNIC also determines that the version information 1418 is outdated (e.g., portion(s) of the flow information 1416 are outdated, per the notification from the control plane 1430). Alternatively, upon receiving the notification, the NVD 1410 invalidates the cached flow information 1416 such that, when a cache look-up is performed, the look-up results in a cache miss. In both cases, the VNIC 1412 sends the packet to the network interface service 1422 for further processing thereat. This packet transmission represents a passive update request. The network interface service 1422 processes the packet by using the configuration information 1424 having the latest version information 1426 (which can be updated from the control plane 1430 in a manner similar to FIG. 13). Further, the network interface service 1422 sends an update to the NVD 1410, where the update includes updated flow information (e.g., the entire flow information, rather than portions thereof) and the corresponding version indicator(s). In turn, the NVD 1410 replaces the existing flow information 1416 (or outdated portion(s) thereof) and the version information 1418 (or outdated version indicator(s)) with the updated flow information portion(s) and the corresponding version indicator(s).

For instance, only the overlay-to-substrate IP mapping is outdated in the flow information 1416. The NVD 1410 receives a notification from the control plane 1430 indicating that the corresponding version indicator is outdated. Next, the VNIC 1412 sends a packet to the network interface service 1422 that would have otherwise been sent directly on the virtual network. In response, the network interface service 1422 sends the updated flow information and the corresponding version indicators. The NVD 1410 replaces the outdated overlay-to-substrate IP address mapping in the flow information 1416 and the corresponding version indicator in the version information 1418 with the updated overlay-to-substrate IP address mapping and the corresponding version indicator, respectively.

As described herein above, a proactive strategy can be used instead. Here, rather than sending the packet to the network interface service 1422 and then receiving back the update, the NVD 1410 can automatically send an update request to the network interface service 1422. This request can indicate which portions of the flow information 1416 are outdated and the network interface service 1422 may only send the updated portions. Alternatively, no such indication is made and the network interface service 1422 may send the entire flow information.

FIGS. 15-20 illustrate examples of methods for distributing configuration information and managing packet flows. Operations of the methods can be performed by a system that includes an NVD and/or a network service interface. Some or all of the instructions for performing the operations can be implemented as hardware circuitry and/or stored as computer-readable instructions on a non-transitory computer-readable medium of the system. As implemented, the instructions represent modules that include circuitry or code executable by processors of the system. The use of such instructions configures the system to perform the specific operations described herein. Each circuitry or code in combination with the relevant processor(s) represent a means for performing a respective operation(s). While the operations are illustrated in a particular order, it should be understood that no particular order is necessary and that one or more operations may be omitted, skipped, performed in parallel, and/or reordered.

Figure 15:
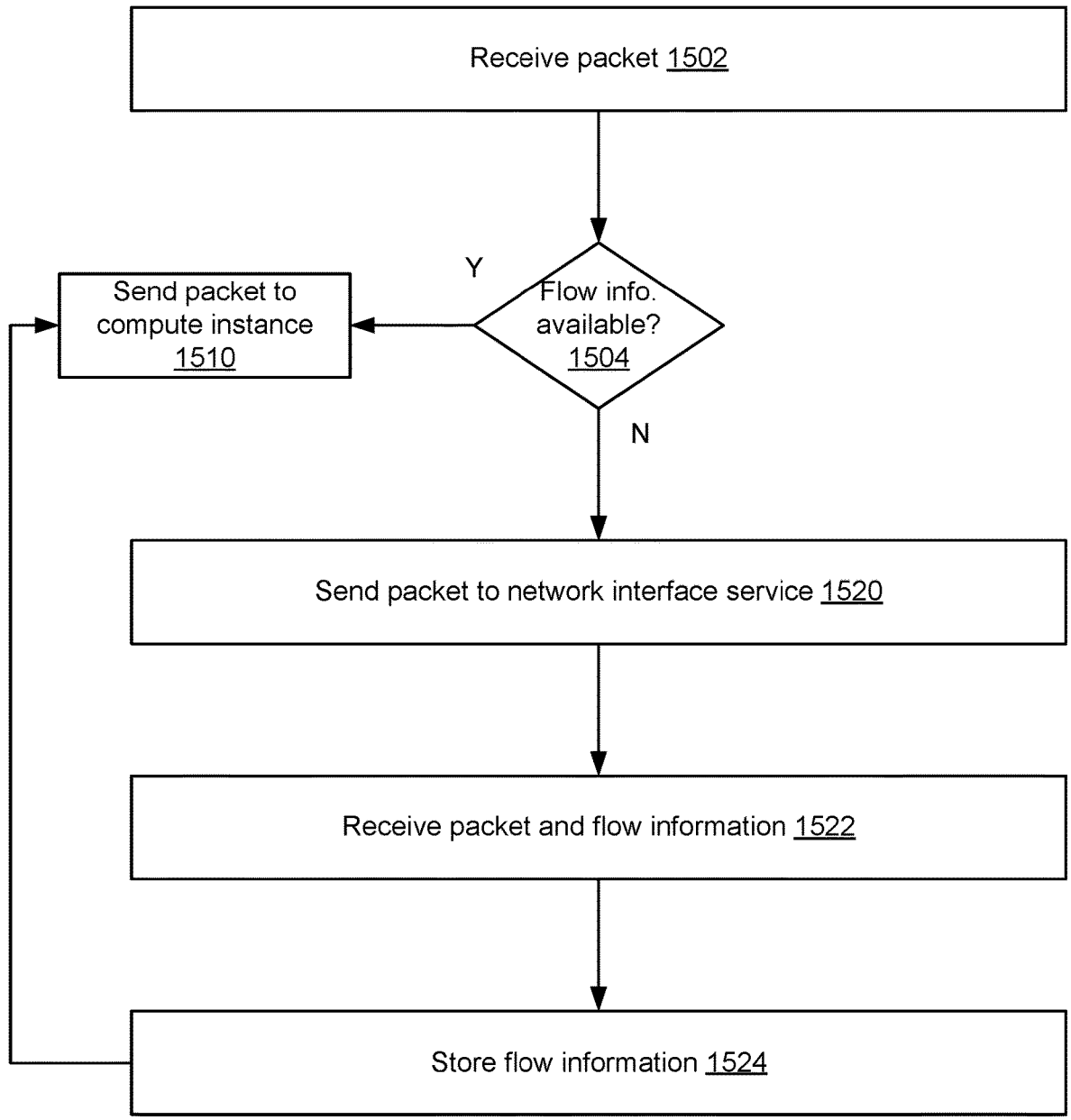
FIG. 15 illustrates an example of a method for sending a packet that results in cached flow information according to certain embodiments.

FIG. 15 illustrates an example of a method for sending a packet that results in cached flow information according to certain embodiments. Here, the packet is an outbound packet that is to be sent on a virtual network. In an example, the method includes operation 1502, where a VNIC hosted on an NVD receives the packet. The packet can be sent from a compute instance with which the VNIC is attached. At operation 1504, the VNIC determines whether flow information is available from the memory of the NVD to process the packet. For instance, the VNIC performs a cache look-up based on information from the header of the packet. If the look-up results in a cache hit, the flow information is available. In this case, operation 1510 follows operation 1504. Otherwise, operation 1520 follows operation 1504. At operation 1510, the VNIC sends the packet directly on the virtual network. For instance, the VNIC processes the packet according to the flow information to then send the processed packet (e.g., with updated header information) on the virtual network. Sending on the virtual network can include the NVD further processing the packet for transmission on the underlying substrate network. At operation 1520, no flow information is available (e.g., is not cached) to process the packet locally at the NVD. Instead, the VNIC sends the packet to a network interface service that stores configuration information usable to process the packet. At operation 1522, the NVD receives flow information. This flow information can be a subset of the configuration information that was used by the network interface service (e.g., by a service VNIC hosted thereat) to process and send the packet on the virtual network. In addition, version information associated with the flow information can be received. At operation 1524, the NVD stores the flow information and, as applicable, the version information in the memory (e.g., as a cache entry). The flow can be repeated to send additional packets on the virtual network, where the additional packets are received from the compute instance.

Figure 16:
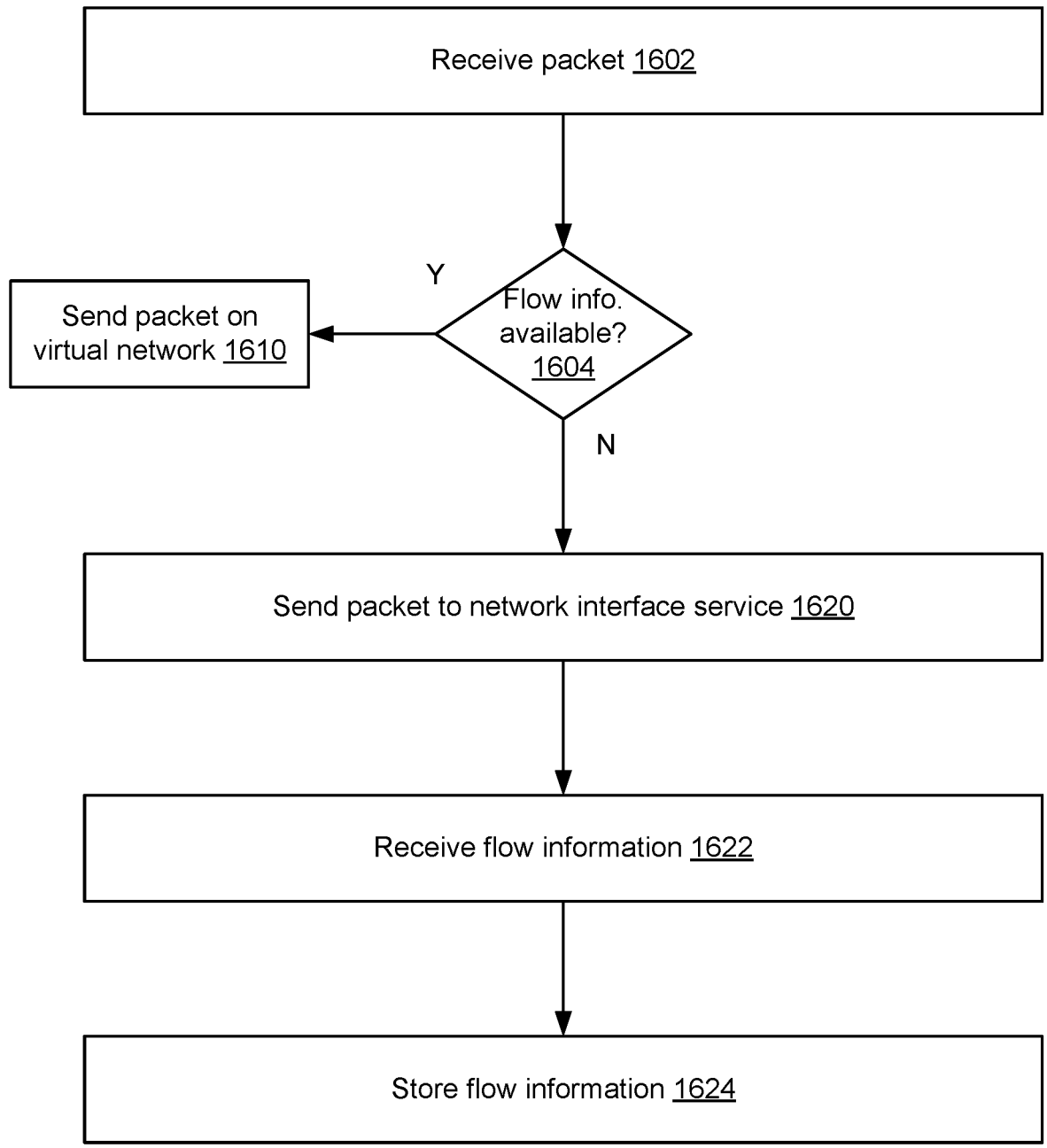
FIG. 16 illustrates an example of a method for receiving a packet that results in cached flow information according to certain embodiments.

FIG. 16 illustrates an example of a method for receiving a packet that results in cached flow information according to certain embodiments. Here, the packet is an inbound packet that is received on a virtual network. In an example, the method includes operation 1602, where a VNIC hosted on an NVD receives the packet. The packet can be sent from an endpoint on the virtual network and is destined to a compute instance with which the VNIC is attached. At operation 1604, the VNIC determines whether flow information is available from the memory of the NVD to process the packet. For instance, the VNIC performs a cache look-up based on information from the header of the packet. If the look-up results in a cache hit, the flow information is available. In this case, operation 1610 follows operation 1604. Otherwise, operation 1620 follows operation 1604. At operation 1610, the VNIC sends the packet directly on the computer instance. For instance, the VNIC processes the packet according to the flow information to then send the processed packet (e.g., with updated header information) to the compute instance via the NVD and the host machine of the compute instance. At operation 1620, no flow information is available (e.g., is not cached) to process the packet locally at the NVD. Instead, the VNIC sends the packet to a network interface service that stores configuration information usable to process the packet. At operation 1622, the NVD receives the packet back, as processed by the network interface service, and flow information. This flow information can be a subset of the configuration information that was used by the network interface service (e.g., by a service VNIC hosted thereat) to process the packet. In addition, version information associated with the flow information can be received. At operation 1624, the NVD stores the flow information and, as applicable, the version information in the memory (e.g., as a cache entry). The received packet is also sent directly to the compute instance, as illustrated with the loop from operation 1624 to operation 1610. The flow can be repeated to send additional packets to the compute instance, where the additional packets are received on the virtual network.

Figure 17:
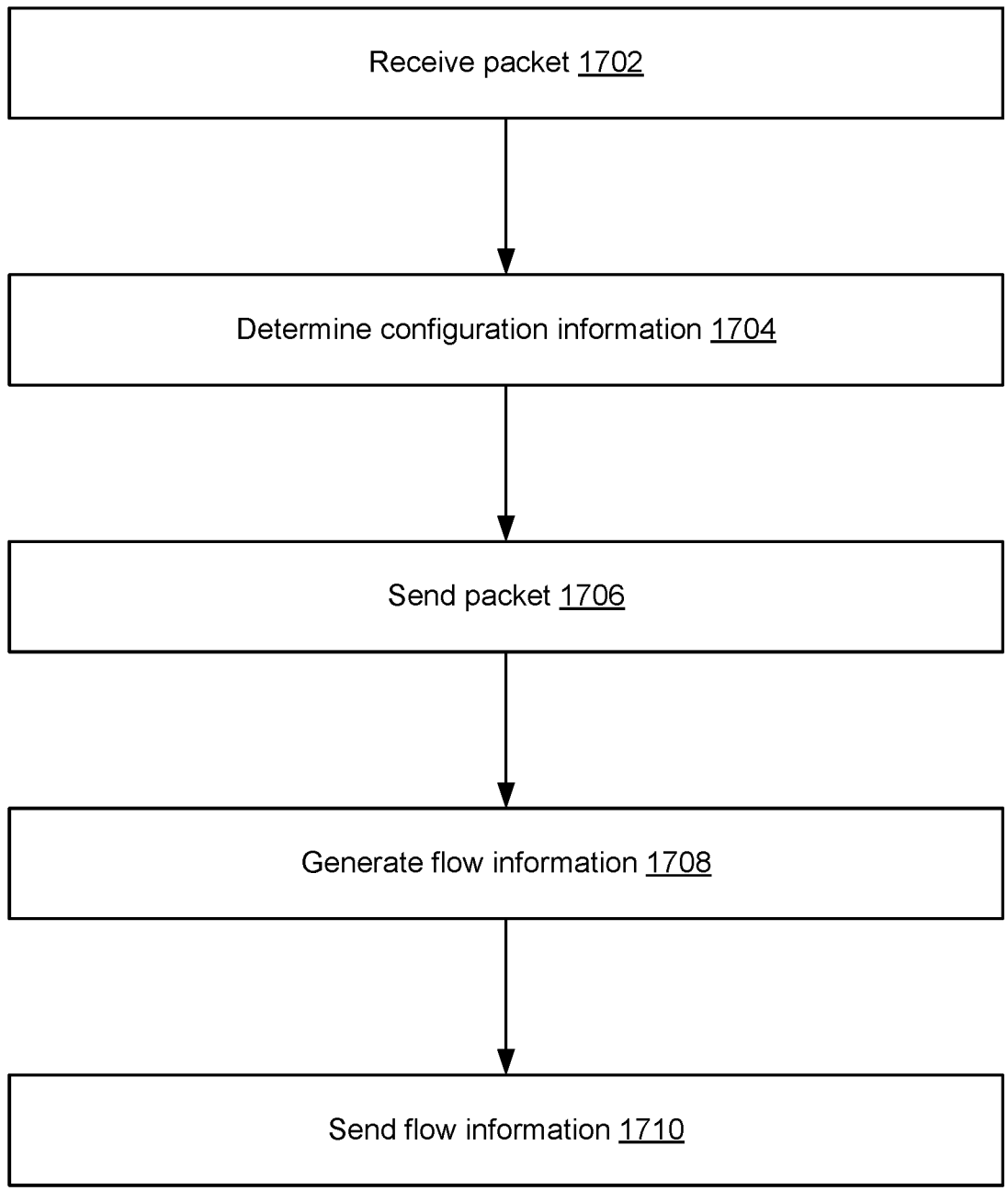
FIG. 17 illustrates an example of a method for generating and sending flow information according to certain embodiments.

FIG. 17 illustrates an example of a method for generating and sending flow information according to certain embodiments. Here, the method can be implemented by a network interface service. In an example, the method includes operation 1702, where the network interface service receives a packet. In an example, the packet is an outbound packet that originates from a compute instance and that is to be sent on a virtual network. In another example, the packet is an inbound packet that is received on the virtual network and that is destined to the compute instance. In both examples, the network interface service can receive the packet from a VNIC via an NVD that hosts the VNIC, where the NVD does not store flow information (cached) that allows the VNIC to process the packet. At operation 1704, the network interface service (e.g., a service VNIC hosted thereat) determines configuration information to process the packet. This determination can be based on header information of the packet. At operation 1706, the network interface service (e.g., the service VNIC) sends the packet based on the configuration information. Referring back to the first example, the service VNIC processes the packet according to the configuration information and sends the processed packet on the virtual network. In the second example, the service VNIC also processes the packet according to the configuration information and, instead, sends the processed packet to the VNIC of the NVD. At operation 1708, the network interface service generates flow information. For instance, the flow information is a subset of the configuration information and allows the VNIC of the NVD to process packets of the same type or similar packets locally. This flow information can correspond to the latest configuration information and can be associated with version information. At operation 1710, the network interface service sends the flow information to the NVD. In addition, the version information can be sent to the NVD.

Figure 18:
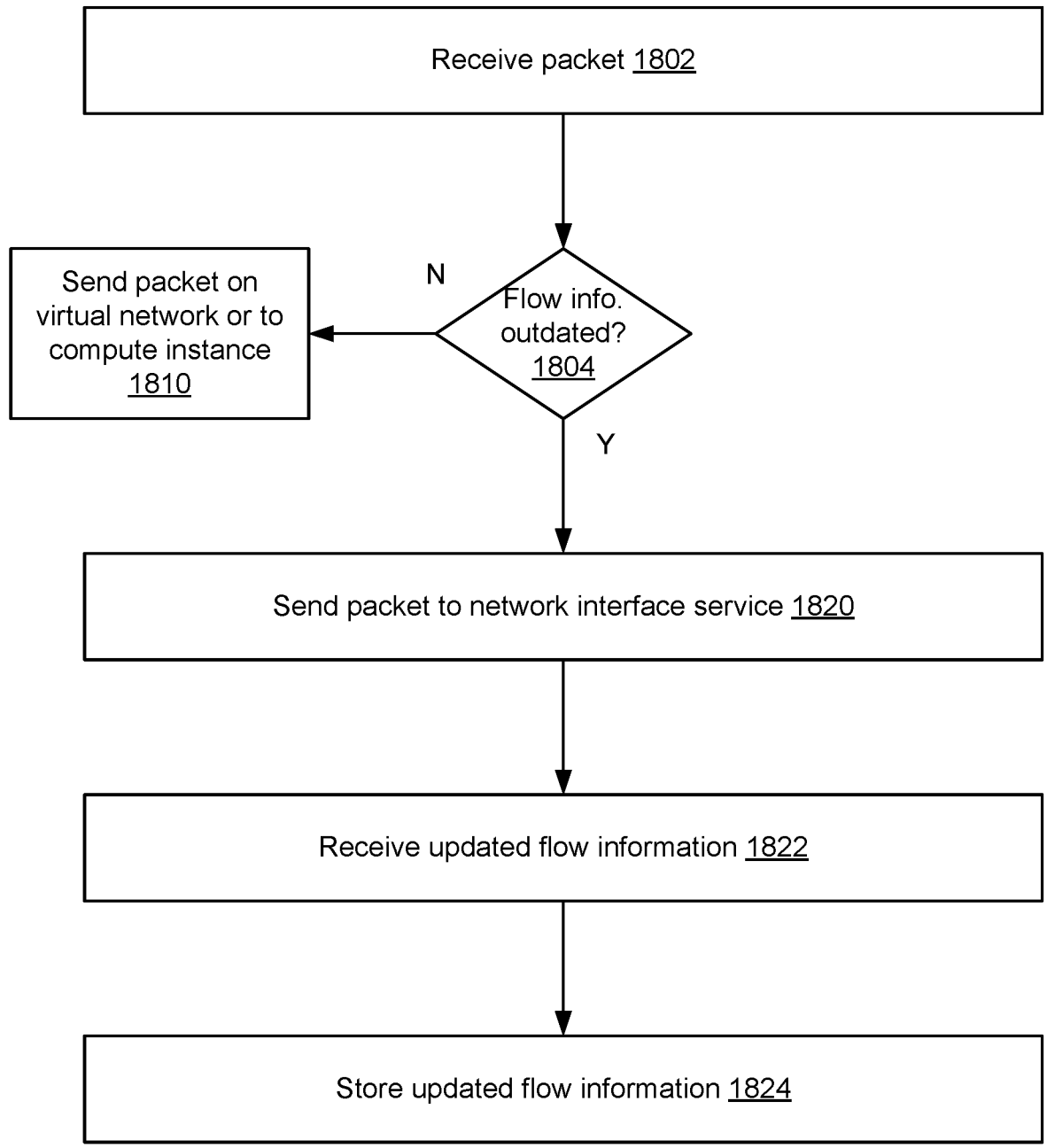
FIG. 18 illustrates an example of a method for invalidating and updating cached flow information according to certain embodiments.

FIG. 18 illustrates an example of a method for invalidating and updating cached flow information according to certain embodiments. Here, the method can be implemented by an NVD that hosts a VNIC. In an example, the method includes operation 1802, where the VNIC receives a packet. In an example, the packet is an outbound packet that originates from a compute instance and that is to be sent on a virtual network. In another example, the packet is an inbound packet that is received on the virtual network and that is destined to the compute instance. At operation 1804, the VNIC determines whether flow information is outdated, where the flow information is available from the memory of the NVD to process the packet. For instance, the VNIC determines whether version information of the flow information is outdated (or a version indicator of a portion of the flow information is outdated). This determination can include sending a vector clock to a control plane and receiving a notification about updated version information. Although operation 1804 is illustrated as following operation 1802, operation 1804 may be performed independently of operation 1804, where the cached flow information is invalidated prior to receiving the packet. If the flow information is not outdated, operation 1810 follows operation 1804. Otherwise, operation 1820 follows operation 1804. At operation 1810, the VNIC sends the packet directly on the virtual network in the case of outbound traffic or directly to the compute instance in the case of inbound traffic. At operation 1820, no valid flow information is available to process the packet locally at the NVD. Instead, the VNIC sends the packet to a network interface service that stores configuration information usable to process the packet. At operation 1822, the NVD receives flow information (and the packet in the case of the inbound traffic). This flow information can be a subset of the configuration information that was used by the network interface service (e.g., by a service VNIC hosted thereat) to process and send the packet on the overlay substrate or back to the VNIC. In addition, version information associated with the flow information can be received. At operation 1824, the NVD stores the flow information and, as applicable, the version information in the memory (e.g., as a cache entry). The flow can be repeated to send additional packets, where the additional packets are received from the compute instance or from the virtual network.

Figure 19:
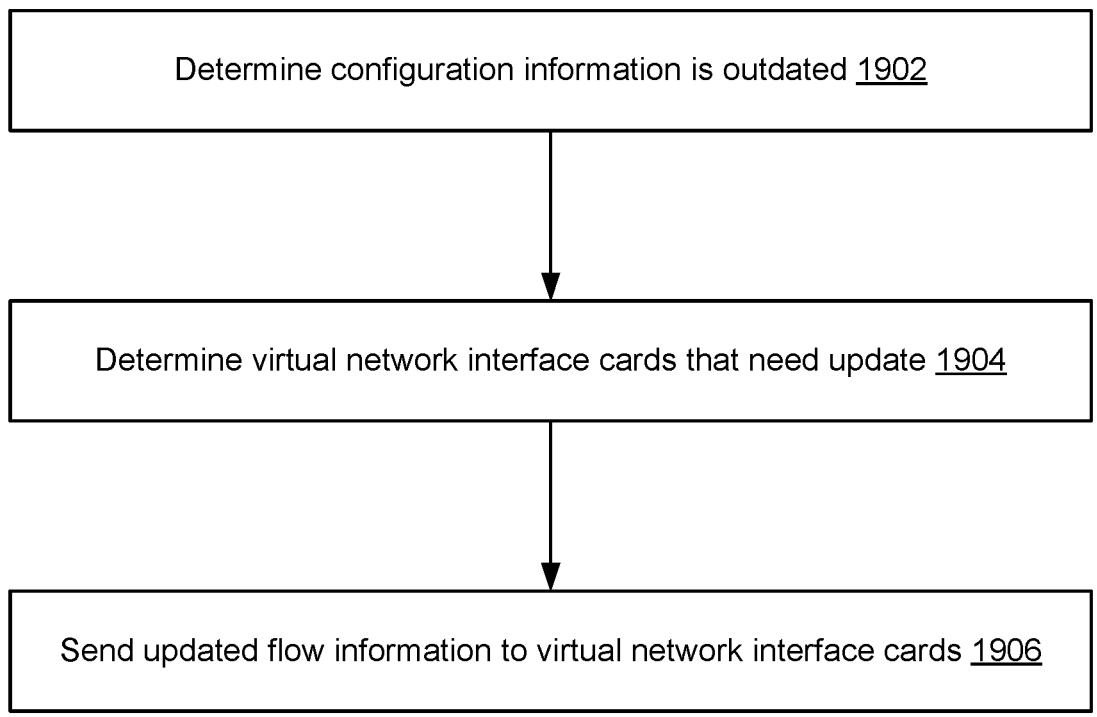
FIG. 19 illustrates another example of a method for invalidating and updating cached flow information according to certain embodiments.

FIG. 19 illustrates another example of a method for invalidating and updating cached flow information according to certain embodiments. Here, the method can be implemented by a network interface service. In an example, the method includes operation 1902, where the network interface service determines that configuration information is outdated. For instance, the network interface service determines that version information of the configuration information is outdated (or a version indicator of a portion of the flow information is outdated). This determination can include sending a vector clock to a control plane and receiving a notification about updated version information and/or receiving updated configuration information (or updated portions thereof). At operation 1904, the network interface service determines VNICs that need to be updated based on the update from the control plane. For instance, the network interface service tracks, per VNIC on an NVD, the corresponding configuration information and the version information associated therewith. If the update impacts the configuration information used for a VNIC, the network interface service determines that this VNIC is to be updated. At operation 1906, the network interface service sends updated flow information and, optionally, version information to the impacted VNICs. The updated flow information can be generated as a subset from the updated configuration information. The entire updated flow information can be pushed or, alternatively, only the updated portion(s) thereof can be pushed along with the latest version indicator(s).

Figure 20:
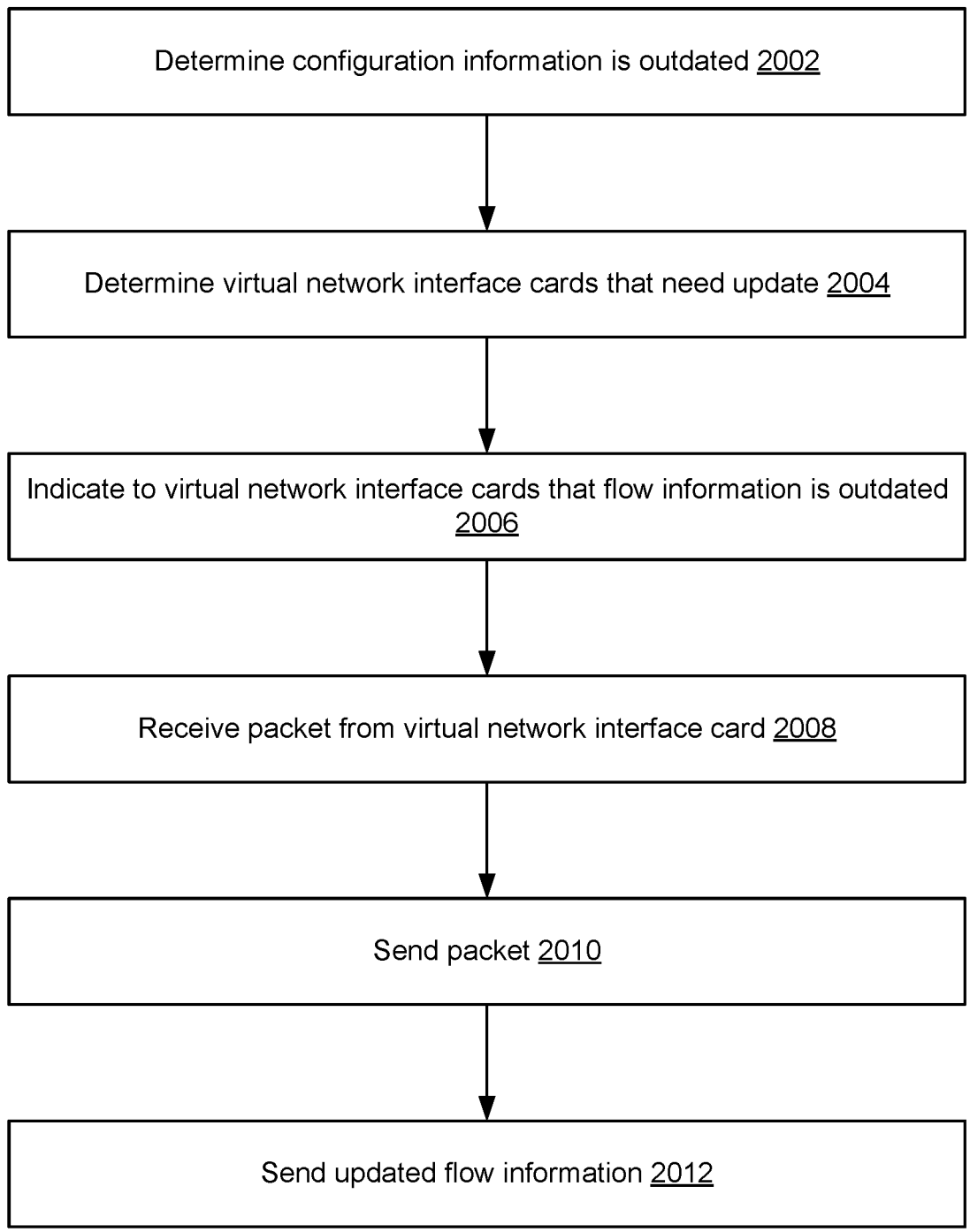
FIG. 20 illustrates another example of a method for invalidating and updating cached flow information according to certain embodiments.

FIG. 20 illustrates another example of a method for invalidating and updating cached flow information according to certain embodiments. Here, the method can be implemented by a network interface service and follows a passive strategy to complete the update. In an example, the method includes operation 2002, where the network interface service determines that configuration information is outdated, similarly to operation 1902. At operation 2004, the network interface service determines VNICs that need to be updated, similarly to operation 1904. At operation 2006, the network interface service indicates to a VNIC that its flow information is outdated (or portion(s) thereof are outdated). For instance, a notification can be sent, resulting in an invalidation of the corresponding cached entry. At operation 2008, the network interface service receives a packet from the VNIC. The packet can be an inbound packet or an outbound packet. At operation 2010, the network interface service uses the updated configuration information to process and send the packet. In the case of outbound traffic, the packet is sent on a virtual network (e.g., via a service VNIC). In the case of inbound traffic, the packet is sent back to the VNIC. At operation 2012, the network interface service sends updated flow information and, optionally, version information to the VNIC. The updated flow information can be generated as a subset from the updated configuration information. The entire updated flow information can be sent or, alternatively, only the updated portion(s) thereof can be sent along with the latest version indicator(s).

Example Infrastructure as a Service Architectures

As noted above, infrastructure as a service (IaaS) is one particular type of cloud computing. IaaS can be configured to provide virtualized computing resources over a public network (e.g., the Internet). In an IaaS model, a cloud computing provider can host the infrastructure components (e.g., servers, storage devices, network nodes (e.g., hardware), deployment software, platform virtualization (e.g., a hypervisor layer), or the like). In some cases, an IaaS provider may also supply a variety of services to accompany those infrastructure components (e.g., billing, monitoring, logging, security, load balancing and clustering, etc.). Thus, as these services may be policy-driven, IaaS users may be able to implement policies to drive load balancing to maintain application availability and performance.

In some instances, IaaS customers may access resources and services through a wide area network (WAN), such as the Internet, and can use the cloud provider's services to install the remaining elements of an application stack. For example, the user can log in to the IaaS platform to create virtual machines (VMs), install operating systems (OSs) on each VM, deploy middleware such as databases, create storage buckets for workloads and backups, and even install enterprise software into that VM. Customers can then use the provider's services to perform various functions, including balancing network traffic, troubleshooting application issues, monitoring performance, managing disaster recovery, etc.

In most cases, a cloud computing model will require the participation of a cloud provider. The cloud provider may, but need not be, a third-party service that specializes in providing (e.g., offering, renting, selling) IaaS. An entity might also opt to deploy a private cloud, becoming its own provider of infrastructure services.

In some examples, IaaS deployment is the process of putting a new application, or a new version of an application, onto a prepared application server or the like. It may also include the process of preparing the server (e.g., installing libraries, daemons, etc.). This is often managed by the cloud provider, below the hypervisor layer (e.g., the servers, storage, network hardware, and virtualization). Thus, the customer may be responsible for handling (OS), middleware, and/or application deployment (e.g., on self-service virtual machines (e.g., that can be spun up on demand) or the like.

In some examples, IaaS provisioning may refer to acquiring computers or virtual hosts for use, and even installing needed libraries or services on them. In most cases, deployment does not include provisioning, and the provisioning may need to be performed first.

In some cases, there are two different challenges for IaaS provisioning. First, there is the initial challenge of provisioning the initial set of infrastructure before anything is running. Second, there is the challenge of evolving the existing infrastructure (e.g., adding new services, changing services, removing services, etc.) once everything has been provisioned. In some cases, these two challenges may be addressed by enabling the configuration of the infrastructure to be defined declaratively. In other words, the infrastructure (e.g., what components are needed and how they interact) can be defined by one or more configuration files. Thus, the overall topology of the infrastructure (e.g., what resources depend on which, and how they each work together) can be described declaratively. In some instances, once the topology is defined, a workflow can be generated that creates and/or manages the different components described in the configuration files.

In some examples, an infrastructure may have many interconnected elements. For example, there may be one or more virtual private clouds (VPCs) (e.g., a potentially on-demand pool of configurable and/or shared computing resources), also known as a core network. In some examples, there may also be one or more security group rules provisioned to define how the security of the network will be set up and one or more virtual machines (VMs). Other infrastructure elements may also be provisioned, such as a load balancer, a database, or the like. As more and more infrastructure elements are desired and/or added, the infrastructure may incrementally evolve.

In some instances, continuous deployment techniques may be employed to enable deployment of infrastructure code across various virtual computing environments. Additionally, the described techniques can enable infrastructure management within these environments. In some examples, service teams can write code that is desired to be deployed to one or more, but often many, different production environments (e.g., across various different geographic locations, sometimes spanning the entire world). However, in some examples, the infrastructure on which the code will be deployed must first be set up. In some instances, the provisioning can be done manually, a provisioning tool may be utilized to provision the resources, and/or deployment tools may be utilized to deploy the code once the infrastructure is provisioned.

Figure 21:
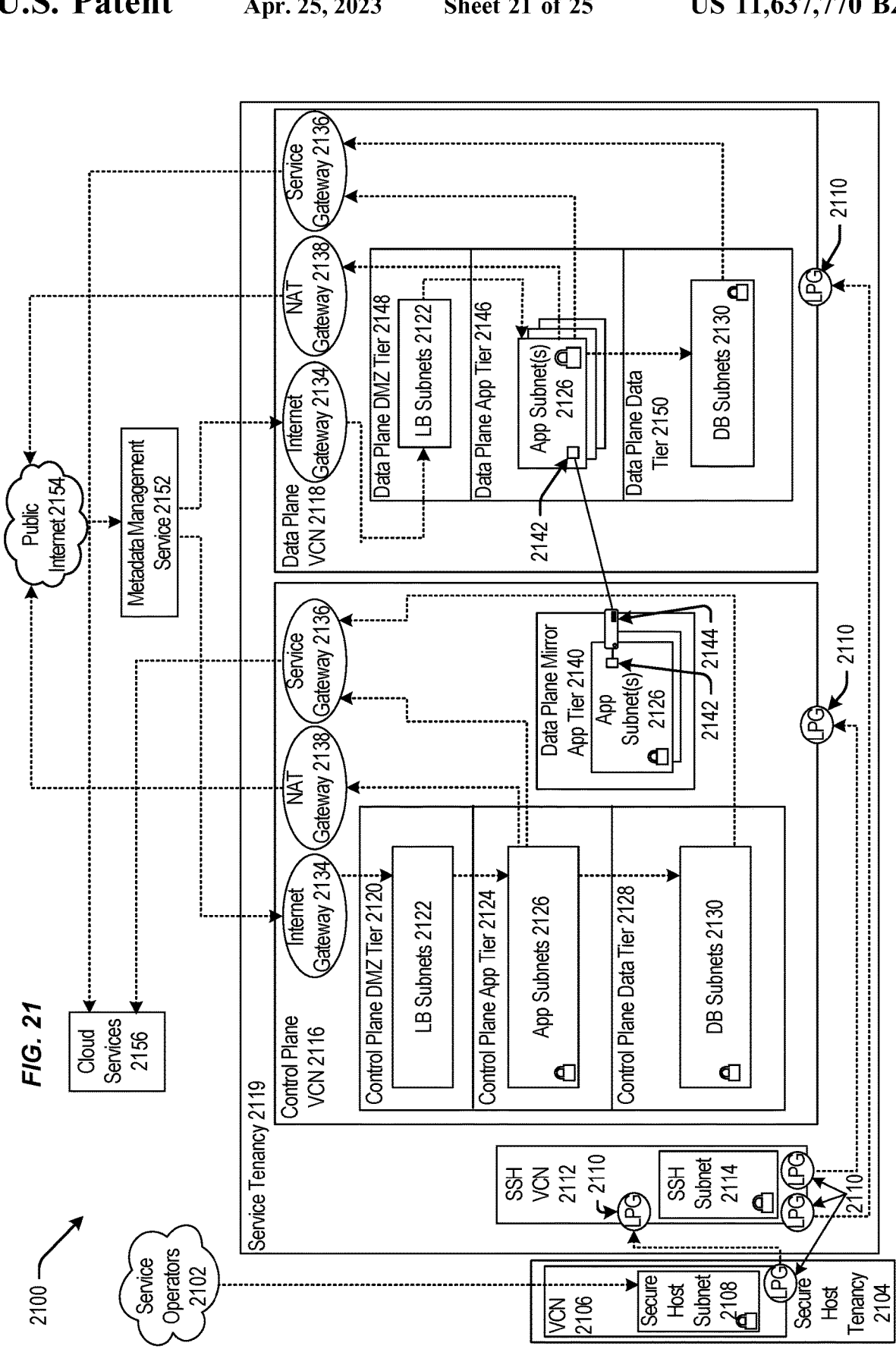
FIG. 21 is a block diagram illustrating one pattern for implementing a cloud infrastructure as a service system, according to at least one embodiment.

FIG. 21 is a block diagram 2100 illustrating an example pattern of an IaaS architecture, according to at least one embodiment. Service operators 2102 can be communicatively coupled to a secure host tenancy 2104 that can include a virtual cloud network (VCN) 2106 and a secure host subnet 2108. In some examples, the service operators 2102 may be using one or more client computing devices, which may be portable handheld devices (e.g., an iPhone®, cellular telephone, an iPad®, computing tablet, a personal digital assistant (PDA)) or wearable devices (e.g., a Google Glass® head-mounted display), running software such as Microsoft Windows Mobile®, and/or a variety of mobile operating systems such as iOS, Windows Phone, Android, BlackBerry 8, Palm OS, and the like, and being Internet, e-mail, short message service (SMS), Blackberry®, or other communication protocol enabled. Alternatively, the client computing devices can be general purpose personal computers including, by way of example, personal computers and/or laptop computers running various versions of Microsoft Windows®, Apple Macintosh®, and/or Linux operating systems. The client computing devices can be workstation computers running any of a variety of commercially-available UNIX® or UNIX-like operating systems, including without limitation the variety of GNU/Linux operating systems, such as for example, Google Chrome OS. Alternatively, or in addition, client computing devices may be any other electronic device, such as a thin-client computer, an Internet-enabled gaming system (e.g., a Microsoft Xbox gaming console with or without a Kinect® gesture input device), and/or a personal messaging device, capable of communicating over a network that can access the VCN 2106 and/or the Internet.

The VCN 2106 can include a local peering gateway (LPG) 2110 that can be communicatively coupled to a secure shell (SSH) VCN 2112 via an LPG 2110 contained in the SSH VCN 2112. The SSH VCN 2112 can include an SSH subnet 2114, and the SSH VCN 2112 can be communicatively coupled to a control plane VCN 2116 via the LPG 2110 contained in the control plane VCN 2116. Also, the SSH VCN 2112 can be communicatively coupled to a data plane VCN 2118 via an LPG 2110. The control plane VCN 2116 and the data plane VCN 2118 can be contained in a service tenancy 2119 that can be owned and/or operated by the IaaS provider.

The control plane VCN 2116 can include a control plane demilitarized zone (DMZ) tier 2120 that acts as a perimeter network (e.g., portions of a corporate network between the corporate intranet and external networks). The DMZ-based servers may have restricted responsibilities and help keep security breaches contained. Additionally, the DMZ tier 2120 can include one or more load balancer (LB) subnet(s) 2122, a control plane app tier 2124 that can include app subnet(s) 2126, a control plane data tier 2128 that can include database (DB) subnet(s) 2130 (e.g., frontend DB subnet(s) and/or backend DB subnet(s)). The LB subnet(s) 2122 contained in the control plane DMZ tier 2120 can be communicatively coupled to the app subnet(s) 2126 contained in the control plane app tier 2124 and an Internet gateway 2134 that can be contained in the control plane VCN 2116, and the app subnet(s) 2126 can be communicatively coupled to the DB subnet(s) 2130 contained in the control plane data tier 2128 and a service gateway 2136 and a network address translation (NAT) gateway 2138. The control plane VCN 2116 can include the service gateway 2136 and the NAT gateway 2138.

The control plane VCN 2116 can include a data plane mirror app tier 2140 that can include app subnet(s) 2126. The app subnet(s) 2126 contained in the data plane mirror app tier 2140 can include a virtual network interface controller (VNIC) 2142 that can execute a compute instance 2144. The compute instance 2144 can communicatively couple the app subnet(s) 2126 of the data plane mirror app tier 2140 to app subnet(s) 2126 that can be contained in a data plane app tier 2146.

The data plane VCN 2118 can include the data plane app tier 2146, a data plane DMZ tier 2148, and a data plane data tier 2150. The data plane DMZ tier 2148 can include LB subnet(s) 2122 that can be communicatively coupled to the app subnet(s) 2126 of the data plane app tier 2146 and the Internet gateway 2134 of the data plane VCN 2118. The app subnet(s) 2126 can be communicatively coupled to the service gateway 2136 of the data plane VCN 2118 and the NAT gateway 2138 of the data plane VCN 2118. The data plane data tier 2150 can also include the DB subnet(s) 2130 that can be communicatively coupled to the app subnet(s) 2126 of the data plane app tier 2146.

The Internet gateway 2134 of the control plane VCN 2116 and of the data plane VCN 2118 can be communicatively coupled to a metadata management service 2152 that can be communicatively coupled to public Internet 2154. Public Internet 2154 can be communicatively coupled to the NAT gateway 2138 of the control plane VCN 2116 and of the data plane VCN 2118. The service gateway 2136 of the control plane VCN 2116 and of the data plane VCN 2118 can be communicatively coupled to cloud services 2156.

In some examples, the service gateway 2136 of the control plane VCN 2116 or of the data plane VCN 2118 can make application programming interface (API) calls to cloud services 2156 without going through public Internet 2154. The API calls to cloud services 2156 from the service gateway 2136 can be one-way: the service gateway 2136 can make API calls to cloud services 2156, and cloud services 2156 can send requested data to the service gateway 2136. But, cloud services 2156 may not initiate API calls to the service gateway 2136.

In some examples, the secure host tenancy 2104 can be directly connected to the service tenancy 2119, which may be otherwise isolated. The secure host subnet 2108 can communicate with the SSH subnet 2114 through an LPG 2110 that may enable two-way communication over an otherwise isolated system. Connecting the secure host subnet 2108 to the SSH subnet 2114 may give the secure host subnet 2108 access to other entities within the service tenancy 2119.

The control plane VCN 2116 may allow users of the service tenancy 2119 to set up or otherwise provision desired resources. Desired resources provisioned in the control plane VCN 2116 may be deployed or otherwise used in the data plane VCN 2118. In some examples, the control plane VCN 2116 can be isolated from the data plane VCN 2118, and the data plane mirror app tier 2140 of the control plane VCN 2116 can communicate with the data plane app tier 2146 of the data plane VCN 2118 via VNICs 2142 that can be contained in the data plane mirror app tier 2140 and the data plane app tier 2146.

In some examples, users of the system, or customers, can make requests, for example create, read, update, or delete (CRUD) operations, through public Internet 2154 that can communicate the requests to the metadata management service 2152. The metadata management service 2152 can communicate the request to the control plane VCN 2116 through the Internet gateway 2134. The request can be received by the LB subnet(s) 2122 contained in the control plane DMZ tier 2120. The LB subnet(s) 2122 may determine that the request is valid, and in response to this determination, the LB subnet(s) 2122 can transmit the request to app subnet(s) 2126 contained in the control plane app tier 2124. If the request is validated and requires a call to public Internet 2154, the call to public Internet 2154 may be transmitted to the NAT gateway 2138 that can make the call to public Internet 2154. Memory that may be desired to be stored by the request can be stored in the DB subnet(s) 2130.

In some examples, the data plane mirror app tier 2140 can facilitate direct communication between the control plane VCN 2116 and the data plane VCN 2118. For example, changes, updates, or other suitable modifications to configuration may be desired to be applied to the resources contained in the data plane VCN 2118. Via a VNIC 2142, the control plane VCN 2116 can directly communicate with, and can thereby execute the changes, updates, or other suitable modifications to configuration to, resources contained in the data plane VCN 2118.

In some embodiments, the control plane VCN 2116 and the data plane VCN 2118 can be contained in the service tenancy 2119. In this case, the user, or the customer, of the system may not own or operate either the control plane VCN 2116 or the data plane VCN 2118. Instead, the IaaS provider may own or operate the control plane VCN 2116 and the data plane VCN 2118, both of which may be contained in the service tenancy 2119. This embodiment can enable isolation of networks that may prevent users or customers from interacting with other users', or other customers', resources. Also, this embodiment may allow users or customers of the system to store databases privately without needing to rely on public Internet 2154, which may not have a desired level of security, for storage.

In other embodiments, the LB subnet(s) 2122 contained in the control plane VCN 2116 can be configured to receive a signal from the service gateway 2136. In this embodiment, the control plane VCN 2116 and the data plane VCN 2118 may be configured to be called by a customer of the IaaS provider without calling public Internet 2154. Customers of the IaaS provider may desire this embodiment since database(s) that the customers use may be controlled by the IaaS provider and may be stored on the service tenancy 2119, which may be isolated from public Internet 2154.

Figure 22:
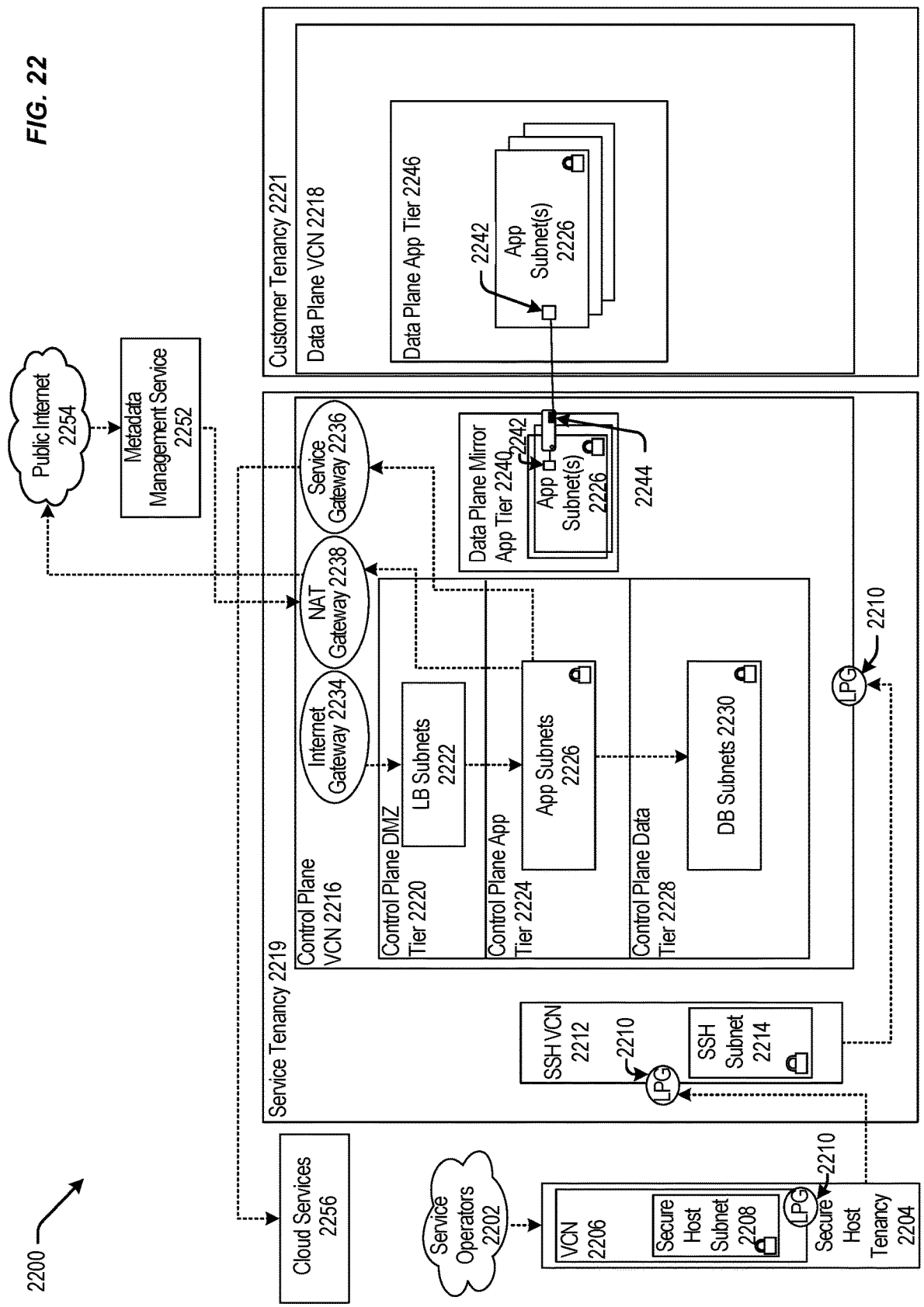
FIG. 22 is a block diagram illustrating another pattern for implementing a cloud infrastructure as a service system, according to at least one embodiment.

FIG. 22 is a block diagram 2200 illustrating another example pattern of an IaaS architecture, according to at least one embodiment. Service operators 2202 (e.g. service operators 2102 of FIG. 21) can be communicatively coupled to a secure host tenancy 2204 (e.g. the secure host tenancy 2104 of FIG. 21) that can include a virtual cloud network (VCN) 2206 (e.g. the VCN 2106 of FIG. 21) and a secure host subnet 2208 (e.g. the secure host subnet 2108 of FIG. 21). The VCN 2206 can include a local peering gateway (LPG) 2210 (e.g. the LPG 2110 of FIG. 21) that can be communicatively coupled to a secure shell (SSH) VCN 2212 (e.g. the SSH VCN 2112 of FIG. 21) via an LPG 2110 contained in the SSH VCN 2212. The SSH VCN 2212 can include an SSH subnet 2214 (e.g. the SSH subnet 2114 of FIG. 21), and the SSH VCN 2212 can be communicatively coupled to a control plane VCN 2216 (e.g. the control plane VCN 2116 of FIG. 21) via an LPG 2210 contained in the control plane VCN 2216. The control plane VCN 2216 can be contained in a service tenancy 2219 (e.g. the service tenancy 2119 of FIG. 21), and the data plane VCN 2218 (e.g. the data plane VCN 2118 of FIG. 21) can be contained in a customer tenancy 2221 that may be owned or operated by users, or customers, of the system.

The control plane VCN 2216 can include a control plane DMZ tier 2220 (e.g. the control plane DMZ tier 2120 of FIG. 21) that can include LB subnet(s) 2222 (e.g. LB subnet(s) 2122 of FIG. 21), a control plane app tier 2224 (e.g. the control plane app tier 2124 of FIG. 21) that can include app subnet(s) 2226 (e.g. app subnet(s) 2126 of FIG. 21), a control plane data tier 2228 (e.g. the control plane data tier 2128 of FIG. 21) that can include database (DB) subnet(s) 2230 (e.g. similar to DB subnet(s) 2130 of FIG. 21). The LB subnet(s) 2222 contained in the control plane DMZ tier 2220 can be communicatively coupled to the app subnet(s) 2226 contained in the control plane app tier 2224 and an Internet gateway 2234 (e.g. the Internet gateway 2134 of FIG. 21) that can be contained in the control plane VCN 2216, and the app subnet(s) 2226 can be communicatively coupled to the DB subnet(s) 2230 contained in the control plane data tier 2228 and a service gateway 2236 (e.g. the service gateway of FIG. 21) and a network address translation (NAT) gateway 2238 (e.g. the NAT gateway 2138 of FIG. 21). The control plane VCN 2216 can include the service gateway 2236 and the NAT gateway 2238.

The control plane VCN 2216 can include a data plane mirror app tier 2240 (e.g. the data plane mirror app tier 2140 of FIG. 21) that can include app subnet(s) 2226. The app subnet(s) 2226 contained in the data plane mirror app tier 2240 can include a virtual network interface controller (VNIC) 2242 (e.g. the VNIC of 2142) that can execute a compute instance 2244 (e.g. similar to the compute instance 2144 of FIG. 21). The compute instance 2244 can facilitate communication between the app subnet(s) 2226 of the data plane mirror app tier 2240 and the app subnet(s) 2226 that can be contained in a data plane app tier 2246 (e.g. the data plane app tier 2146 of FIG. 21) via the VNIC 2242 contained in the data plane mirror app tier 2240 and the VNIC 2242 contained in the data plane app tier 2246.

The Internet gateway 2234 contained in the control plane VCN 2216 can be communicatively coupled to a metadata management service 2252 (e.g. the metadata management service 2152 of FIG. 21) that can be communicatively coupled to public Internet 2254 (e.g. public Internet 2154 of FIG. 21). Public Internet 2254 can be communicatively coupled to the NAT gateway 2238 contained in the control plane VCN 2216. The service gateway 2236 contained in the control plane VCN 2216 can be communicatively coupled to cloud services 2256 (e.g. cloud services 2156 of FIG. 21).

In some examples, the data plane VCN 2218 can be contained in the customer tenancy 2221. In this case, the IaaS provider may provide the control plane VCN 2216 for each customer, and the IaaS provider may, for each customer, set up a unique compute instance 2244 that is contained in the service tenancy 2219. Each compute instance 2244 may allow communication between the control plane VCN 2216, contained in the service tenancy 2219, and the data plane VCN 2218 that is contained in the customer tenancy 2221. The compute instance 2244 may allow resources, that are provisioned in the control plane VCN 2216 that is contained in the service tenancy 2219, to be deployed or otherwise used in the data plane VCN 2218 that is contained in the customer tenancy 2221.

In other examples, the customer of the IaaS provider may have databases that live in the customer tenancy 2221. In this example, the control plane VCN 2216 can include the data plane mirror app tier 2240 that can include app subnet(s) 2226. The data plane mirror app tier 2240 can reside in the data plane VCN 2218, but the data plane mirror app tier 2240 may not live in the data plane VCN 2218. That is, the data plane mirror app tier 2240 may have access to the customer tenancy 2221, but the data plane mirror app tier 2240 may not exist in the data plane VCN 2218 or be owned or operated by the customer of the IaaS provider. The data plane mirror app tier 2240 may be configured to make calls to the data plane VCN 2218 but may not be configured to make calls to any entity contained in the control plane VCN 2216. The customer may desire to deploy or otherwise use resources in the data plane VCN 2218 that are provisioned in the control plane VCN 2216, and the data plane mirror app tier 2240 can facilitate the desired deployment, or other usage of resources, of the customer.

In some embodiments, the customer of the IaaS provider can apply filters to the data plane VCN 2218. In this embodiment, the customer can determine what the data plane VCN 2218 can access, and the customer may restrict access to public Internet 2254 from the data plane VCN 2218. The IaaS provider may not be able to apply filters or otherwise control access of the data plane VCN 2218 to any outside networks or databases. Applying filters and controls by the customer onto the data plane VCN 2218, contained in the customer tenancy 2221, can help isolate the data plane VCN 2218 from other customers and from public Internet 2254.

In some embodiments, cloud services 2256 can be called by the service gateway 2236 to access services that may not exist on public Internet 2254, on the control plane VCN 2216, or on the data plane VCN 2218. The connection between cloud services 2256 and the control plane VCN 2216 or the data plane VCN 2218 may not be live or continuous. Cloud services 2256 may exist on a different network owned or operated by the IaaS provider. Cloud services 2256 may be configured to receive calls from the service gateway 2236 and may be configured to not receive calls from public Internet 2254. Some cloud services 2256 may be isolated from other cloud services 2256, and the control plane VCN 2216 may be isolated from cloud services 2256 that may not be in the same region as the control plane VCN 2216. For example, the control plane VCN 2216 may be located in "Region 1," and cloud service "Deployment 21," may be located in Region 1 and in "Region 2." If a call to Deployment 21 is made by the service gateway 2236 contained in the control plane VCN 2216 located in Region 1, the call may be transmitted to Deployment 21 in Region 1. In this example, the control plane VCN 2216, or Deployment 21 in Region 1, may not be communicatively coupled to, or otherwise in communication with, Deployment 21 in Region 2.

Figure 23:
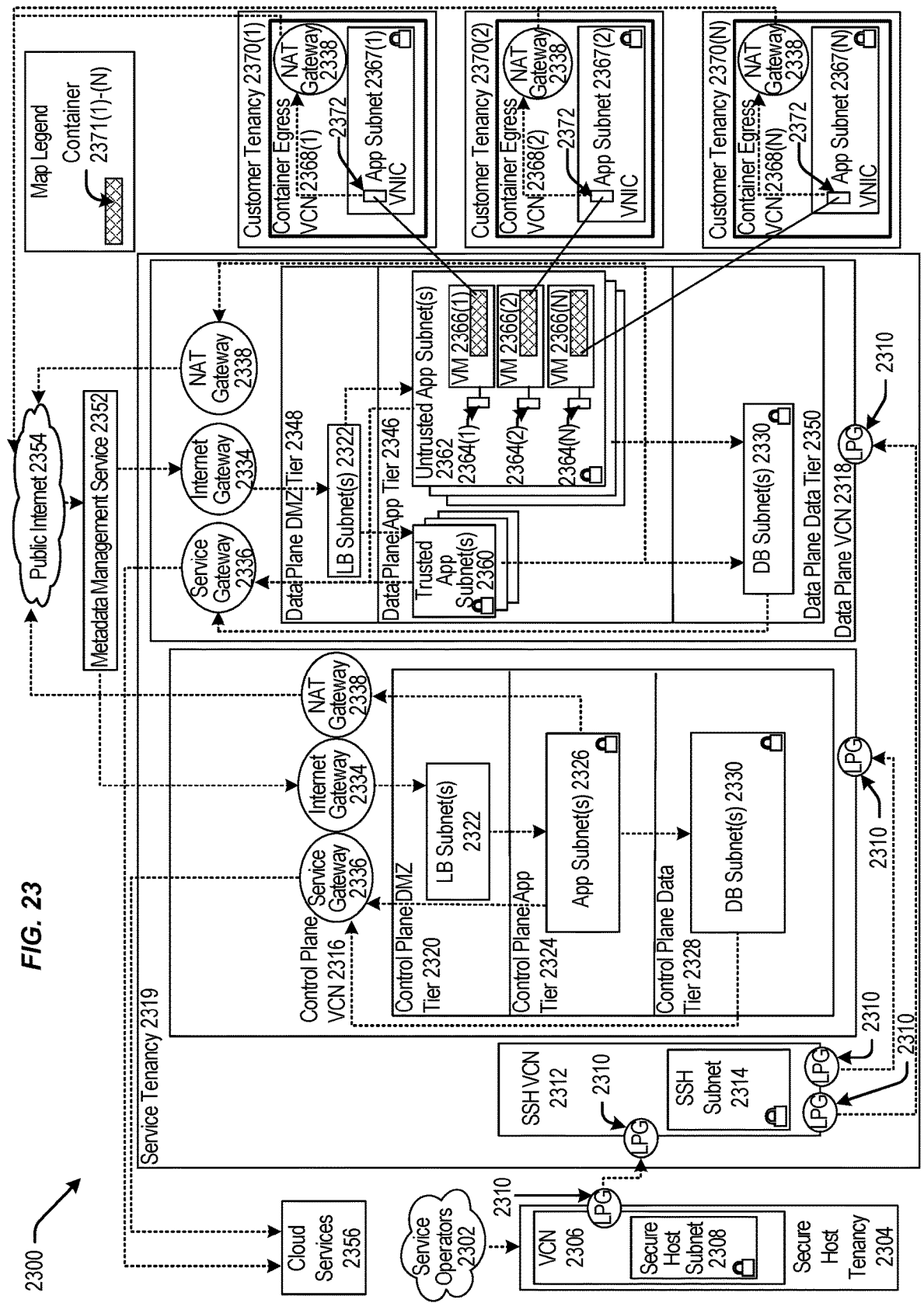
FIG. 23 is a block diagram illustrating another pattern for implementing a cloud infrastructure as a service system, according to at least one embodiment.

FIG. 23 is a block diagram 2300 illustrating another example pattern of an IaaS architecture, according to at least one embodiment. Service operators 2302 (e.g. service operators 2102 of FIG. 21) can be communicatively coupled to a secure host tenancy 2304 (e.g. the secure host tenancy 2104 of FIG. 21) that can include a virtual cloud network (VCN) 2306 (e.g. the VCN 2106 of FIG. 21) and a secure host subnet 2308 (e.g. the secure host subnet 2108 of FIG. 21). The VCN 2306 can include an LPG 2310 (e.g. the LPG 2110 of FIG. 21) that can be communicatively coupled to an SSH VCN 2312 (e.g. the SSH VCN 2112 of FIG. 21) via an LPG 2310 contained in the SSH VCN 2312. The SSH VCN 2312 can include an SSH subnet 2314 (e.g. the SSH subnet 2114 of FIG. 21), and the SSH VCN 2312 can be communicatively coupled to a control plane VCN 2316 (e.g. the control plane VCN 2116 of FIG. 21) via an LPG 2310 contained in the control plane VCN 2316 and to a data plane VCN 2318 (e.g. the data plane 2118 of FIG. 21) via an LPG 2310 contained in the data plane VCN 2318. The control plane VCN 2316 and the data plane VCN 2318 can be contained in a service tenancy 2319 (e.g. the service tenancy 2119 of FIG. 21).

The control plane VCN 2316 can include a control plane DMZ tier 2320 (e.g. the control plane DMZ tier 2120 of FIG. 21) that can include load balancer (LB) subnet(s) 2322 (e.g. LB subnet(s) 2122 of FIG. 21), a control plane app tier 2324 (e.g. the control plane app tier 2124 of FIG. 21) that can include app subnet(s) 2326 (e.g. similar to app subnet(s) 2126 of FIG. 21), a control plane data tier 2328 (e.g. the control plane data tier 2128 of FIG. 21) that can include DB subnet(s) 2330. The LB subnet(s) 2322 contained in the control plane DMZ tier 2320 can be communicatively coupled to the app subnet(s) 2326 contained in the control plane app tier 2324 and to an Internet gateway 2334 (e.g. the Internet gateway 2134 of FIG. 21) that can be contained in the control plane VCN 2316, and the app subnet(s) 2326 can be communicatively coupled to the DB subnet(s) 2330 contained in the control plane data tier 2328 and to a service gateway 2336 (e.g. the service gateway of FIG. 21) and a network address translation (NAT) gateway 2338 (e.g. the NAT gateway 2138 of FIG. 21). The control plane VCN 2316 can include the service gateway 2336 and the NAT gateway 2338.

The data plane VCN 2318 can include a data plane app tier 2346 (e.g. the data plane app tier 2146 of FIG. 21), a data plane DMZ tier 2348 (e.g. the data plane DMZ tier 2148 of FIG. 21), and a data plane data tier 2350 (e.g. the data plane data tier 2150 of FIG. 21). The data plane DMZ tier 2348 can include LB subnet(s) 2322 that can be communicatively coupled to trusted app subnet(s) 2360 and untrusted app subnet(s) 2362 of the data plane app tier 2346 and the Internet gateway 2334 contained in the data plane VCN 2318. The trusted app subnet(s) 2360 can be communicatively coupled to the service gateway 2336 contained in the data plane VCN 2318, the NAT gateway 2338 contained in the data plane VCN 2318, and DB subnet(s) 2330 contained in the data plane data tier 2350. The untrusted app subnet(s) 2362 can be communicatively coupled to the service gateway 2336 contained in the data plane VCN 2318 and DB subnet(s) 2330 contained in the data plane data tier 2350. The data plane data tier 2350 can include DB subnet(s) 2330 that can be communicatively coupled to the service gateway 2336 contained in the data plane VCN 2318.

The untrusted app subnet(s) 2362 can include one or more primary VNICs 2364(1)-(N) that can be communicatively coupled to tenant virtual machines (VMs) 2366(1)-(N). Each tenant VM 2366(1)-(N) can be communicatively coupled to a respective app subnet 2367(1)-(N) that can be contained in respective container egress VCNs 2368(1)-(N) that can be contained in respective customer tenancies 2370(1)-(N). Respective secondary VNICs 2372(1)-(N) can facilitate communication between the untrusted app subnet(s) 2362 contained in the data plane VCN 2318 and the app subnet contained in the container egress VCNs 2368(1)-(N). Each container egress VCNs 2368(1)-(N) can include a NAT gateway 2338 that can be communicatively coupled to public Internet 2354 (e.g. public Internet 2154 of FIG. 21).

The Internet gateway 2334 contained in the control plane VCN 2316 and contained in the data plane VCN 2318 can be communicatively coupled to a metadata management service 2352 (e.g. the metadata management system 2152 of FIG. 21) that can be communicatively coupled to public Internet 2354. Public Internet 2354 can be communicatively coupled to the NAT gateway 2338 contained in the control plane VCN 2316 and contained in the data plane VCN 2318. The service gateway 2336 contained in the control plane VCN 2316 and contained in the data plane VCN 2318 can be communicatively coupled to cloud services 2356.

In some embodiments, the data plane VCN 2318 can be integrated with customer tenancies 2370. This integration can be useful or desirable for customers of the IaaS provider in some cases such as a case that may desire support when executing code. The customer may provide code to run that may be destructive, may communicate with other customer resources, or may otherwise cause undesirable effects. In response to this, the IaaS provider may determine whether to run code given to the IaaS provider by the customer.

In some examples, the customer of the IaaS provider may grant temporary network access to the IaaS provider and request a function to be attached to the data plane tier app 2346. Code to run the function may be executed in the VMs 2366(1)-(N), and the code may not be configured to run anywhere else on the data plane VCN 2318. Each VM 2366(1)-(N) may be connected to one customer tenancy 2370. Respective containers 2371(1)-(N) contained in the VMs 2366(1)-(N) may be configured to run the code. In this case, there can be a dual isolation (e.g., the containers 2371(1)-(N) running code, where the containers 2371(1)-(N) may be contained in at least the VM 2366(1)-(N) that are contained in the untrusted app subnet(s) 2362), which may help prevent incorrect or otherwise undesirable code from damaging the network of the IaaS provider or from damaging a network of a different customer. The containers 2371(1)-(N) may be communicatively coupled to the customer tenancy 2370 and may be configured to transmit or receive data from the customer tenancy 2370. The containers 2371(1)-(N) may not be configured to transmit or receive data from any other entity in the data plane VCN 2318. Upon completion of running the code, the IaaS provider may kill or otherwise dispose of the containers 2371(1)-(N).

In some embodiments, the trusted app subnet(s) 2360 may run code that may be owned or operated by the IaaS provider. In this embodiment, the trusted app subnet(s) 2360 may be communicatively coupled to the DB subnet(s) 2330 and be configured to execute CRUD operations in the DB subnet(s) 2330. The untrusted app subnet(s) 2362 may be communicatively coupled to the DB subnet(s) 2330, but in this embodiment, the untrusted app subnet(s) may be configured to execute read operations in the DB subnet(s) 2330. The containers 2371(1)-(N) that can be contained in the VM 2366(1)-(N) of each customer and that may run code from the customer may not be communicatively coupled with the DB subnet(s) 2330.

In other embodiments, the control plane VCN 2316 and the data plane VCN 2318 may not be directly communicatively coupled. In this embodiment, there may be no direct communication between the control plane VCN 2316 and the data plane VCN 2318. However, communication can occur indirectly through at least one method. An LPG 2310 may be established by the IaaS provider that can facilitate communication between the control plane VCN 2316 and the data plane VCN 2318. In another example, the control plane VCN 2316 or the data plane VCN 2318 can make a call to cloud services 2356 via the service gateway 2336. For example, a call to cloud services 2356 from the control plane VCN 2316 can include a request for a service that can communicate with the data plane VCN 2318.

Figure 24:
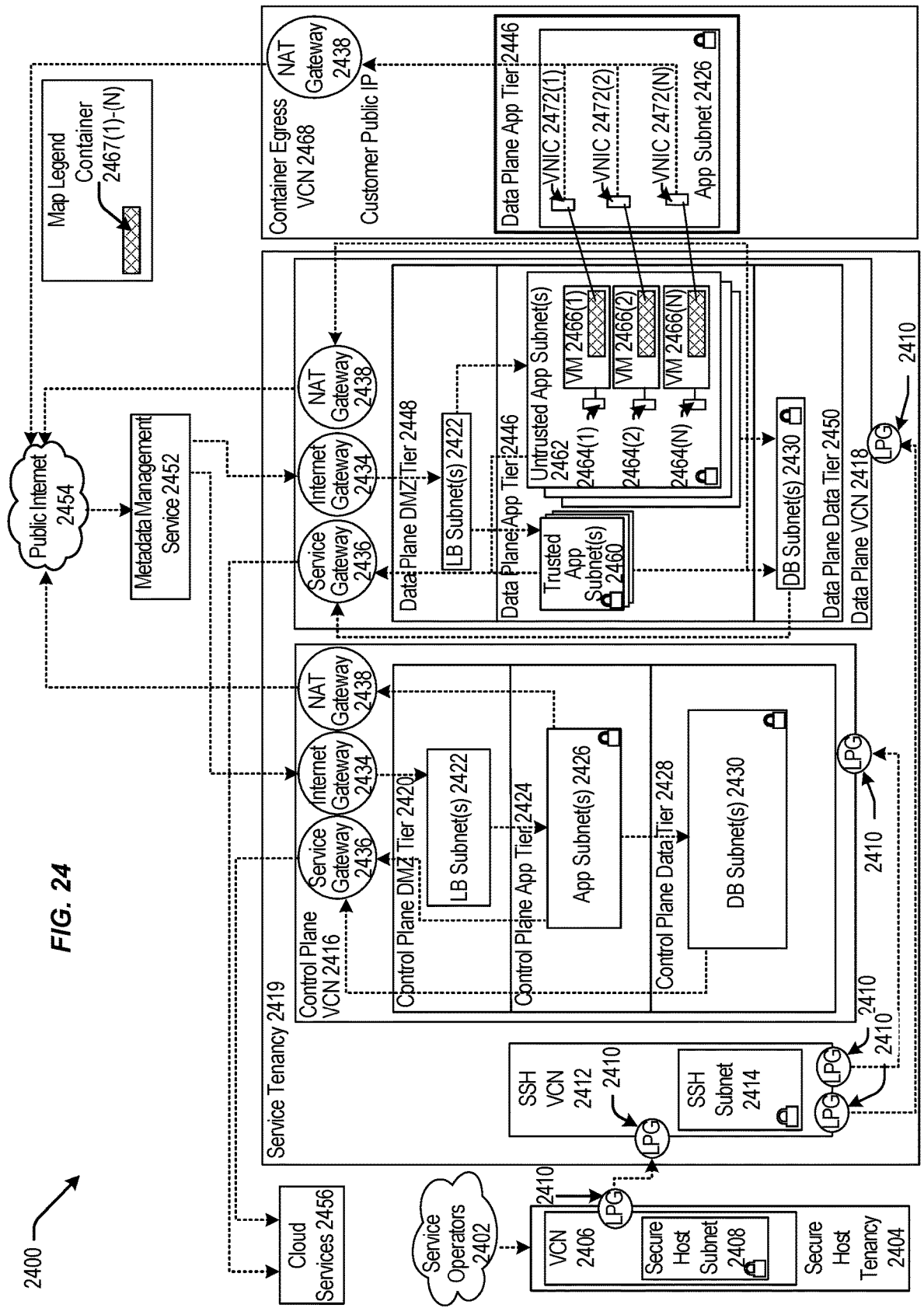
FIG. 24 is a block diagram illustrating another pattern for implementing a cloud infrastructure as a service system, according to at least one embodiment.

FIG. 24 is a block diagram 2400 illustrating another example pattern of an IaaS architecture, according to at least one embodiment. Service operators 2402 (e.g. service operators 2102 of FIG. 21) can be communicatively coupled to a secure host tenancy 2404 (e.g. the secure host tenancy 2104 of FIG. 21) that can include a virtual cloud network (VCN) 2406 (e.g. the VCN 2106 of FIG. 21) and a secure host subnet 2408 (e.g. the secure host subnet 2108 of FIG. 21). The VCN 2406 can include an LPG 2410 (e.g. the LPG 2110 of FIG. 21) that can be communicatively coupled to an SSH VCN 2412 (e.g. the SSH VCN 2112 of FIG. 21) via an LPG 2410 contained in the SSH VCN 2412. The SSH VCN 2412 can include an SSH subnet 2414 (e.g. the SSH subnet 2114 of FIG. 21), and the SSH VCN 2412 can be communicatively coupled to a control plane VCN 2416 (e.g. the control plane VCN 2116 of FIG. 21) via an LPG 2410 contained in the control plane VCN 2416 and to a data plane VCN 2418 (e.g. the data plane 2118 of FIG. 21) via an LPG 2410 contained in the data plane VCN 2418. The control plane VCN 2416 and the data plane VCN 2418 can be contained in a service tenancy 2419 (e.g. the service tenancy 2119 of FIG. 21).

The control plane VCN 2416 can include a control plane DMZ tier 2420 (e.g. the control plane DMZ tier 2120 of FIG. 21) that can include LB subnet(s) 2422 (e.g. LB subnet(s) 2122 of FIG. 21), a control plane app tier 2424 (e.g. the control plane app tier 2124 of FIG. 21) that can include app subnet(s) 2426 (e.g. app subnet(s) 2126 of FIG. 21), a control plane data tier 2428 (e.g. the control plane data tier 2128 of FIG. 21) that can include DB subnet(s) 2430 (e.g. DB subnet(s) 2330 of FIG. 23). The LB subnet(s) 2422 contained in the control plane DMZ tier 2420 can be communicatively coupled to the app subnet(s) 2426 contained in the control plane app tier 2424 and to an Internet gateway 2434 (e.g. the Internet gateway 2134 of FIG. 21) that can be contained in the control plane VCN 2416, and the app subnet(s) 2426 can be communicatively coupled to the DB subnet(s) 2430 contained in the control plane data tier 2428 and to a service gateway 2436 (e.g. the service gateway of FIG. 21) and a network address translation (NAT) gateway 2438 (e.g. the NAT gateway 2138 of FIG. 21). The control plane VCN 2416 can include the service gateway 2436 and the NAT gateway 2438.

The data plane VCN 2418 can include a data plane app tier 2446 (e.g. the data plane app tier 2146 of FIG. 21), a data plane DMZ tier 2448 (e.g. the data plane DMZ tier 2148 of FIG. 21), and a data plane data tier 2450 (e.g. the data plane data tier 2150 of FIG. 21). The data plane DMZ tier 2448 can include LB subnet(s) 2422 that can be communicatively coupled to trusted app subnet(s) 2460 (e.g. trusted app subnet(s) 2360 of FIG. 23) and untrusted app subnet(s) 2462 (e.g. untrusted app subnet(s) 2362 of FIG. 23) of the data plane app tier 2446 and the Internet gateway 2434 contained in the data plane VCN 2418. The trusted app subnet(s) 2460 can be communicatively coupled to the service gateway 2436 contained in the data plane VCN 2418, the NAT gateway 2438 contained in the data plane VCN 2418, and DB subnet(s) 2430 contained in the data plane data tier 2450. The untrusted app subnet(s) 2462 can be communicatively coupled to the service gateway 2436 contained in the data plane VCN 2418 and DB subnet(s) 2430 contained in the data plane data tier 2450. The data plane data tier 2450 can include DB subnet(s) 2430 that can be communicatively coupled to the service gateway 2436 contained in the data plane VCN 2418.

The untrusted app subnet(s) 2462 can include primary VNICs 2464(1)-(N) that can be communicatively coupled to tenant virtual machines (VMs) 2466(1)-(N) residing within the untrusted app subnet(s) 2462. Each tenant VM 2466(1)-(N) can run code in a respective container 2467(1)-(N), and be communicatively coupled to an app subnet 2426 that can be contained in a data plane app tier 2446 that can be contained in a container egress VCN 2468. Respective secondary VNICs 2472(1)-(N) can facilitate communication between the untrusted app subnet(s) 2462 contained in the data plane VCN 2418 and the app subnet contained in the container egress VCN 2468. The container egress VCN can include a NAT gateway 2438 that can be communicatively coupled to public Internet 2454 (e.g. public Internet 2154 of FIG. 21).

The Internet gateway 2434 contained in the control plane VCN 2416 and contained in the data plane VCN 2418 can be communicatively coupled to a metadata management service 2452 (e.g. the metadata management system 2152 of FIG. 21) that can be communicatively coupled to public Internet 2454. Public Internet 2454 can be communicatively coupled to the NAT gateway 2438 contained in the control plane VCN 2416 and contained in the data plane VCN 2418. The service gateway 2436 contained in the control plane VCN 2416 and contained in the data plane VCN 2418 can be communicatively coupled to cloud services 2456.

In some examples, the pattern illustrated by the architecture of block diagram 2400 of FIG. 24 may be considered an exception to the pattern illustrated by the architecture of block diagram 2300 of FIG. 23 and may be desirable for a customer of the IaaS provider if the IaaS provider cannot directly communicate with the customer (e.g., a disconnected region). The respective containers 2467(1)-(N) that are contained in the VMs 2466(1)-(N) for each customer can be accessed in real-time by the customer. The containers 2467(1)-(N) may be configured to make calls to respective secondary VNICs 2472(1)-(N) contained in app subnet(s) 2426 of the data plane app tier 2446 that can be contained in the container egress VCN 2468. The secondary VNICs 2472(1)-(N) can transmit the calls to the NAT gateway 2438 that may transmit the calls to public Internet 2454. In this example, the containers 2467(1)-(N) that can be accessed in real-time by the customer can be isolated from the control plane VCN 2416 and can be isolated from other entities contained in the data plane VCN 2418. The containers 2467(1)-(N) may also be isolated from resources from other customers.

In other examples, the customer can use the containers 2467(1)-(N) to call cloud services 2456. In this example, the customer may run code in the containers 2467(1)-(N) that requests a service from cloud services 2456. The containers 2467(1)-(N) can transmit this request to the secondary VNICs 2472(1)-(N) that can transmit the request to the NAT gateway that can transmit the request to public Internet 2454. Public Internet 2454 can transmit the request to LB subnet(s) 2422 contained in the control plane VCN 2416 via the Internet gateway 2434. In response to determining the request is valid, the LB subnet(s) can transmit the request to app subnet(s) 2426 that can transmit the request to cloud services 2456 via the service gateway 2436.

It should be appreciated that IaaS architectures 2100, 2200, 2300, 2400 depicted in the figures may have other components than those depicted. Further, the embodiments shown in the figures are only some examples of a cloud infrastructure system that may incorporate an embodiment of the disclosure. In some other embodiments, the IaaS systems may have more or fewer components than shown in the figures, may combine two or more components, or may have a different configuration or arrangement of components.

In certain embodiments, the IaaS systems described herein may include a suite of applications, middleware, and database service offerings that are delivered to a customer in a self-service, subscription-based, elastically scalable, reliable, highly available, and secure manner. An example of such an IaaS system is the Oracle Cloud Infrastructure (OCI) provided by the present assignee.

Figure 25:
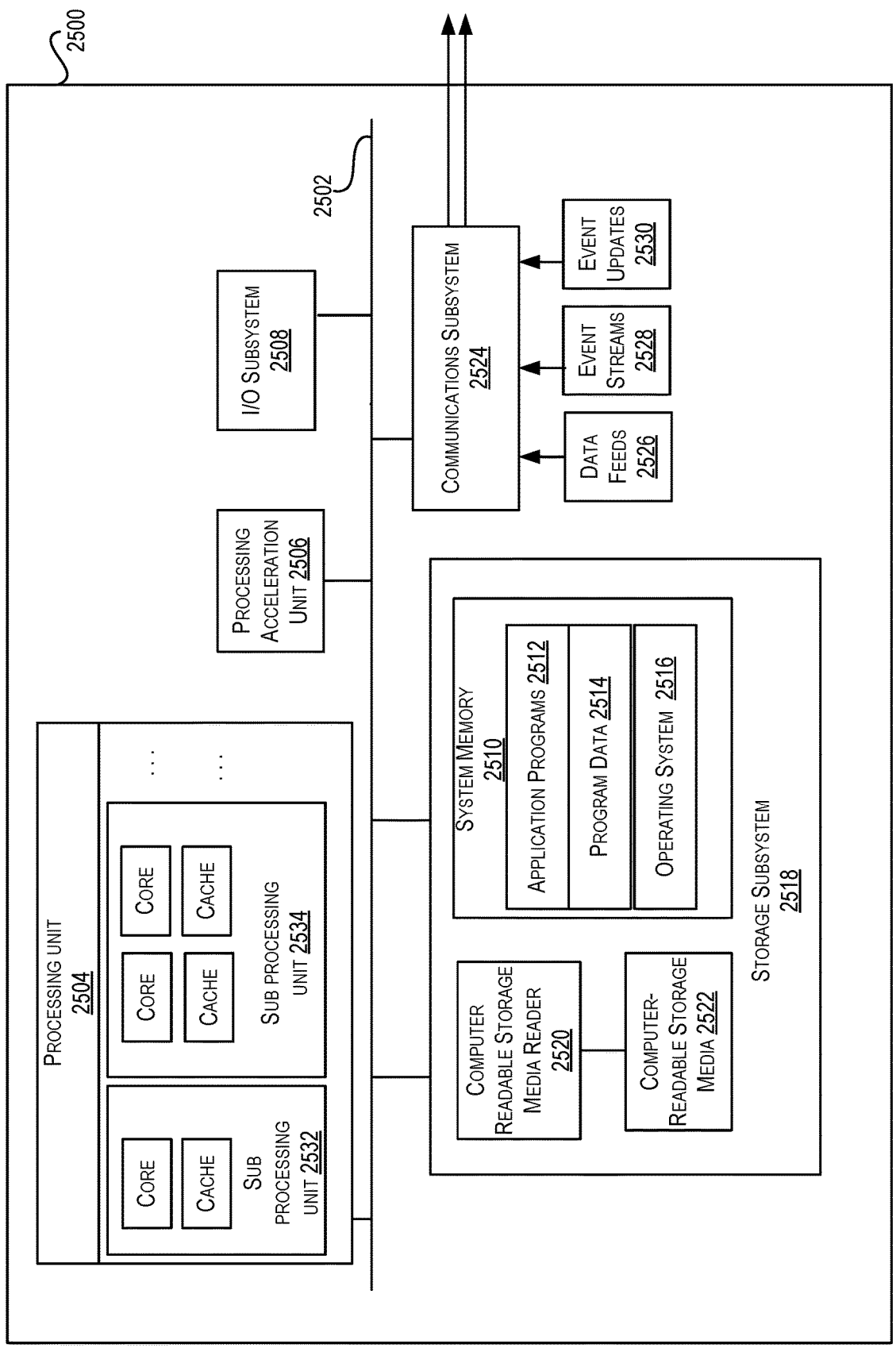
FIG. 25 is a block diagram illustrating an example computer system, according to at least one embodiment.

FIG. 25 illustrates an example computer system 2500, in which various embodiments may be implemented. The system 2500 may be used to implement any of the computer systems described above. As shown in the figure, computer system 2500 includes a processing unit 2504 that communicates with a number of peripheral subsystems via a bus subsystem 2502. These peripheral subsystems may include a processing acceleration unit 2506, an I/O subsystem 2508, a storage subsystem 2518 and a communications subsystem 2524. Storage subsystem 2518 includes tangible computer-readable storage media 2522 and a system memory 2510.

Bus subsystem 2502 provides a mechanism for letting the various components and subsystems of computer system 2500 communicate with each other as intended. Although bus subsystem 2502 is shown schematically as a single bus, alternative embodiments of the bus subsystem may utilize multiple buses. Bus subsystem 2502 may be any of several types of bus structures including a memory bus or memory controller, a peripheral bus, and a local bus using any of a variety of bus architectures. For example, such architectures may include an Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus, which can be implemented as a Mezzanine bus manufactured to the IEEE P1386.1 standard.

Processing unit 2504, which can be implemented as one or more integrated circuits (e.g., a conventional microprocessor or microcontroller), controls the operation of computer system 2500. One or more processors may be included in processing unit 2504. These processors may include single core or multicore processors. In certain embodiments, processing unit 2504 may be implemented as one or more independent processing units 2532 and/or 2534 with single or multicore processors included in each processing unit. In other embodiments, processing unit 2504 may also be implemented as a quad-core processing unit formed by integrating two dual-core processors into a single chip.

In various embodiments, processing unit 2504 can execute a variety of programs in response to program code and can maintain multiple concurrently executing programs or processes. At any given time, some or all of the program code to be executed can be resident in processor(s) 2504 and/or in storage subsystem 2518. Through suitable programming, processor(s) 2504 can provide various functionalities described above. Computer system 2500 may additionally include a processing acceleration unit 2506, which can include a digital signal processor (DSP), a special-purpose processor, and/or the like.

I/O subsystem 2508 may include user interface input devices and user interface output devices. User interface input devices may include a keyboard, pointing devices such as a mouse or trackball, a touchpad or touch screen incorporated into a display, a scroll wheel, a click wheel, a dial, a button, a switch, a keypad, audio input devices with voice command recognition systems, microphones, and other types of input devices. User interface input devices may include, for example, motion sensing and/or gesture recognition devices such as the Microsoft Kinect® motion sensor that enables users to control and interact with an input device, such as the Microsoft Xbox® 360 game controller, through a natural user interface using gestures and spoken commands. User interface input devices may also include eye gesture recognition devices such as the Google Glass® blink detector that detects eye activity (e.g., 'blinking' while taking pictures and/or making a menu selection) from users and transforms the eye gestures as input into an input device (e.g., Google Glass®). Additionally, user interface input devices may include voice recognition sensing devices that enable users to interact with voice recognition systems (e.g., Siri® navigator), through voice commands.

User interface input devices may also include, without limitation, three dimensional (3D) mice, joysticks or pointing sticks, gamepads and graphic tablets, and audio/visual devices such as speakers, digital cameras, digital camcorders, portable media players, webcams, image scanners, fingerprint scanners, barcode reader 3D scanners, 3D printers, laser rangefinders, and eye gaze tracking devices. Additionally, user interface input devices may include, for example, medical imaging input devices such as computed tomography, magnetic resonance imaging, position emission tomography, medical ultrasonography devices. User interface input devices may also include, for example, audio input devices such as MIDI keyboards, digital musical instruments and the like.

User interface output devices may include a display subsystem, indicator lights, or non-visual displays such as audio output devices, etc. The display subsystem may be a cathode ray tube (CRT), a flat-panel device, such as that using a liquid crystal display (LCD) or plasma display, a projection device, a touch screen, and the like. In general, use of the term "output device" is intended to include all possible types of devices and mechanisms for outputting information from computer system 2500 to a user or other computer. For example, user interface output devices may include, without limitation, a variety of display devices that visually convey text, graphics and audio/video information such as monitors, printers, speakers, headphones, automotive navigation systems, plotters, voice output devices, and modems.

Computer system 2500 may comprise a storage subsystem 2518 that comprises software elements, shown as being currently located within a system memory 2510. System memory 2510 may store program instructions that are loadable and executable on processing unit 2504, as well as data generated during the execution of these programs.

Depending on the configuration and type of computer system 2500, system memory 2510 may be volatile (such as random access memory (RAM)) and/or non-volatile (such as read-only memory (ROM), flash memory, etc.) The RAM typically contains data and/or program modules that are immediately accessible to and/or presently being operated and executed by processing unit 2504. In some implementations, system memory 2510 may include multiple different types of memory, such as static random access memory (SRAM) or dynamic random access memory (DRAM). In some implementations, a basic input/output system (BIOS), containing the basic routines that help to transfer information between elements within computer system 2500, such as during start-up, may typically be stored in the ROM. By way of example, and not limitation, system memory 2510 also illustrates application programs 2512, which may include client applications, Web browsers, mid-tier applications, relational database management systems (RDBMS), etc., program data 2514, and an operating system 2516. By way of example, operating system 2516 may include various versions of Microsoft Windows®, Apple Macintosh®, and/or Linux operating systems, a variety of commercially-available UNIX® or UNIX-like operating systems (including without limitation the variety of GNU/Linux operating systems, the Google Chrome® OS, and the like) and/or mobile operating systems such as iOS, Windows® Phone, Android® OS, BlackBerry® 25 OS, and Palm® OS operating systems.

Storage subsystem 2518 may also provide a tangible computer-readable storage medium for storing the basic programming and data constructs that provide the functionality of some embodiments. Software (programs, code modules, instructions) that when executed by a processor provide the functionality described above may be stored in storage subsystem 2518. These software modules or instructions may be executed by processing unit 2504. Storage subsystem 2518 may also provide a repository for storing data used in accordance with the present disclosure.

Storage subsystem 2500 may also include a computer-readable storage media reader 2520 that can further be connected to computer-readable storage media 2522. Together and, optionally, in combination with system memory 2510, computer-readable storage media 2522 may comprehensively represent remote, local, fixed, and/or removable storage devices plus storage media for temporarily and/or more permanently containing, storing, transmitting, and retrieving computer-readable information.

Computer-readable storage media 2522 containing code, or portions of code, can also include any appropriate media known or used in the art, including storage media and communication media, such as but not limited to, volatile and non-volatile, removable and non-removable media implemented in any method or technology for storage and/or transmission of information. This can include tangible computer-readable storage media such as RAM, ROM, electronically erasable programmable ROM (EEPROM), flash memory or other memory technology, CD-ROM, digital versatile disk (DVD), or other optical storage, magnetic cassettes, magnetic tape, magnetic disk storage or other magnetic storage devices, or other tangible computer readable media. This can also include nontangible computer-readable media, such as data signals, data transmissions, or any other medium which can be used to transmit the desired information and which can be accessed by computing system 2500.

By way of example, computer-readable storage media 2522 may include a hard disk drive that reads from or writes to non-removable, nonvolatile magnetic media, a magnetic disk drive that reads from or writes to a removable, non-volatile magnetic disk, and an optical disk drive that reads from or writes to a removable, nonvolatile optical disk such as a CD ROM, DVD, and Blu-Ray® disk, or other optical media. Computer-readable storage media 2522 may include, but is not limited to, Zip® drives, flash memory cards, universal serial bus (USB) flash drives, secure digital (SD) cards, DVD disks, digital video tape, and the like. Computer-readable storage media 2522 may also include, solid-state drives (SSD) based on non-volatile memory such as flash-memory based SSDs, enterprise flash drives, solid state ROM, and the like, SSDs based on volatile memory such as solid state RAM, dynamic RAM, static RAM, DRAM-based SSDs, magnetoresistive RAM (MRAM) SSDs, and hybrid SSDs that use a combination of DRAM and flash memory based SSDs. The disk drives and their associated computer-readable media may provide non-volatile storage of computer-readable instructions, data structures, program modules, and other data for computer system 2500.

Communications subsystem 2524 provides an interface to other computer systems and networks. Communications subsystem 2524 serves as an interface for receiving data from and transmitting data to other systems from computer system 2500. For example, communications subsystem 2524 may enable computer system 2500 to connect to one or more devices via the Internet. In some embodiments communications subsystem 2524 can include radio frequency (RF) transceiver components for accessing wireless voice and/or data networks (e.g., using cellular telephone technology, advanced data network technology, such as 3G, 4G or EDGE (enhanced data rates for global evolution), WiFi (IEEE 802.11 family standards, or other mobile communication technologies, or any combination thereof), global positioning system (GPS) receiver components, and/or other components. In some embodiments communications subsystem 2524 can provide wired network connectivity (e.g., Ethernet) in addition to or instead of a wireless interface.

In some embodiments, communications subsystem 2524 may also receive input communication in the form of structured and/or unstructured data feeds 2526, event streams 2528, event updates 2530, and the like on behalf of one or more users who may use computer system 2500.

By way of example, communications subsystem 2524 may be configured to receive data feeds 2526 in real-time from users of social networks and/or other communication services such as Twitter® feeds, Facebook® updates, web feeds such as Rich Site Summary (RSS) feeds, and/or real-time updates from one or more third party information sources.

Additionally, communications subsystem 2524 may also be configured to receive data in the form of continuous data streams, which may include event streams 2528 of real-time events and/or event updates 2530, that may be continuous or unbounded in nature with no explicit end. Examples of applications that generate continuous data may include, for example, sensor data applications, financial tickers, network performance measuring tools (e.g. network monitoring and traffic management applications), clickstream analysis tools, automobile traffic monitoring, and the like.

Communications subsystem 2524 may also be configured to output the structured and/or unstructured data feeds 2526, event streams 2528, event updates 2530, and the like to one or more databases that may be in communication with one or more streaming data source computers coupled to computer system 2500.

Computer system 2500 can be one of various types, including a handheld portable device (e.g., an iPhone® cellular phone, an iPad® computing tablet, a PDA), a wearable device (e.g., a Google Glass® head-mounted display), a PC, a workstation, a mainframe, a kiosk, a server rack, or any other data processing system.

In the foregoing description, for the purposes of explanation, specific details are set forth to provide a thorough understanding of examples of the disclosure. However, it will be apparent that various examples may be practiced without these specific details. The ensuing description provides examples only and is not intended to limit the scope, applicability, or configuration of the disclosure. Rather, the ensuing description of the examples will provide those skilled in the art with an enabling description for implementing an example. It should be understood that various changes may be made in the function and arrangement of elements without departing from the spirit and scope of the disclosure as set forth in the appended claims. The figures and description are not intended to be restrictive. Circuits, systems, networks, processes, and other components may be shown as components in block diagram form in order not to obscure the examples in unnecessary detail. In other instances, well-known circuits, processes, algorithms, structures, and techniques may be shown without unnecessary detail in order to avoid obscuring the examples. The teachings disclosed herein can also be applied to various types of applications such as mobile applications, non-mobile applications, desktop applications, web applications, enterprise applications, and the like. Further, the teachings of this disclosure are not restricted to a particular operating environment (e.g., operating systems, devices, platforms, and the like), but instead can be applied to multiple different operating environments.

Also, it is noted that individual examples may be described as a process which is depicted as a flowchart, a flow diagram, a data flow diagram, a structure diagram, or a block diagram. Although a flowchart may describe the operations as a sequential process, many of the operations may be performed in parallel or concurrently. In addition, the order of the operations may be rearranged. A process is terminated when its operations are completed, but the process could have additional steps not included in a figure. A process may correspond to a method, a function, a procedure, a subroutine, a subprogram, and so on. When a process corresponds to a function, its termination may correspond to a return of the function to the calling function or the main function.

The word "example" and "exemplary" is used herein to mean "serving as an example, instance, or illustration." Any embodiment or design described herein as "exemplary" or "example" is not necessarily to be construed as preferred or advantageous over other embodiments or designs.

The term "machine-readable storage medium" or "computer-readable storage medium" includes, but is not limited to, portable or non-portable storage devices, optical storage devices, and various other mediums capable of storing, containing, or carrying instruction(s) and/or data. A machine-readable storage medium or computer-readable storage medium may include a non-transitory medium in which data may be stored and which does not include carrier waves and/or transitory electronic signals propagating wirelessly or over wired connections. Examples of a non-transitory medium may include, but are not limited to, a magnetic disk or tape, optical storage media such as compact disk (CD) or digital versatile disk (DVD), flash memory, or memory or memory devices. A computer-program product may include code and/or machine-executable instructions that may represent a procedure, a function, a subprogram, a program, a routine, a subroutine, a module, a software package, a class, or any combination of instructions, data structures, or program statements. A code segment may be coupled to another code segment or a hardware circuit by passing and/or receiving information, data, arguments, parameters, or memory contents. Information, arguments, parameters, data, and so forth may be passed, forwarded, or transmitted via any suitable means including memory sharing, message passing, token passing, network transmission, and so forth.

Furthermore, examples may be implemented by hardware, software, firmware, middleware, microcode, hardware description languages, or any combination thereof. When implemented in software, firmware, middleware, or microcode, the program code or code segments to perform the necessary tasks (e.g., a computer-program product) may be stored in a machine-readable medium. A processor(s) may perform the necessary tasks. Systems depicted in some of the figures may be provided in various configurations. In some examples, the systems may be configured as a distributed system where one or more components of the system are distributed across one or more networks in a cloud computing system. Where components are described as being "configured to" perform certain operations, such configuration may be accomplished, for example, by designing electronic circuits or other hardware to perform the operation, by programming or controlling electronic circuits (e.g., microprocessors or other suitable electronic circuits) to perform the operation, or any combination thereof.

Although specific embodiments of the disclosure have been described, various modifications, alterations, alternative constructions, and equivalents are also encompassed within the scope of the disclosure. Embodiments of the present disclosure are not restricted to operation within certain specific data processing environments, but are free to operate within a plurality of data processing environments. Additionally, although embodiments of the present disclosure have been described using a particular series of transactions and steps, it should be apparent to those skilled in the art that the scope of the present disclosure is not limited to the described series of transactions and steps. Various features and aspects of the above-described embodiments may be used individually or jointly.

Further, while embodiments of the present disclosure have been described using a particular combination of hardware and software, it should be recognized that other combinations of hardware and software are also within the scope of the present disclosure. Embodiments of the present disclosure may be implemented only in hardware, or only in software, or using combinations thereof. The various processes described herein can be implemented on the same processor or different processors in any combination. Accordingly, where components or modules are described as being configured to perform certain operations, such configuration can be accomplished, e.g., by designing electronic circuits to perform the operation, by programming programmable electronic circuits (such as microprocessors) to perform the operation, or any combination thereof. Processes can communicate using a variety of techniques including, but not limited to, conventional techniques for inter process communication, and different pairs of processes may use different techniques, or the same pair of processes may use different techniques at different times.

The specification and drawings are, accordingly, to be regarded in an illustrative rather than a restrictive sense. It will, however, be evident that additions, subtractions, deletions, and other modifications and changes may be made thereunto without departing from the broader spirit and scope as set forth in the claims. Thus, although specific disclosure embodiments have been described, these are not intended to be limiting. Various modifications and equivalents are within the scope of the following claims.

The use of the terms "a" and "an" and "the" and similar referents in the context of describing the disclosed embodiments (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. The term "connected" is to be construed as partly or wholly contained within, attached to, or joined together, even if there is something intervening. Recitation of ranges of values herein are merely intended to serve as a shorthand method of referring individually to each separate value falling within the range, unless otherwise indicated herein and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate embodiments of the disclosure and does not pose a limitation on the scope of the disclosure unless otherwise claimed. No language in the specification should be construed as indicating any non-claimed element as essential to the practice of the disclosure.

Disjunctive language such as the phrase "at least one of X, Y, or Z," unless specifically stated otherwise, is intended to be understood within the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z to each be present.

Preferred embodiments of this disclosure are described herein, including the best mode known for carrying out the disclosure. Variations of those preferred embodiments may become apparent to those of ordinary skill in the art upon reading the foregoing description. Those of ordinary skill should be able to employ such variations as appropriate and the disclosure may be practiced otherwise than as specifically described herein. Accordingly, this disclosure includes all modifications and equivalents of the subject matter recited in the claims appended hereto as permitted by applicable law. Moreover, any combination of the above-described elements in all possible variations thereof is encompassed by the disclosure unless otherwise indicated herein.

All references, including publications, patent applications, and patents, cited herein are hereby incorporated by reference to the same extent as if each reference were individually and specifically indicated to be incorporated by reference and were set forth in its entirety herein.

In the foregoing specification, aspects of the disclosure are described with reference to specific embodiments thereof, but those skilled in the art will recognize that the disclosure is not limited thereto. Various features and aspects of the above-described disclosure may be used individually or jointly. Further, embodiments can be utilized in any number of environments and applications beyond those described herein without departing from the broader spirit and scope of the specification. The specification and drawings are, accordingly, to be regarded as illustrative rather than restrictive.

What is claimed is:

1. A system comprising:
a set of servers connected with a substrate network and hosting a network interface service;
a network virtualization device hosting a virtual network interface card, connected with the substrate network, and storing flow information usable by the virtual network interface card for traffic associated with a virtual network; and
a host machine connected with the network virtualization device and hosting a compute instance from the virtual network,
wherein the network interface service hosted on the set of servers is configured to:
store configuration information about a configuration of the virtual network;
store version information about the configuration information;
determine that the virtual network interface card is associated with the flow information;
determine, based on the version information, that the flow information on the network virtualization device is outdated;
generate, based on the configuration information and the version information, an update to the flow information; and
send, to the network virtualization device, the update.

2. The system of claim 1, wherein the configuration information comprises security policies, overlay-to-substrate internet protocol (IP) address mappings, and route rules for one or more packet flows, and wherein the flow information comprises at least one of a security policy, an overlay-to-substrate IP address mapping, or a route rule included in the configuration information.

3. The system of claim 1, wherein the configuration information comprises a plurality of portions, the flow information corresponding to a portion of the plurality of portions of the configuration information, and wherein the network interface service is further configured to:
store, for each portion of the plurality of portions, an indicator of a version of the portion; and
determine that a version of the flow information is outdated based on the stored indicator of the version for the corresponding portion of the configuration information.

4. The system of claim 3, wherein the network interface service is further configured to:
send, to the network virtualization device, an indicator of the update to be stored on the network virtualization device.

5. The system of claim 3, wherein the network interface service is further configured to:
receive, from the network virtualization device, a request for the update of the flow information, wherein the stored indicator informs the network virtualization device that the updated versionupdate is available; and
send, to the network virtualization device, the update in response to the request.

6. The system of claim 3, wherein the network interface service is further configured to:
send, to a control plane, the version information; and
receive, from the control plane, the update of the flow information and an indicator of the update.

7. The system of claim 6, wherein sending the version information comprises sending a vector clock populated with an indicator of a version of each portion of the plurality of portions that form the configuration information.

8. A method comprising:
storing, by a network virtualization device, flow information usable by a virtual network interface card for traffic associated with a virtual network, the network virtualization device hosting the virtual network interface card and connected with a substrate network, the virtual network interface card associated with a compute instance;
storing, by the network virtualization device, version information about the flow information;

determining, by the network virtualization device, that the flow information is outdated based on communication with a control plane about the version information;

receiving, by the network virtualization device from the control plane or a network interface service, an update of the flow information, the network interface service hosted on a set of servers connected with the substrate network, the network interface service storing configuration information about a configuration of the virtual network and version information about the configuration information, the update based on the configuration information and version information; and updating, by the network virtualization device, the flow information based on the update.

9. The method of claim 8, further comprising:

sending, by the network virtualization device to the control plane, the version information; and receiving, by the network virtualization device from the control plane, an indication that the flow information is outdated.

10. The method of claim 9, wherein sending the version information comprises sending a vector clock that comprises one or more version indicators of the flow information, and wherein receiving the indication comprises receiving an indicator of the update to the flow information.

11. The method of claim 8, further comprising:

sending, by the network virtualization device to the network interface service, a request to receive the update;

receiving, by the network virtualization device from the network interface service, the update based on the request; and sending, by the network virtualization device, a packet based on the update.

12. The method of claim 11, wherein the request is sent to the network interface service in response to receiving an indication from the control plane that the flow information is outdated and prior to receiving the packet from the compute instance.

13. The method of claim 8, further comprising:

receiving, by the network virtualization device from a host machine of the compute instance, a packet;

sending, by the network virtualization device to the network interface service, the packet based on the flow information being outdated; and receiving, by the network virtualization device from the network interface service, the update based on the packet.

14. One or more non-transitory computer-readable instructions that, upon execution on a network virtualization device, cause the network virtualization device to perform operations comprising:

storing flow information usable by a virtual network interface card for traffic associated with a virtual network, the network virtualization device hosting the virtual network interface card and connected with a substrate network, the virtual network interface card associated with a compute instance;

storing version information about the flow information;

determining that the flow information is outdated based on communication with a control plane about the version information;

receiving, from the control plane or-a network interface service, update of the flow information, the network interface service hosted on a set of servers connected with the substrate network, the network interface service storing configuration information about a configuration of the virtual network and version information about the configuration information, the update based on the configuration information and version information; and updating the flow information based on the update.

15. The one or more non-transitory computer-readable instructions of claim 14, wherein the operations further comprise receiving, from the network interface service, the flow information and the version information, wherein the flow information and the version information are stored in a cache associated with the virtual network interface card.

16. The one or more non-transitory computer-readable instructions of claim 14, wherein the configuration information comprises a plurality of portions, and wherein the operations further comprise receiving, from the network interface service, and storing each portion of the plurality of portions and a corresponding version indicator.

17. The one or more non-transitory computer-readable instructions of claim 16, wherein the operations further comprise:

receiving, from a host machine of the compute instance, a packet;

determining that the flow information comprises at least one outdated portion based on the communication with the control plane; and sending the packet to the network interface service based on the flow information comprising at least one outdated portion.

18. The one or more non-transitory computer-readable instructions of claim 17, wherein the operations further comprise:

receiving, from the network interface service, an updated version of the at least one outdated portion in response to sending the packet.

19. The one or more non-transitory computer-readable instructions of claim 16, wherein the configuration information comprises security policies, overlay-to-substrate internet protocol (IP) address mappings, and route rules for one or more packet flows, and wherein the flow information comprises at least one of a security policy, an overlay-to-substrate IP address mapping, or a route rule included in the configuration information.

20. The system of claim 5, wherein the request for the update is based on an indication from a control plane that the flow information is outdated.

* * * * *

UNITED STATES PATENT AND TRADEMARK OFFICE
CERTIFICATE OF CORRECTION

PATENT NO. : 11,637,770 B2
APPLICATION NO. : 17/237750
DATED : April 25, 2023
INVENTOR(S) : Tracy et al.

It is certified that error appears in the above-identified patent and that said Letters Patent is hereby corrected as shown below:

In the Drawings

On sheet 2 of 25, in FIG. 2, under Reference Numeral 268, Line 2, delete "INTANCE" and insert -- INSTANCE --, therefor.

On sheet 2 of 25, in FIG. 2, under Reference Numeral 274, Line 2, delete "INTANCE" and insert -- INSTANCE --, therefor.

In the Specification

In Column 43, Line 33, delete "like." and insert -- like). --, therefor.

In Column 55, Lines 46-47, delete "computer readable" and insert -- computer-readable --, therefor.

In the Claims

In Column 60, Line 46, in Claim 5, delete "updated versionupdate" and insert -- update --, therefor.

In Column 62, Line 6, in Claim 14, after "service," insert -- an --, therefor.

Signed and Sealed this
Twentieth Day of February, 2024

Katherine Kelly Vidal
*Director of the United States Patent and Trademark Office*